US009174659B2

(12) United States Patent
Stauff et al.

(10) Patent No.: US 9,174,659 B2
(45) Date of Patent: Nov. 3, 2015

(54) HANDLE FOR SHOPPING CART

(71) Applicant: Bemis Manufacturing Company, Sheboygan Falls, WI (US)

(72) Inventors: Rick Stauff, Plymouth, WI (US); Gary Vande Berg, Fox Lake, WI (US); Roy Watson, Lisbon, OH (US)

(73) Assignee: Bemis Manufacturing Company, Sheboygan Falls, WI (US)

( * ) Notice: Subject to any disclaimer, the term of this patent is extended or adjusted under 35 U.S.C. 154(b) by 0 days.

(21) Appl. No.: 14/214,434

(22) Filed: Mar. 14, 2014

(65) Prior Publication Data

US 2014/0238992 A1  Aug. 28, 2014

Related U.S. Application Data

(63) Continuation-in-part of application No. 13/609,070, filed on Sep. 10, 2012.

(60) Provisional application No. 61/792,120, filed on Mar. 15, 2013, provisional application No. 61/811,393, filed on Apr. 12, 2013.

(51) Int. Cl.
*B62B 3/02* (2006.01)
*B62B 3/14* (2006.01)
(Continued)

(52) U.S. Cl.
CPC .............. *B62B 3/1404* (2013.01); *A47C 4/00* (2013.01); *B62B 3/142* (2013.01); *B62B 3/1468* (2013.01);
(Continued)

(58) Field of Classification Search
CPC ........ B62B 3/027; B62B 3/14; B62B 3/1416; B62B 5/06; B62B 5/061; B62B 5/067

USPC ............. 280/33.991, 33.992, 33.996, 33.997, 280/47.34, 47.35, 47.371, DIG. 4; 16/110.1
See application file for complete search history.

(56) References Cited

U.S. PATENT DOCUMENTS 2,479,530 A   8/1949   Watson
2,556,532 A   6/1951   Goldman
(Continued)

FOREIGN PATENT DOCUMENTS

AU   4797885   4/1986
AU    581928   3/1989
(Continued)

OTHER PUBLICATIONS

International Invitation to Pay Additional Fees and Partial International Search for Application No. PCT/US2014/029474 dated Jul. 22, 2014 (6 pages).

(Continued)

*Primary Examiner* — Brodie Follman
(74) *Attorney, Agent, or Firm* — Michael Best & Freidrich LLP

(57) ABSTRACT

A shopping cart includes a frame, a plurality of wheels for supporting the frame for movement over a floor, an arm connected to the frame, and a projection positioned proximate at least one of the wheels. The frame has a front end and a rear end. The arm is configured to engage the tow member for moving the frame. The projection engages the guide member to prevent one of the front end and the rear end from rotating over the other of the front end and the rear end. A handle assembly may include an elongated slot positioned proximate a handle. The shopping cart may also include a tray is releasably secured to the frame by inserting a tab into a slot. The shopping cart may also include a tab received within a slot to secure a basket against movement relative to the frame.

32 Claims, 44 Drawing Sheets

(51) Int. Cl.
*A47C 4/00* (2006.01)
*B62B 5/06* (2006.01)

(52) U.S. Cl.
CPC ............ *B62B 3/1476* (2013.01); *B62B 3/1484* (2013.01); *B62B 3/1492* (2013.01); *B62B 3/1496* (2013.01); *B62B 5/067* (2013.01); *B62B 5/064* (2013.01); *B62B 2501/04* (2013.01); *B62B 2501/065* (2013.01); *Y10T 16/44* (2015.01)

(56) References Cited

U.S. PATENT DOCUMENTS

| | | | |
|---|---|---|---|
| 3,019,953 A | 2/1962 | Martin | |
| 3,026,122 A | 3/1962 | Young | |
| 3,909,034 A * | 9/1975 | Trubiano | 280/47.34 |
| 4,097,056 A | 6/1978 | Castellano | |
| 4,616,839 A | 10/1986 | Trubiano | |
| 4,647,055 A | 3/1987 | Weill | |
| 4,733,877 A * | 3/1988 | Pastien | 280/33.991 |
| 4,746,134 A | 5/1988 | Rehrig | |
| 4,922,639 A | 5/1990 | Rehrig | |
| 5,199,728 A | 4/1993 | Hutchison | |
| 5,331,756 A | 7/1994 | Rehrig | |
| 5,435,582 A * | 7/1995 | Davidson | 280/33.992 |
| 5,608,978 A | 3/1997 | Sawyer | |
| 5,791,666 A | 8/1998 | Mainard | |
| 5,947,313 A | 9/1999 | Kern et al. | |
| D435,196 S * | 12/2000 | Gregor et al. | D7/552.1 |
| 6,490,979 B1 | 12/2002 | Pfleger | |
| 6,572,122 B2 | 6/2003 | Johnson et al. | |
| 6,589,458 B2 | 7/2003 | DeCost | |
| 6,644,674 B2 | 11/2003 | Simard | |
| 6,705,623 B2 | 3/2004 | Nadeau et al. | |
| 6,761,364 B2 | 7/2004 | Murar et al. | |
| 6,923,456 B2 | 8/2005 | Ryan et al. | |
| 6,983,944 B2 | 1/2006 | Bergia | |
| 7,104,552 B2 | 9/2006 | Swanson et al. | |
| D530,478 S | 10/2006 | Splain et al. | |
| D540,998 S | 4/2007 | Splain et al. | |
| 7,216,875 B2 | 5/2007 | O'Quin | |
| D546,021 S | 7/2007 | Splain et al. | |
| 7,237,782 B2 | 7/2007 | Tucker et al. | |
| 7,240,910 B2 * | 7/2007 | Stuemke | 280/79.5 |
| 7,255,271 B2 | 8/2007 | Ulrich et al. | |
| D550,423 S | 9/2007 | Splain et al. | |
| D556,413 S | 11/2007 | Splain et al. | |
| 7,303,198 B2 | 12/2007 | Higgins | |
| 7,322,582 B2 | 1/2008 | Prather et al. | |
| 7,384,049 B2 | 6/2008 | Peota et al. | |
| 7,398,976 B2 | 7/2008 | Splain et al. | |
| D575,472 S | 8/2008 | Splain et al. | |
| 7,407,169 B2 | 8/2008 | Splain et al. | |
| 7,410,178 B2 | 8/2008 | Splain et al. | |
| 7,416,194 B2 | 8/2008 | Splain et al. | |
| D582,122 S | 12/2008 | Splain et al. | |
| 7,494,135 B2 | 2/2009 | Ash et al. | |
| D588,774 S | 3/2009 | Peota et al. | |
| D588,775 S | 3/2009 | Peota et al. | |
| D591,474 S | 4/2009 | Peota et al. | |
| 7,600,763 B2 | 10/2009 | Splain et al. | |
| D607,173 S | 12/2009 | Selvig et al. | |
| 7,766,347 B2 | 8/2010 | Ryan et al. | |
| 7,780,036 B2 | 8/2010 | Splain et al. | |
| 7,780,902 B2 | 8/2010 | Pruitt, Jr. et al. | |
| D623,374 S | 9/2010 | Splain et al. | |
| 7,793,948 B2 | 9/2010 | Splain et al. | |
| 7,959,166 B2 | 6/2011 | Splain et al. | |
| D641,532 S | 7/2011 | Peota et al. | |
| D643,175 S | 8/2011 | Peota et al. | |
| D644,810 S | 9/2011 | Peota et al. | |
| 8,056,909 B2 * | 11/2011 | Burdwood et al. | 280/33.991 |
| 8,066,291 B2 * | 11/2011 | Cagan et al. | 280/33.991 |
| 8,096,564 B2 | 1/2012 | Berthiaume et al. | |
| D656,288 S | 3/2012 | Walter | |
| 8,256,792 B2 * | 9/2012 | Conrad et al. | 280/648 |
| 8,282,119 B1 * | 10/2012 | Caksa | 280/642 |
| 8,313,114 B1 * | 11/2012 | Aron | 280/33.992 |
| D683,102 S | 5/2013 | Muscara | |
| D684,744 S | 6/2013 | Walter | |
| 8,684,371 B2 | 4/2014 | Berthiaume et al. | |
| D710,562 S * | 8/2014 | Stauff et al. | D34/27 |
| D714,011 S * | 9/2014 | Fredendall et al. | D34/27 |
| D714,012 S * | 9/2014 | Fredendall et al. | D34/27 |
| D733,388 S | 6/2015 | Stauff et al. | |
| 2002/0020976 A1 | 2/2002 | Nadeau et al. | |
| 2002/0020977 A1 | 2/2002 | Johnson et al. | |
| 2002/0074753 A1 | 6/2002 | Thalhofer et al. | |
| 2003/0057666 A1 | 3/2003 | Murar et al. | |
| 2003/0116933 A1 | 6/2003 | Nadeau | |
| 2003/0132612 A1 * | 7/2003 | Pike et al. | 280/642 |
| 2004/0104549 A1 | 6/2004 | Bergia | |
| 2004/0111320 A1 | 6/2004 | Schlieffers | |
| 2005/0087944 A1 | 4/2005 | Higgins | |
| 2005/0189731 A1 | 9/2005 | Swanson et al. | |
| 2005/0242549 A1 * | 11/2005 | Longenecker et al. | 280/642 |
| 2006/0157946 A1 * | 7/2006 | Stuemke | 280/79.5 |
| 2006/0181062 A1 | 8/2006 | Robinson | |
| 2006/0186620 A1 | 8/2006 | Tucker et al. | |
| 2007/0063463 A1 | 3/2007 | Splain et al. | |
| 2007/0063464 A1 | 3/2007 | Splain | |
| 2007/0126207 A1 * | 6/2007 | Rojas et al. | 280/647 |
| 2007/0210541 A1 | 9/2007 | Johnson | |
| 2008/0111328 A1 | 5/2008 | Ryan | |
| 2008/0164640 A1 | 7/2008 | Pruitt et al. | |
| 2008/0211200 A1 | 9/2008 | Eberlein | |
| 2008/0309037 A1 | 12/2008 | Hebert | |
| 2009/0033118 A1 * | 2/2009 | Gomez | 296/37.4 |
| 2009/0058024 A1 * | 3/2009 | Cagan et al. | 280/33.991 |
| 2009/0159402 A1 | 6/2009 | Webster | |
| 2009/0160146 A1 | 6/2009 | Berthiaume et al. | |
| 2009/0242355 A1 | 10/2009 | Webster | |
| 2010/0038886 A1 * | 2/2010 | Greger et al. | 280/642 |
| 2010/0102523 A1 | 4/2010 | Deal et al. | |
| 2010/0194064 A1 | 8/2010 | Simonson et al. | |
| 2010/0200629 A1 | 8/2010 | Reynolds | |
| 2010/0230934 A1 | 9/2010 | Fine | |
| 2010/0276899 A1 * | 11/2010 | Burdwood et al. | 280/33.991 |
| 2010/0276909 A1 * | 11/2010 | Liu | 280/650 |
| 2011/0062675 A1 | 3/2011 | Brown | |
| 2011/0147164 A1 | 6/2011 | Webster | |
| 2011/0148076 A1 * | 6/2011 | Chen | 280/650 |
| 2012/0074826 A1 | 3/2012 | Klaus et al. | |
| 2012/0097721 A1 * | 4/2012 | Winterhalter et al. | 224/409 |
| 2012/0161406 A1 | 6/2012 | Mersky | |
| 2012/0304440 A1 | 12/2012 | Berthiaume et al. | |
| 2013/0038036 A1 * | 2/2013 | Lester | 280/304.1 |
| 2013/0140778 A1 * | 6/2013 | Stauff et al. | 280/33.996 |
| 2013/0153616 A1 | 6/2013 | Geva et al. | |
| 2013/0255736 A1 * | 10/2013 | Horst | 135/16 |
| 2013/0300076 A1 | 11/2013 | Berthiaume et al. | |
| 2013/0300090 A1 * | 11/2013 | Wang | 280/651 |
| 2014/0238992 A1 * | 8/2014 | Stauff et al. | 220/485 |

FOREIGN PATENT DOCUMENTS

| | | |
|---|---|---|
| CA | 2314774 A1 | 1/2002 |
| DE | 3305378 | 9/1984 |
| DE | 3419488 | 11/1985 |
| DE | 102004048623 | 4/2006 |
| DE | 102007060983 | 6/2009 |
| DE | 102009042287 | 3/2011 |
| EP | 0364655 | 4/1990 |
| EP | 0937625 | 8/1999 |
| EP | 1400428 A1 | 3/2004 |
| EP | 1591341 A2 | 11/2005 |
| FR | 2863997 | 6/2005 |
| GB | 962378 | 7/1964 |
| GB | 1007453 | 10/1965 |
| GB | 1007453 A | 10/1965 |
| GB | 2316368 | 2/1998 |
| JP | 3266770 | 11/1991 |
| JP | 2012218502 A | 11/2012 |
| KR | 20120037780 A | 4/2012 |

(56) References Cited

FOREIGN PATENT DOCUMENTS

| WO | 99/58438 | 11/1999 |
| WO | 01/81064 | 11/2001 |
| WO | 2013112644 A1 | 8/2013 |

OTHER PUBLICATIONS

International Invitation to Pay Additional Fees and Partial International Search for Application No. PCT/US2012/054514 dated Dec. 12, 2012 (8 pages).

International Search Report and Written Opinion for Application No. PCT/US2012/054514 dated Feb. 7, 2013 (25 pages).

InternationalPreliminary Report on Patentability and Written Opinion for Application No. PCT/US2012/054514 dated Dec. 4, 2013 (41 pages).

PCT/US2012/054514 Written Opinion of the International Preliminary Examining Authority dated Sep. 18, 2013 (14 pages).

EP14167584.3 Extended European Search Report dated Jun. 25, 2014 (8 pages).

EP14167583.5 Extended European Search Report dated Jun. 25, 2014 (8 pages).

International Search Report and Written Opinion for Application No. PCT/US2014/029474 dated Sep. 23, 2014 (24 pages).

* cited by examiner

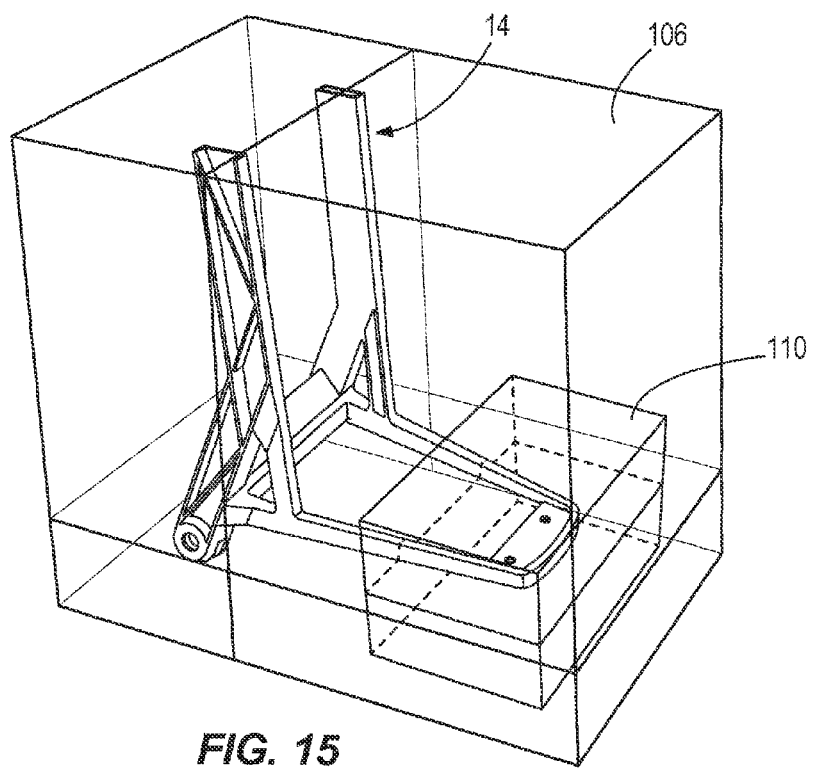
FIG. 15
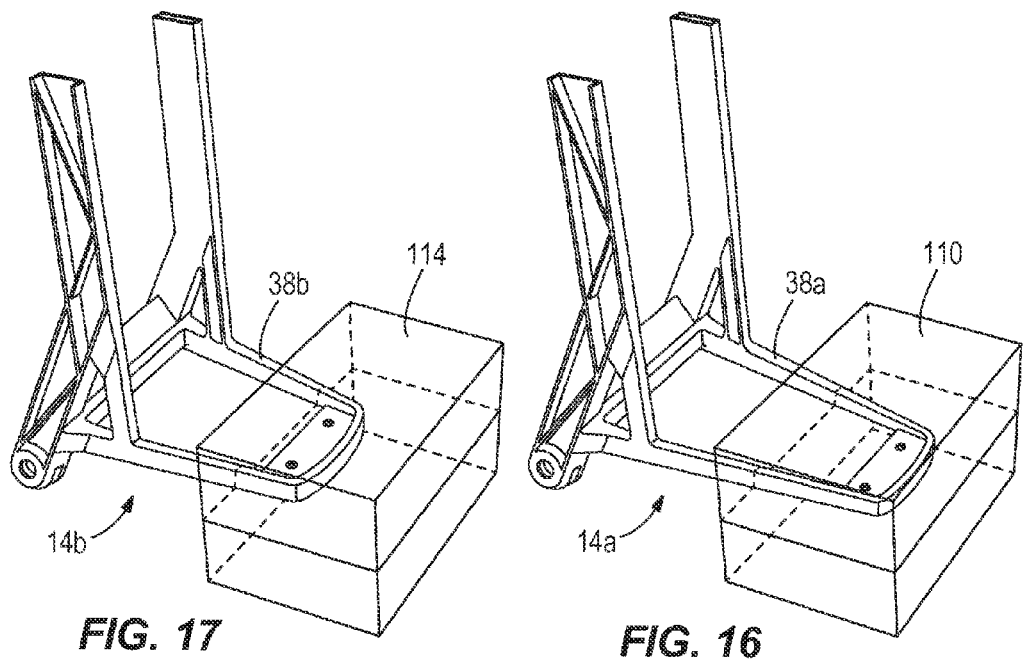
FIG. 17  FIG. 16

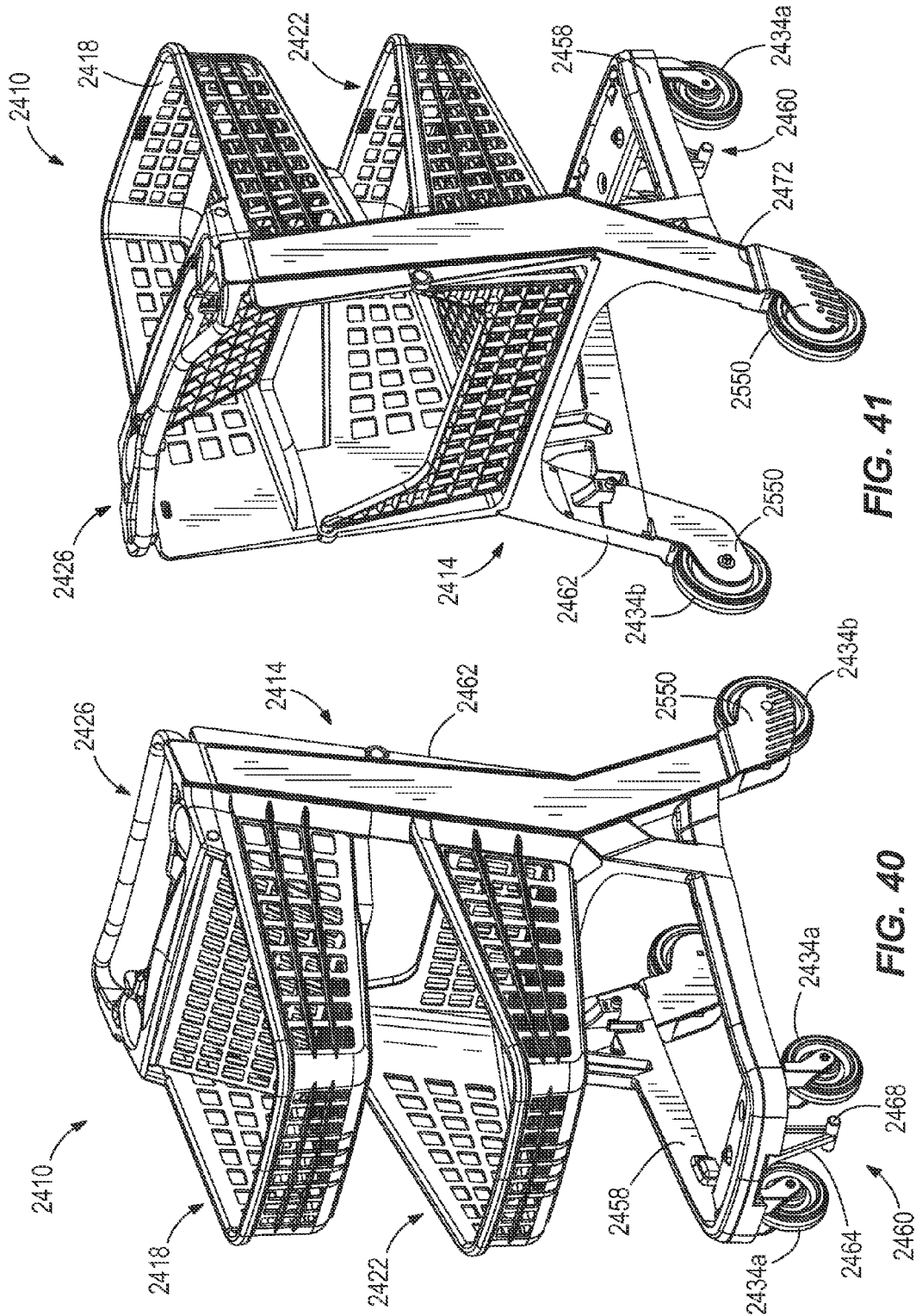

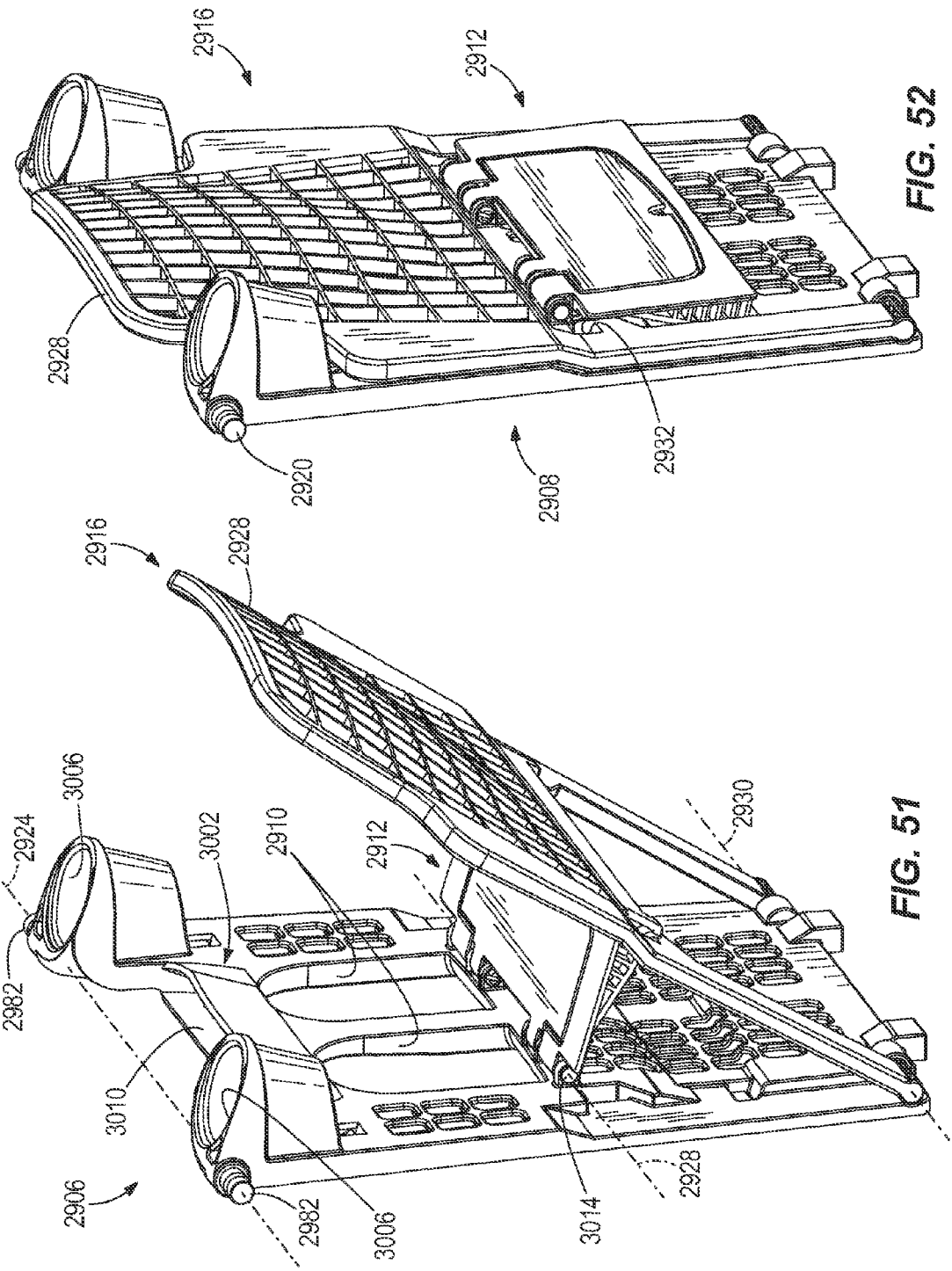

HANDLE FOR SHOPPING CART

CROSS-REFERENCE TO RELATED APPLICATIONS

This application claims the benefit of prior-filed U.S. Provisional Application Ser. No. 61/792,120, filed Mar. 15, 2013 and U.S. Provisional Application Ser. No. 61/811,393, filed Apr. 12, 2013. The entire contents of both documents are incorporated by reference herein. This application is a continuation-in-part of co-pending, prior-filed U.S. application Ser. No. 13/609,070, filed Sep. 10, 2012, the entire contents of which is incorporated by reference herein.

BACKGROUND

The present invention relates to shopping carts.

SUMMARY

In one embodiment, the invention provides a method of making a shopping cart. The method includes forming a frame capable of supporting a plurality of basket assembly types, selecting from the plurality of basket assembly types a first basket assembly defining a first basket assembly type; and connecting the first basket assembly to the frame.

In another embodiment, the invention provides a shopping cart including a frame supported for movement over the ground, a first handle, and a first basket assembly connected to the frame. The frame includes an upright portion and is capable of supporting a plurality of basket assembly types. The first handle is connected to the upright portion. The first basket assembly defines a first basket assembly type.

In yet another embodiment, the invention provides a shopping cart including a frame supported for movement over the ground, a first handle, and a first basket assembly. The frame includes an upright portion, and the first handle is connected to the upright portion. The first basket assembly includes a basket frame for supporting a plurality of basket wall types, and one of the plurality of basket wall types attached to the basket frame.

In still another embodiment, the invention provides a flat cart including a frame supported for movement over the ground and a deck that is pivotably connected to the frame. The frame includes a base defining a longitudinal axis and an upright portion including a handle. The deck is pivotable about a pivot axis transverse to the longitudinal axis between a lowered position and an upright position.

In still another embodiment, the invention provides a shopping cart having a front end and a rear end. The cart includes a first basket supported for movement over a floor or the ground and configured to be loaded from the rear, and a handle for pushing the cart.

In still another embodiment, the invention provides a shopping cart having a front end and a rear end and defining a cart axis therebetween. The cart includes a first basket supported for movement over a floor or the ground and a handle for pushing the cart, the handle being pivotable.

In yet another embodiment, the invention provides a shopping cart having a front end and a rear end and defining a cart axis therebetween. The cart includes a handle for pushing the cart, a first basket including a moveable first gate, and a second basket including a moveable second gate.

In another embodiment, the invention provides a shopping cart adapted to engage a cart transport system including a tow member, tracks, and a guide member, the cart includes a frame, a plurality of wheels for supporting the frame for movement over a floor, an arm connected to the frame, and a projection positioned proximate at least one of the wheels. The frame has a front end and a rear end. The arm is configured to engage the tow member for moving the frame. The projection engages the guide member to prevent one of the front end and the rear end from rotating over the other of the front end and the rear end.

In still another embodiment, the invention provides a handle assembly for a shopping cart having a front end and a rear end. The handle assembly includes a handle positioned proximate the rear end of the cart and an elongated slot positioned proximate the handle and adapted for supporting an accessory.

In yet another embodiment, the invention provides a shopping cart including a basket, a plurality of openings, and a groove. The basket includes a bottom and side walls, and the side walls define an edge and include a rail extending around at least a portion of the edge. The plurality of openings extend through the side walls and define a pattern. The groove is formed within the rail and positioned below the edge and above the plurality of openings.

In yet another embodiment, the invention provides a shopping cart including a rear wall, a seat pivotably coupled to the rear wall about a first axis, and a folding wall pivotably coupled to the rear wall about a second axis. The folding wall includes a backrest.

In still another embodiment, the invention provides a shopping cart including a frame and a tray supported by the frame. The tray is releasably secured to the frame by angling the tray at an acute angle relative to the frame, moving the tray to engage the frame, and pivoting the tray relative to the frame.

In yet another embodiment, the invention provides a shopping cart including a frame, a basket slidably coupled to the frame, a slot positioned on one of the frame and the basket, and a tab coupled to the other of the frame and the basket. The tab is received within the slot to secure the basket against movement relative to the frame.

In still another embodiment, the invention provides a shopping cart including a first handle, and a second handle laterally spaced apart from the first handle.

Other aspects of the invention will become apparent by consideration of the detailed description and accompanying drawings.

BRIEF DESCRIPTION OF THE DRAWINGS

FIG. 15 is a perspective view of a mold.

FIG. 16 is a perspective view of a frame portion and a first mold insert.

FIG. 17 is a perspective view of a frame portion and second mold insert.

FIG. 40 is a front perspective view of a shopping cart according to another embodiment.

FIG. 41 is a rear perspective view of the shopping cart of FIG. 40.

FIG. 51 is a perspective view of a gate assembly in an open state.

FIG. 52 is a perspective view of the gate assembly of FIG. 51 in a collapsed state.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
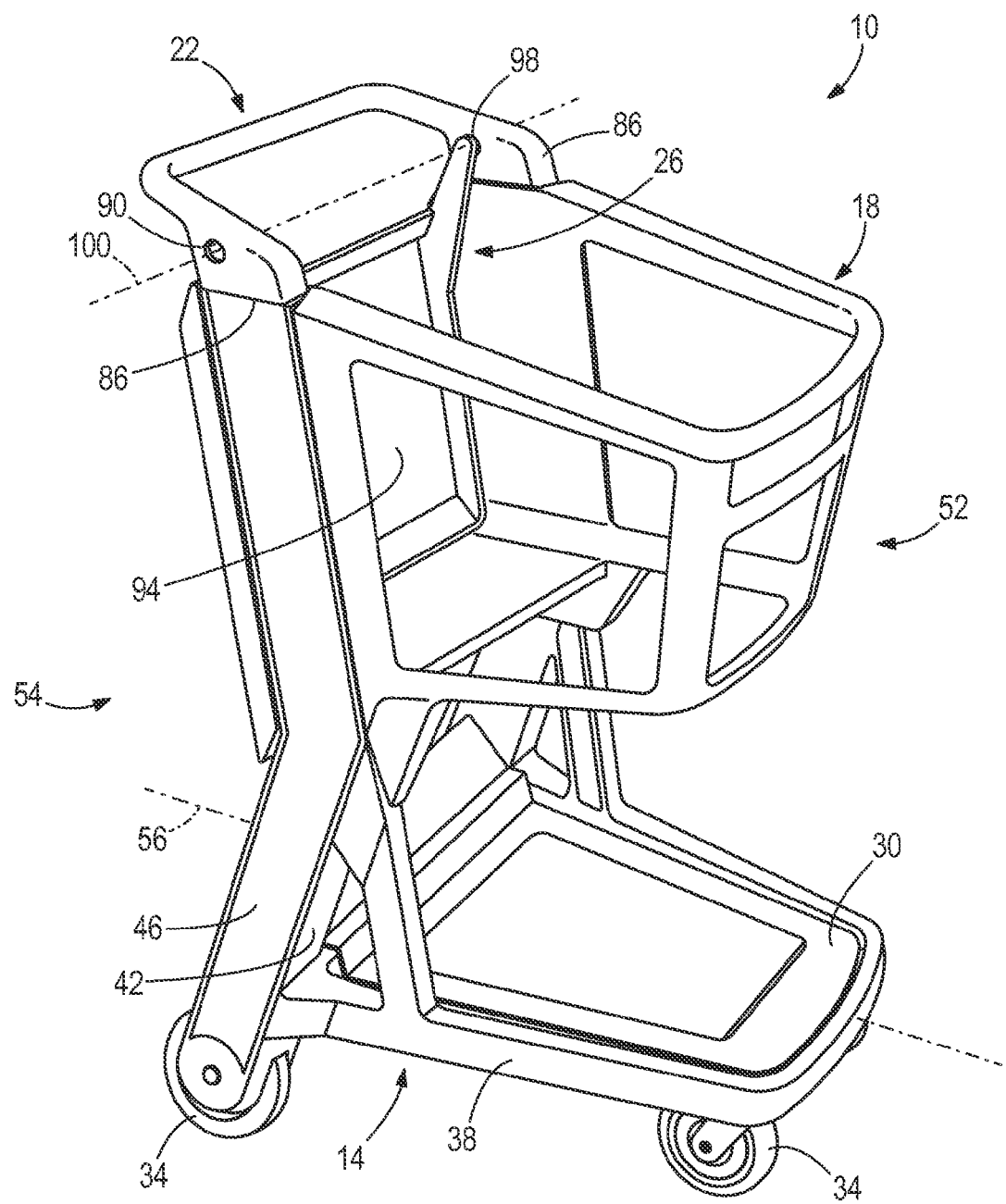
FIG. 1 is a perspective view of a shopping cart.
Figure 4:
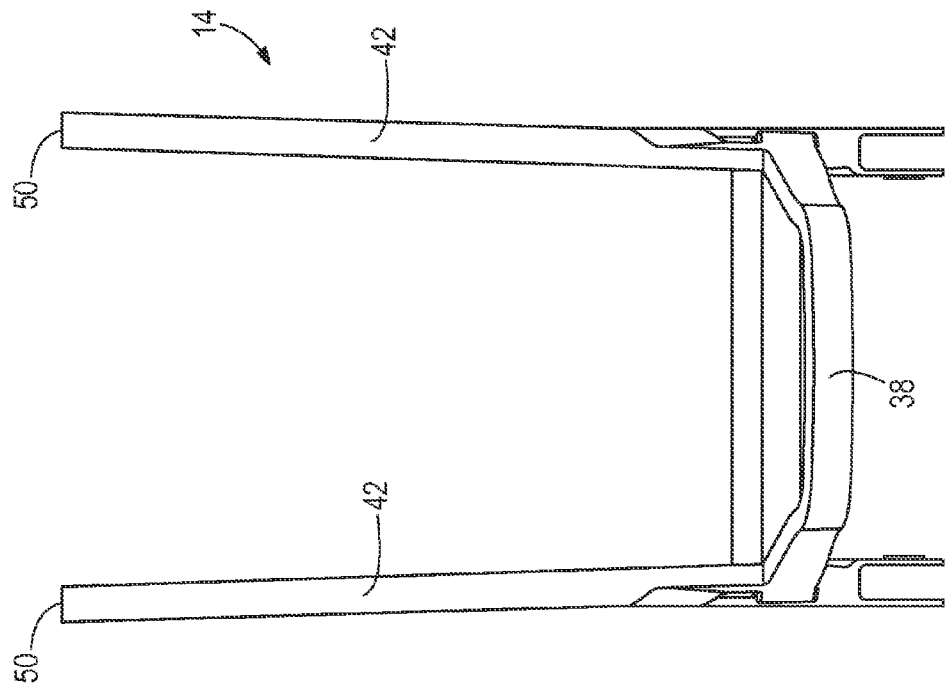
FIG. 4 is a front view of the frame of FIG. 3.
Figure 3:
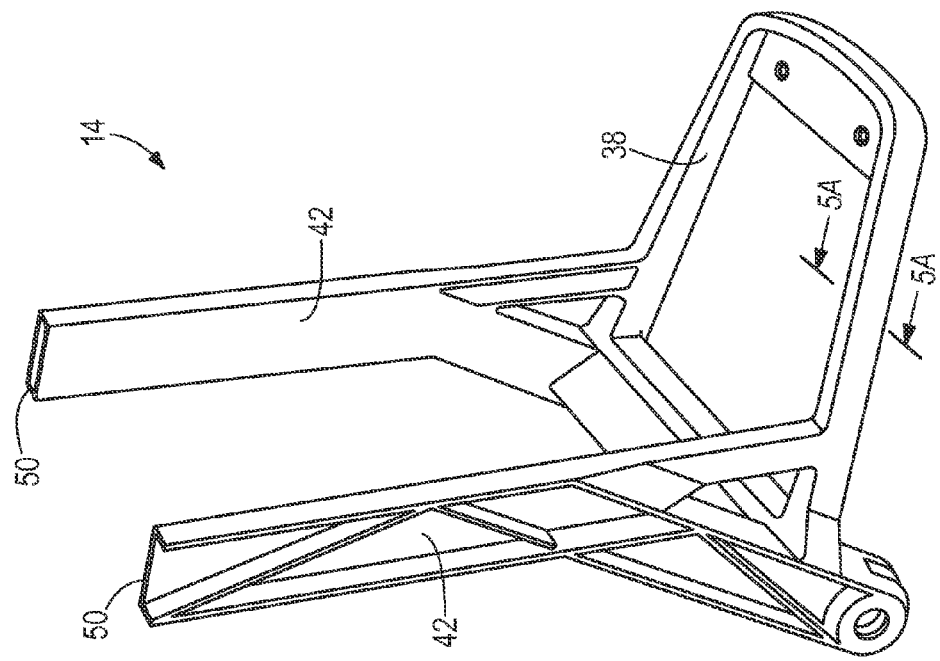
FIG. 3 is a perspective view of a frame.

FIG. 1 discloses a shopping cart 10. The shopping cart 10 includes a frame 14, a basket assembly 18, a handle 22, a rear gate 26, a lower tray 30, and multiple wheels 34 supporting the frame 14 for movement over the ground. In the embodiment shown in FIGS. 1-4, the frame 14 forms a U-shaped member including a base 38, uprights or arms 42 extending upwardly from the base 38, and a cover 46 connected to each arm 42. As best shown in FIG. 4, each arm 42 includes an upper end 50 positioned away from the base 38. The arms 42 taper inwardly from the upper ends 50, such that the distance between the arms 42 proximate the base 38 is less than the distance between the upper ends 50 of the arms 42. The cart 10 defines a front end 52, a rear end 54 opposite the front end 52, and a horizontal cart axis 56 extending between the front end 52 and the rear end 54. As used herein, the term "rearward" refers to a direction that extends toward the rear end 54, and the term "forward" refers to a direction that extends toward a front end 52.

Figure 5A:
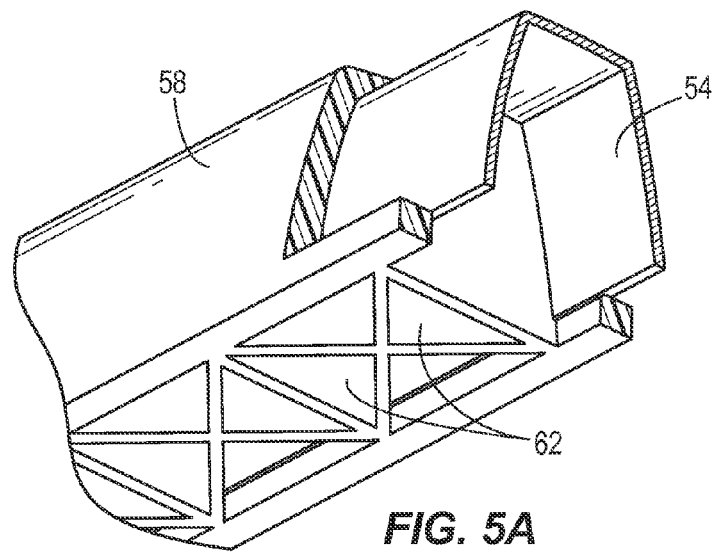
FIG. 5A is a perspective view of a cross-section of the frame of FIG. 4 taken along line 5A-5A.
Figure 5B:
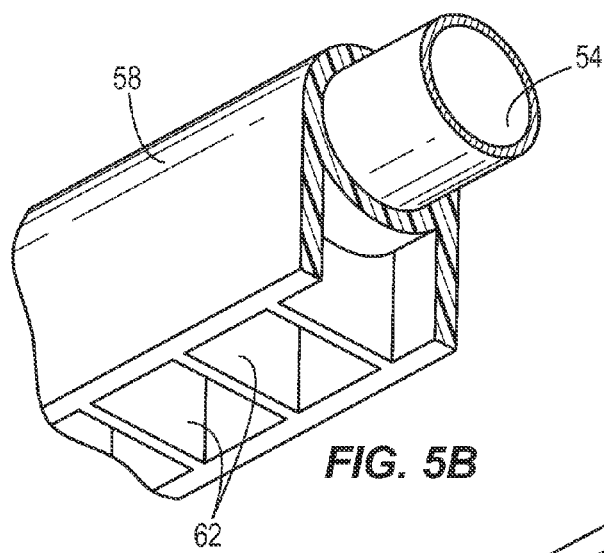
FIG. 5B is a perspective view of a cross-section of the frame of FIG. 4 according to another embodiment.
Figure 5C:
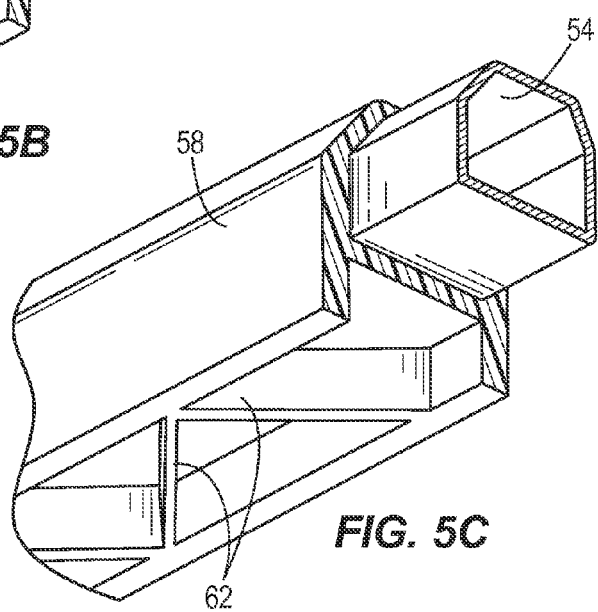
FIG. 5C is a perspective view of a cross-section of the frame of FIG. 4 according to another embodiment.

The frame 14 is formed by a combination of over-molding and gas-assist plastic forming processes. As shown in FIG. 5A, a substrate 58 such as a piece of metal is over-molded by plastic material 60. Although the substrate 58 in FIG. 5A has a cross-section that is U-shaped, the substrate 58 can be formed into various other shapes, including a round tube (FIG. 5B) or an enclosed piece that is partially hexagonal and partially rectangular (FIG. 5C). In the illustrated embodiments, the plastic material 60 near the substrate 58 is molded as a lattice structure having ribs 62 for increased rigidity. In one embodiment, the substrate 58 is made from steel, although in other embodiments the substrate could be made from another material. The plastic material 60 may include any type of injection-molded plastic. The gas-assist process creates at least one hollow cavity (not shown) in the plastic material 60. This combination process yields a frame 14 that is both strong and low weight. The substrate 58 and the geometric relationship between the substrate 58 and the plastic 60 increases rigidity over a simple injection-molded plastic. The combination process satisfies the load and durability standards, is less expensive than conventional glass-filled nylon processes, and provides a frame 14 having a lower density than the glass-filled nylon frames. In one embodiment, a frame 14 made using the combination process costs about $0.60 per pound and has a lower density, whereas a frame made from glass-filled nylon costs about $2 per pound and has a higher density.

Figure 2:
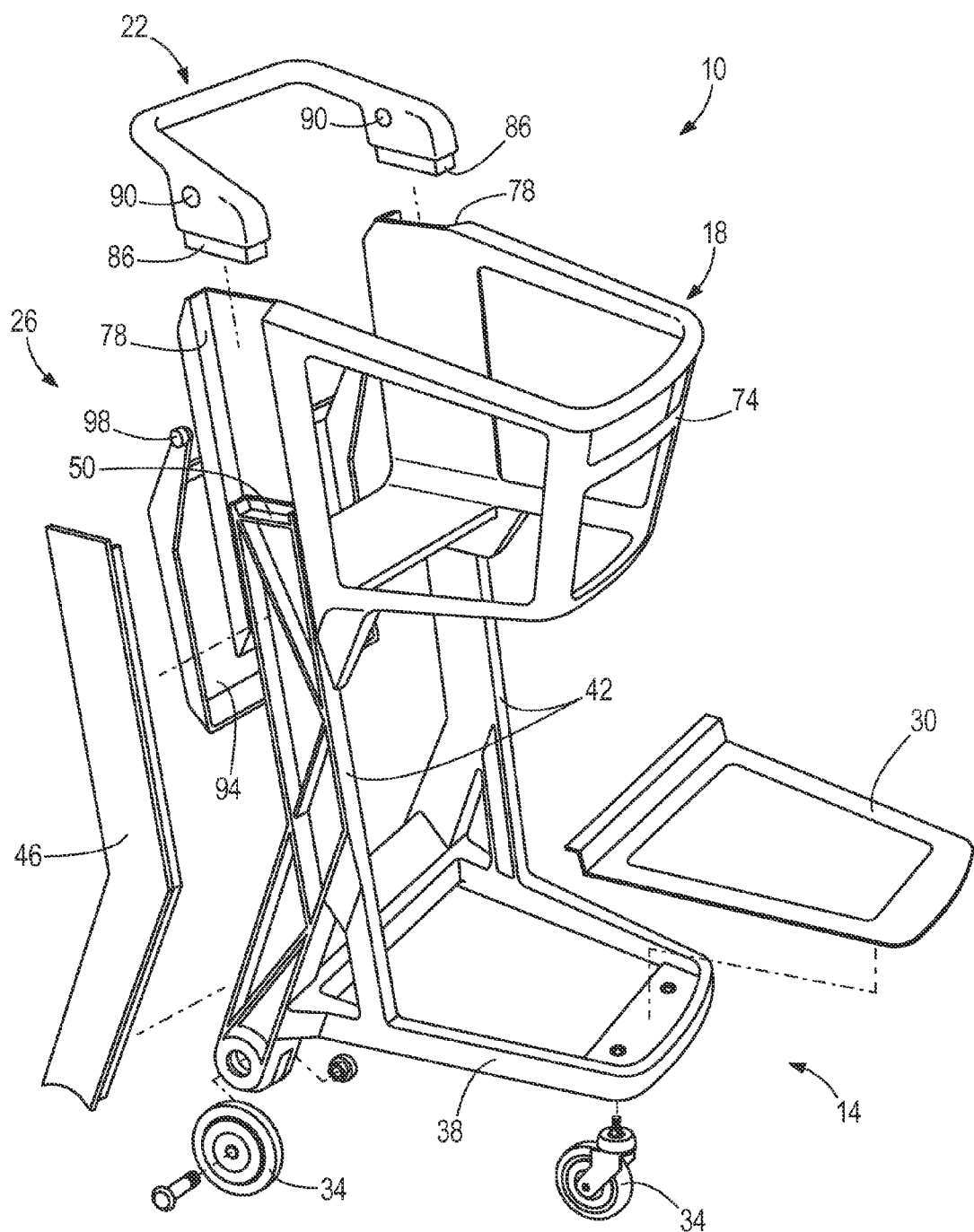
FIG. 2 is an exploded view of the shopping cart of FIG. 1.
Figure 12:
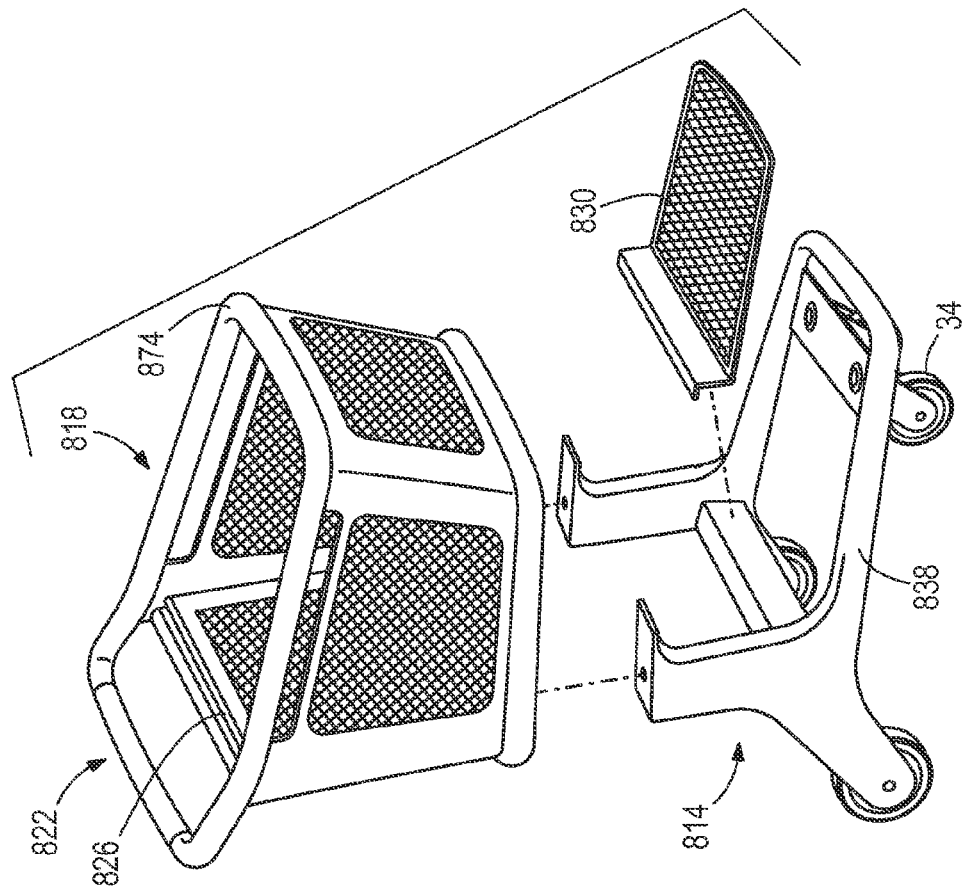
FIG. 12 is a perspective view of a shopping cart according to another embodiment.

Referring to FIG. 2, the basket assembly 18 is removably coupled to the frame 14 and includes a basket frame 74 and a pair of slots 78 on either side of the basket frame 74. The slots 78 receive the upper ends 50 of the arms 42. The walls and bottom surface of the basket assembly 18 have been removed for purposes of clarity; the basket assembly 18 also includes basket walls similar to those shown in FIGS. 12-13 and FIG. 22. The basket assembly 18 is moved onto the arms 42 and slides down along the arms 42 until the basket assembly 18 reaches a predetermined position. In the illustrated embodiment, the predetermined position is the point at which the slots 78 engage the arms 42 in an interference fit due to the inward taper of the arms 42. In other embodiments, the predetermined position may be defined by a detent that locks the basket assembly 18 in place relative to the arms 42, or the basket assembly 18 may be secured relative to the arms 42 by fasteners.

Referring to FIGS. 1 and 2, the handle 22 includes a generally U-shaped member having two ends 86 that are adapted to engage the upper ends 50 of the arms 42. After the basket assembly 18 is secured relative to the frame 14, the handle 22 is coupled to the upper ends 50 of the arms 42, further locking the basket assembly 18 in position. The handle 22 also includes a pair of openings 90 (FIG. 2), each of which is positioned proximate one of the handle ends 86. In the illustrated embodiment, the handle ends 86 are secured to the arms 42 by a snap fit or interference fit.

Figure 7A:
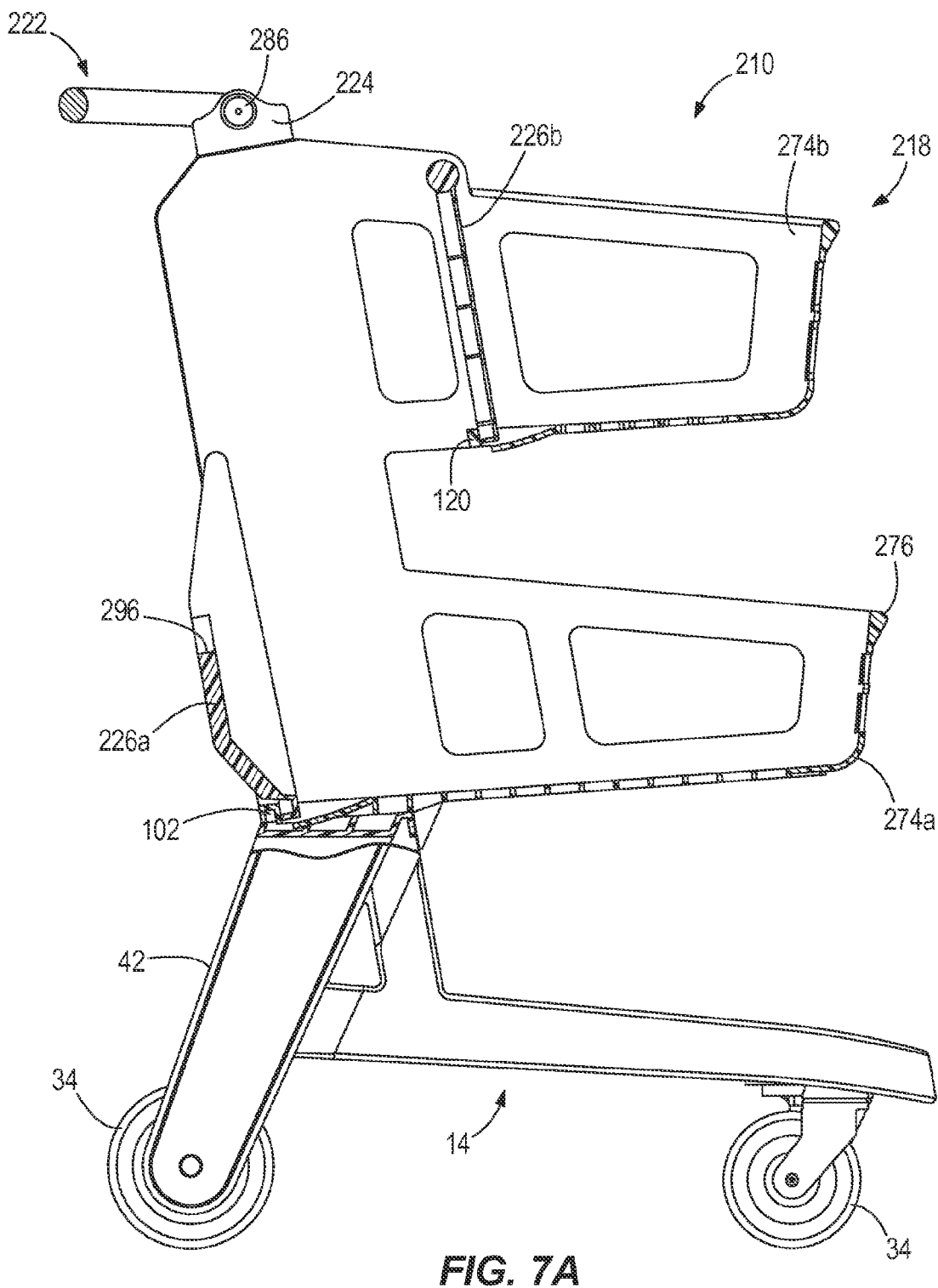
FIG. 7A is a cross-section view of the shopping cart of FIG. 6 taken along line 7A-7A.

The rear gate 26 includes a wall 94 and a pair of gate arms 98 and is positioned proximate the rearward end of the cart 10. The gate arms 98 are positioned on opposite edges of the wall 94 and extends away from the wall 94. In the embodiment shown in FIGS. 1 and 2, each gate arm 98 is positioned within one of the openings 90 on the handle 22. The rear gate 26 is thus pivotably coupled to the handle 22 and pivots about a gate axis 100 transverse to the cart axis 56. When a second cart (not shown) is pushed into the rear of the shopping cart 10, the rear gate 26 pivots upwardly, toward the front of the basket assembly 18 in order to enable the basket assembly of the second cart to nest within the basket assembly 18. In other embodiments, the gate arms 98 may engage openings positioned on the basket assembly 18. The rear gate 26 engages a stop 102 (FIG. 7A) positioned on the basket assembly 18 to prevent the rear gate 26 from pivoting beyond the rearward end of the basket frame 74, i.e., to limit pivoting of the rear gate 26 in a clockwise direction as shown in FIG. 7A.

The frame 14 is capable of supporting multiple types of basket assemblies 18. For example, in an alternative embodiment shown in FIGS. 6-8, a second basket assembly 218 includes multiple basket frames 274 having different sizes and characteristics from the first basket assembly 18. The basket assembly of FIGS. 6-8 includes a first or lower basket 274a and a second or upper basket 274b. In addition, the handle 222 is pivotably coupled to blocks 224 that are coupled to the arms 242. In the illustrated embodiment, the handle 222 is formed as a U-shaped member that is pivotably coupled to the cart 10 at each end 286. The handle 222 is pivotable about a handle axis 228 (FIG. 7B) transverse to the cart axis 256. In other embodiments, the handle 222 may be coupled to the basket assembly 218 or the handle axis 228 may be oriented in a different direction.

Figure 7B:
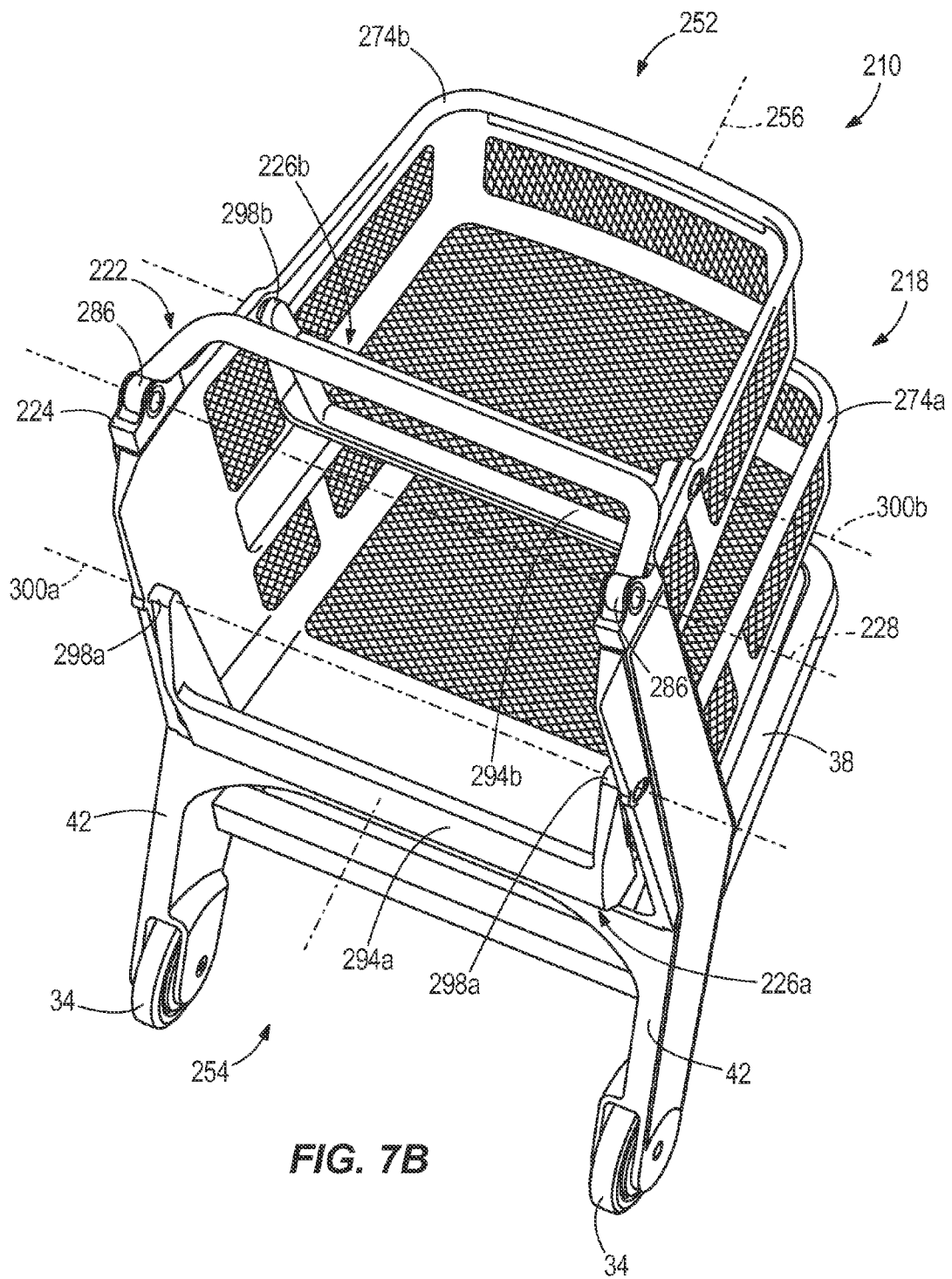
FIG. 7B is a rear perspective view of the shopping cart of FIG. 6.
Figure 8:
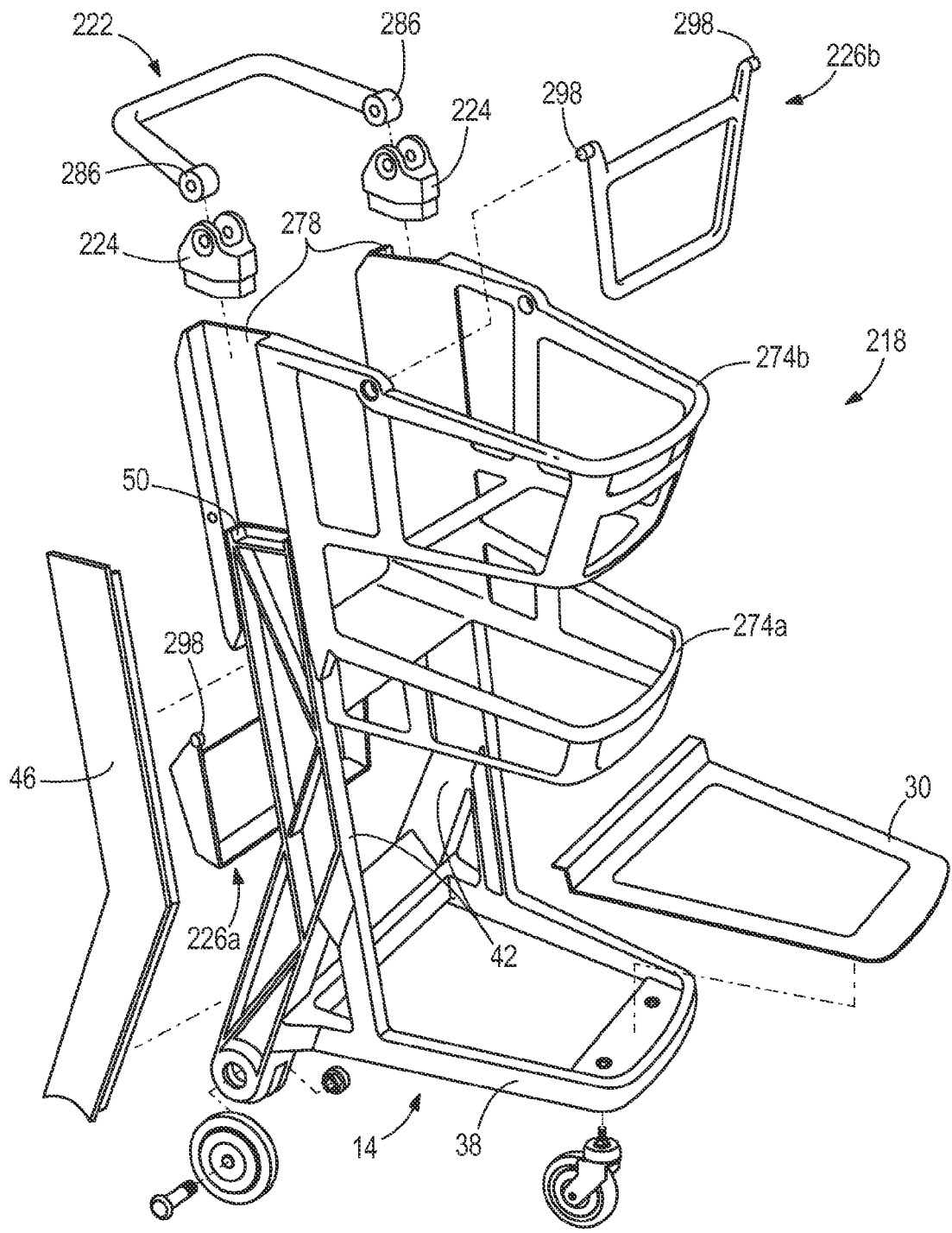
FIG. 8 is an exploded view of the shopping cart of FIG. 6.

Referring to FIG. 7B, the upper basket 274b is substantially above the lower basket 274a. The lower basket 274a includes a first or lower gate 226a proximate the rear end 254 of the cart 210. The lower gate 226a is pivotable about a lower gate axis 300a transverse to the cart axis 256 between a raised position and a lowered position. The lower gate 226a is similar to the rear gate 26 described above with respect to FIGS. 1 and 2. The lower gate 226a includes a wall 294a and a pair of arms 298a for coupling the lower gate 226a to the lower basket 274a. The wall 294a extends across the rearward end of the lower basket 274a when the lower gate 226a is in the lowered position. As shown in FIG. 7A, the wall 294a has an upper end 296 below an upper end 276 of the lower basket 274a when the lower gate 226a is in the lowered position.

As shown in FIG. 7B, the upper basket 274b includes a second or upper gate 226b proximate the rear end 254 of the cart 210. The upper gate 226b is pivotable about an upper gate axis 300b transverse to the cart axis 256 between a raised position and a lowered position. The upper gate 226b includes a wall 294b (FIG. 7B) and a pair of arms 298b for coupling the upper gate 226b to the upper basket 274b. The wall 294b extends across a rearward end of the upper basket 274b when the upper gate 226b is in a lowered position. Both the lower gate 226a and the upper gate 226b pivot upwardly toward the front of each basket 274a, 274b to allow the lower basket 274a and the upper basket 274b to receive a lower basket and upper basket, respectively, of another cart (not shown). The stops 102 (FIG. 7A) prevent the gates 226a, 226b from pivoting backward beyond the rearward end of each basket 274a, 274b.

The lower basket 274a is configured to be loaded from the rear. As best illustrated in FIGS. 7A and 7B, the lower basket 274a is positioned partially behind the upper basket 274b, enabling a user to load and unload the lower basket 274a from behind the cart 210 and beneath the handle 222. Stated another way, a rearward end of the upper basket 274b is positioned forward of a rearward end of the lower basket 274a to provide easy access to the contents of the lower basket 274a from the rear of the cart 210. In addition, because the upper end 296 of the wall 294a is below the upper end 276 of the lower basket 274a when the lower gate 226a is in the lowered position, it is easier for a user to load and unload the lower basket 274a.

Figure 6:
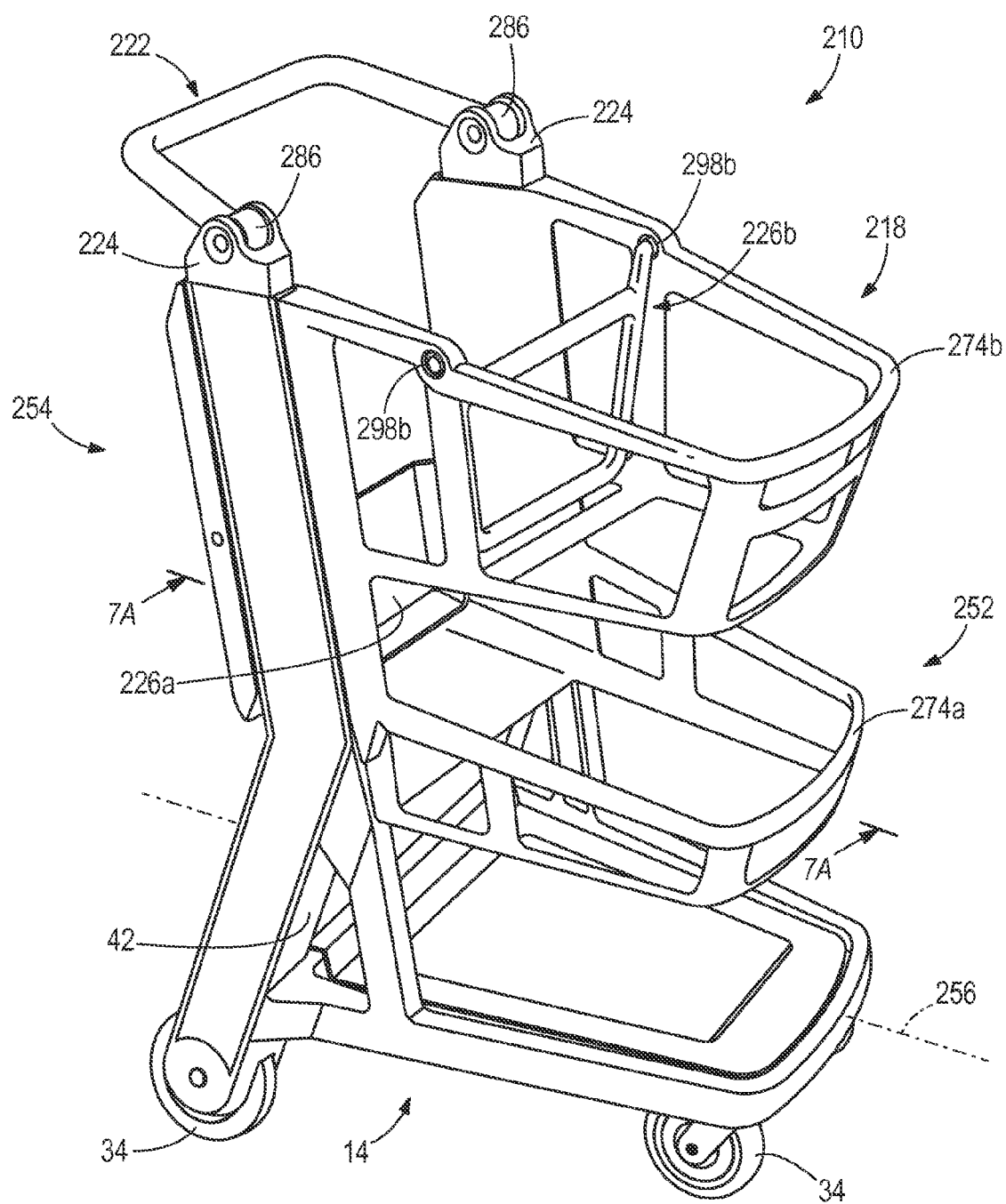
FIG. 6 is a perspective view of a shopping cart according to another embodiment.

The handle 222 is moveable about the handle axis 228 between at least a first or rear position (FIG. 6) and a second or forward position (FIG. 7A). As shown in FIG. 6, in the rear position the handle 222 extends toward the rear end 254 of the cart 210. This configuration allows the user to push the cart 210 with the handle 222. Referring to FIG. 7B, in the forward position the handle 222 extends toward the front end 252 of the cart 210. In the forward position, the handle 222 is substantially aligned with the upper gate 226b (see FIG. 7B) and forward of the rearward end of the lower basket 274a. This position of the handle 222 improves access to the lower basket 274a, allowing the user to more easily load or unload the lower basket 274a from the rear. The frame 14 is configured to support many types of basket assemblies 18, so the manufacturer can select a basket assembly 18 from multiple types of basket assemblies 18 in order to customize the cart 10 as necessary. This reduces the need to manufacture many types of carts 10 individually, instead providing a modular approach for manufacturing the carts 10 from similar parts.

Figure 9:
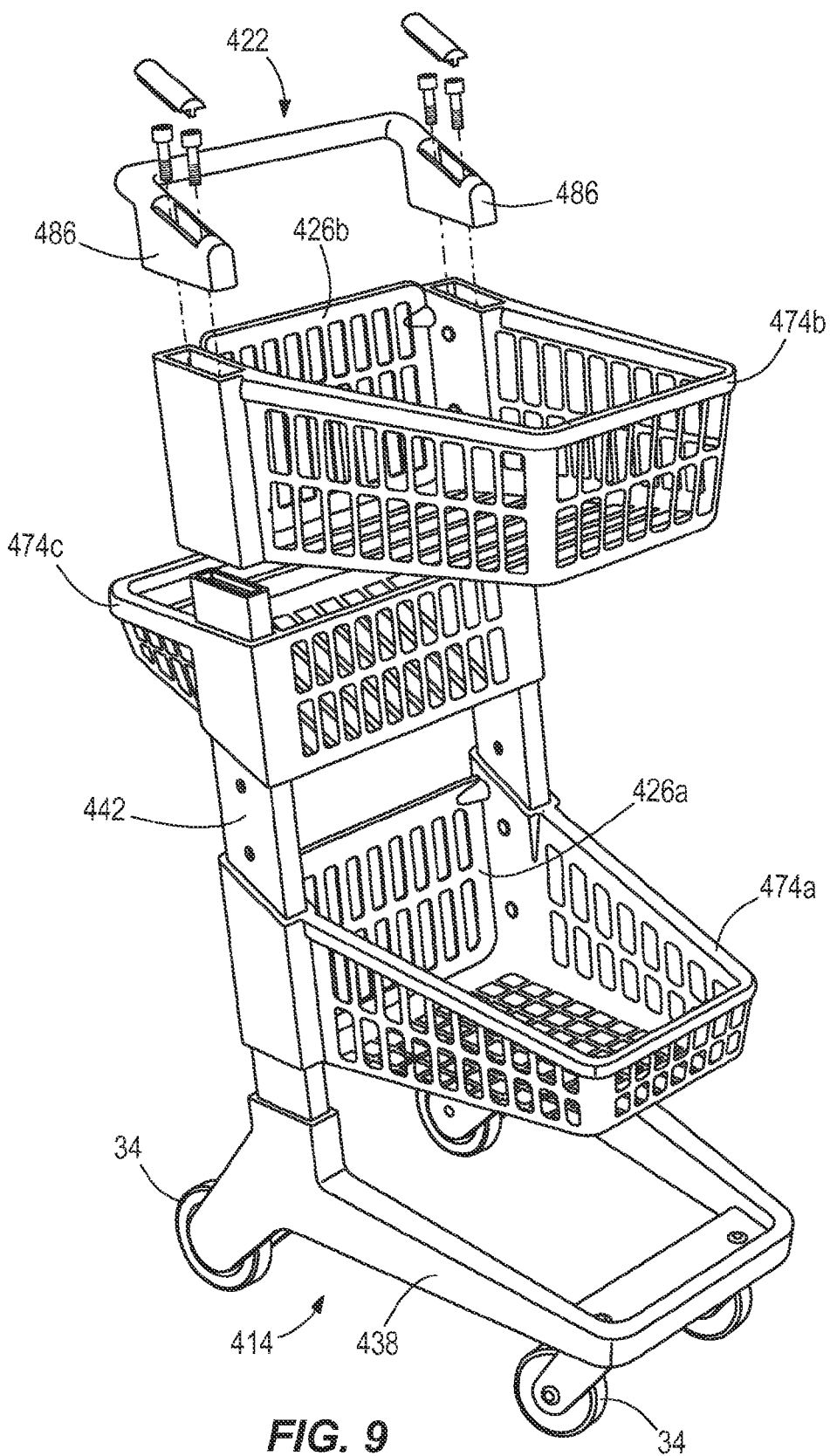
FIG. 9 is an exploded view of a shopping cart according to another embodiment.
Figure 10:
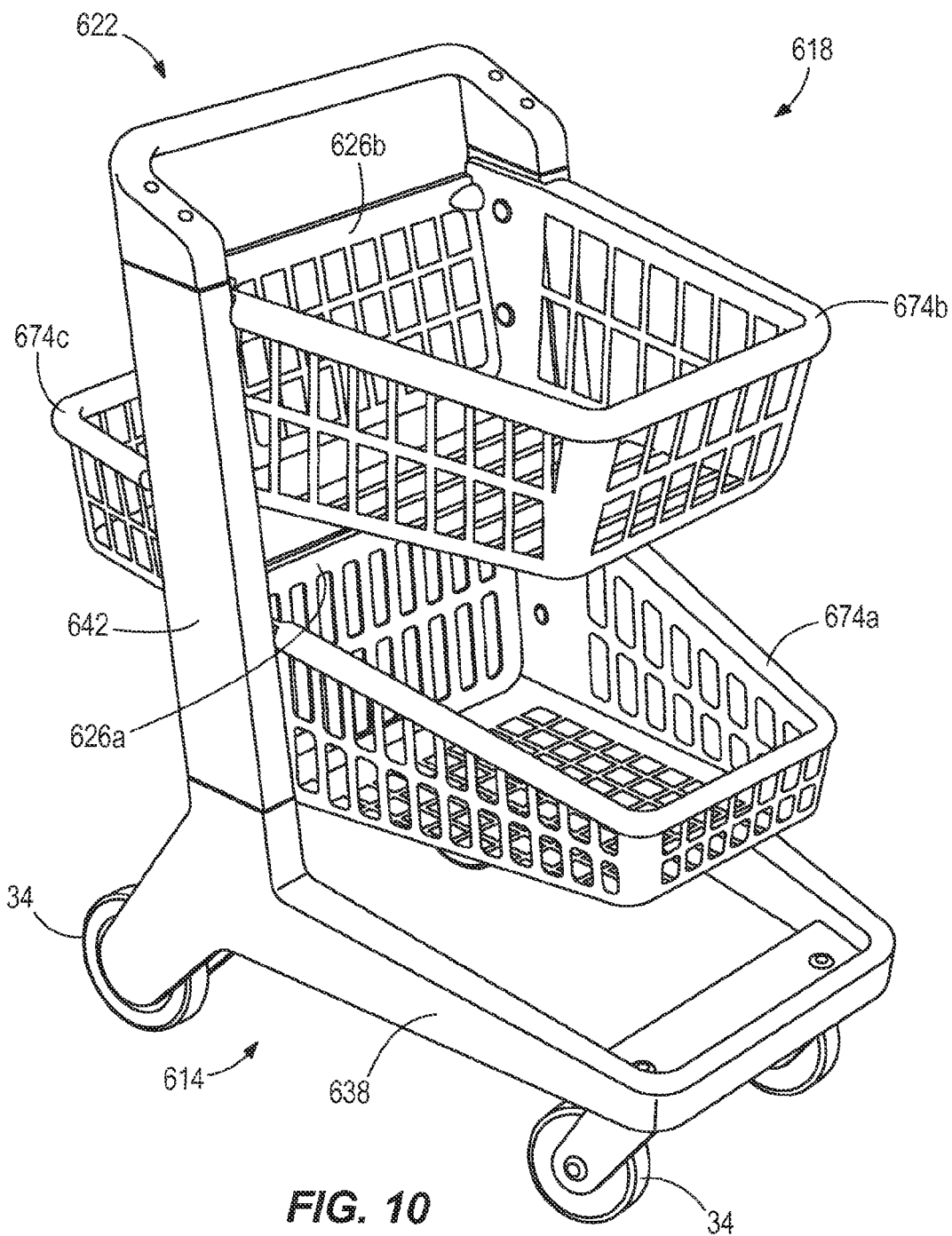
FIG. 10 is a perspective view of a shopping cart according to another embodiment.
Figure 11:
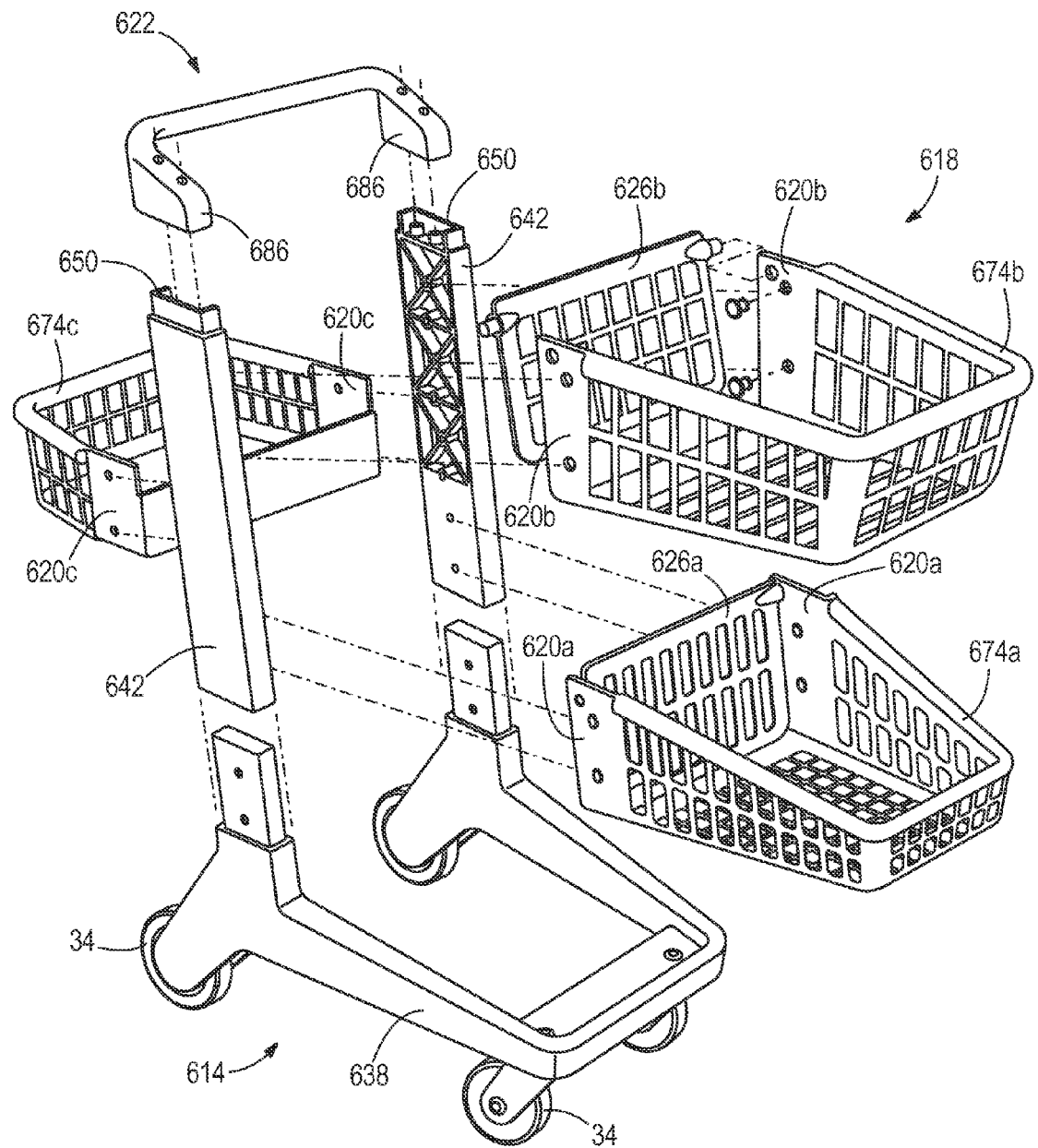
FIG. 11 is an exploded view of the shopping cart of FIG. 10.
Figure 13:
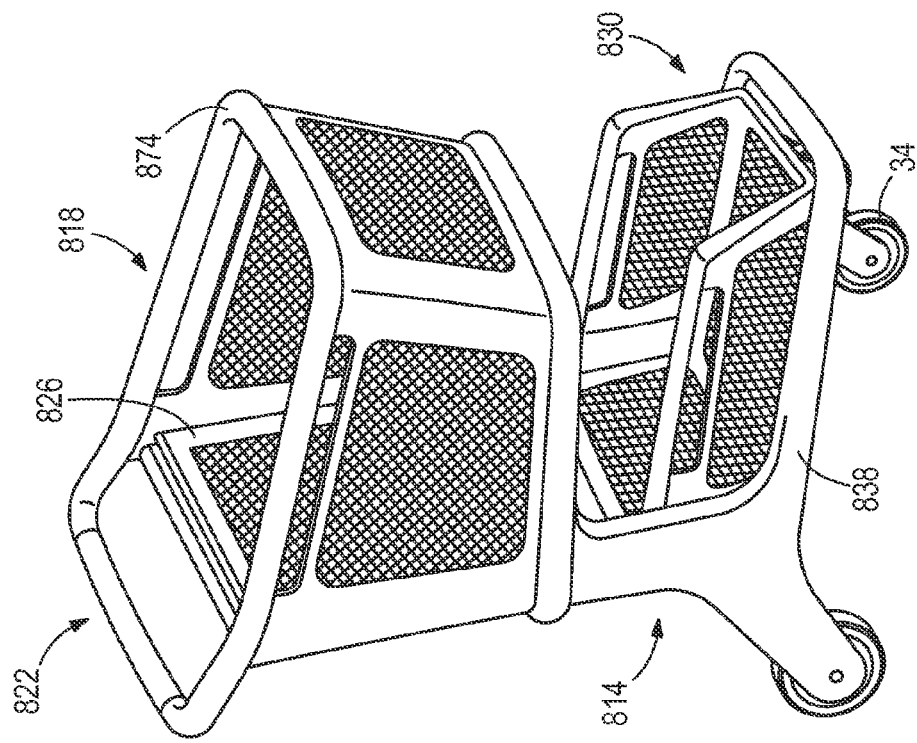
FIG. 13 is a perspective view of a shopping cart according to another embodiment.
Figure 14:
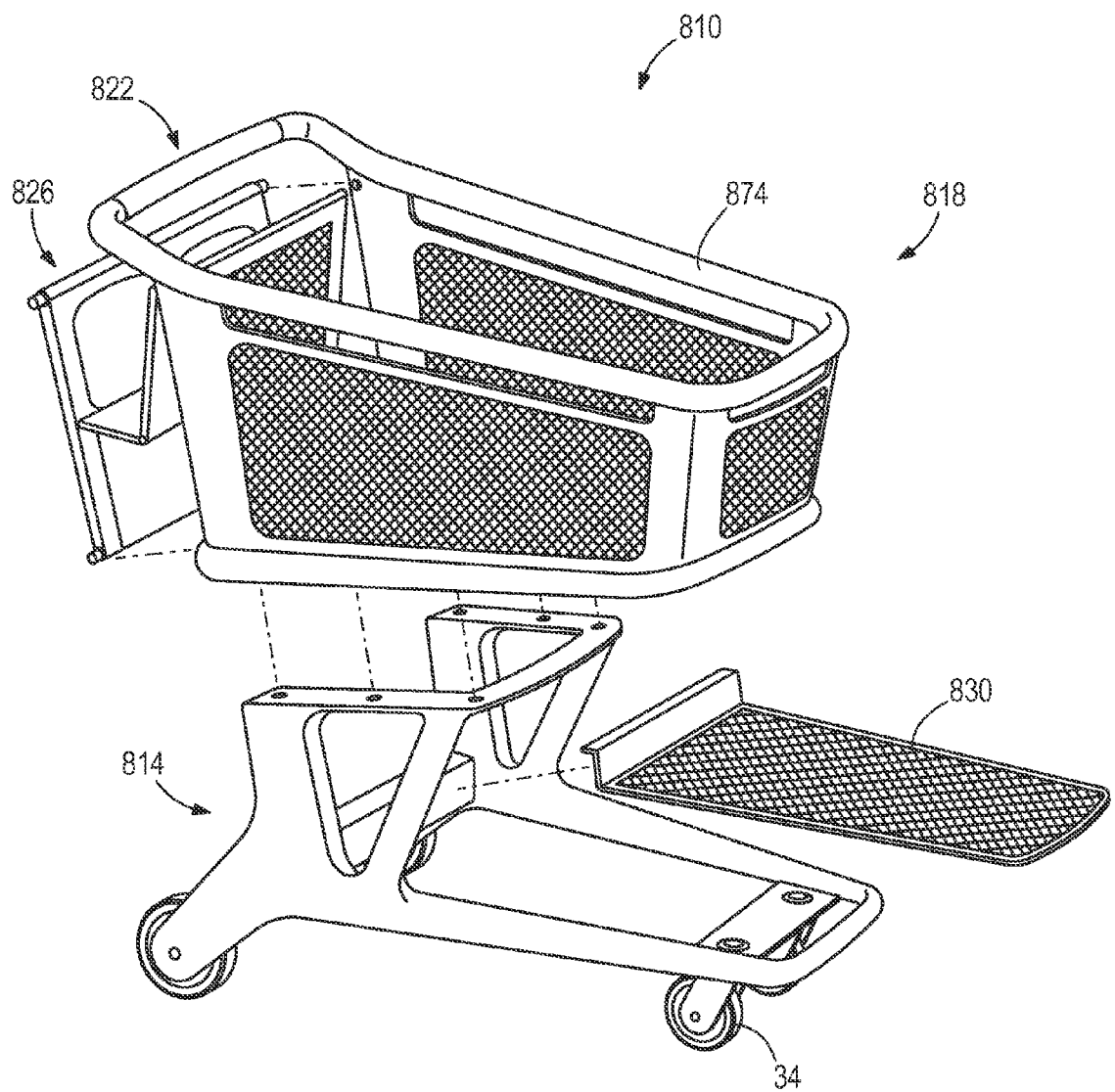
FIG. 14 is a perspective view of a shopping cart according to another embodiment.
Figure 19:
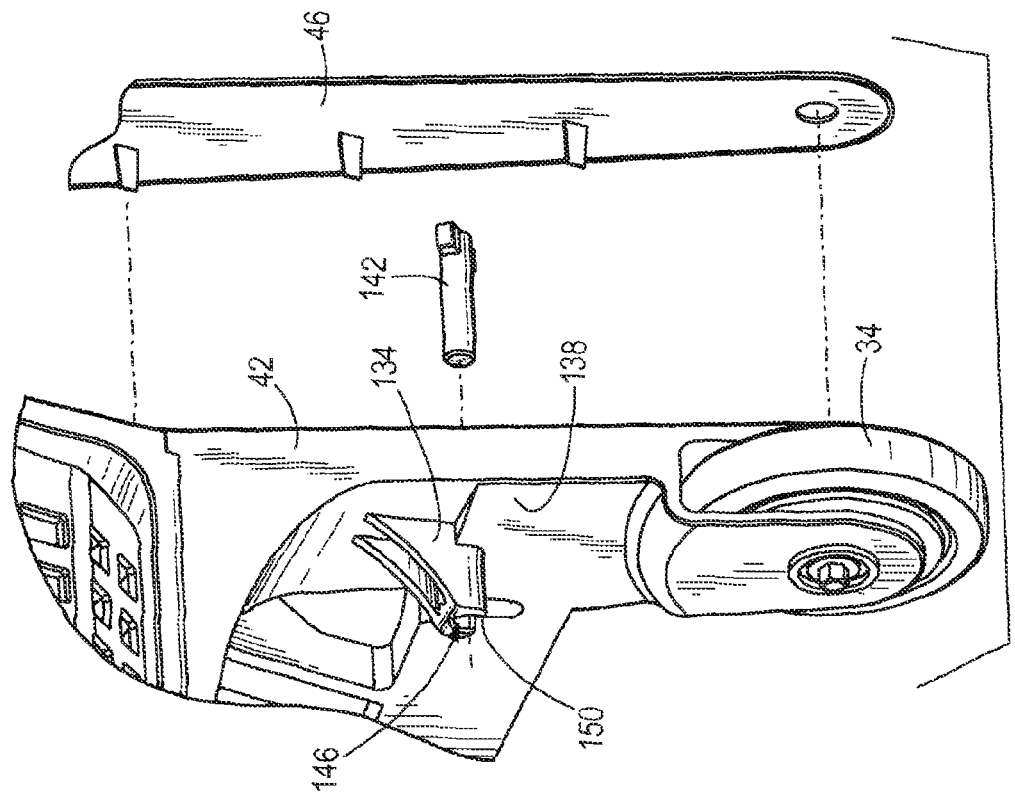
FIG. 19 is an exploded view of the caster lifting mechanism of FIG. 18.
Figure 18:
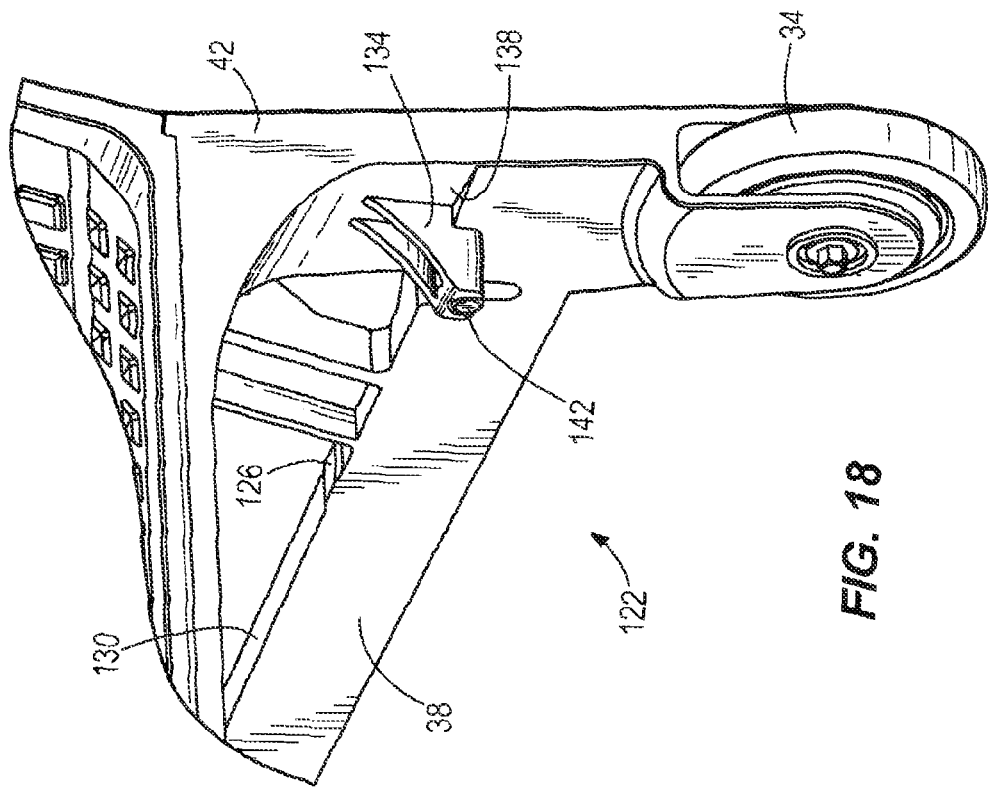
FIG. 18 is a perspective view of a caster lifting mechanism.
Figure 20:
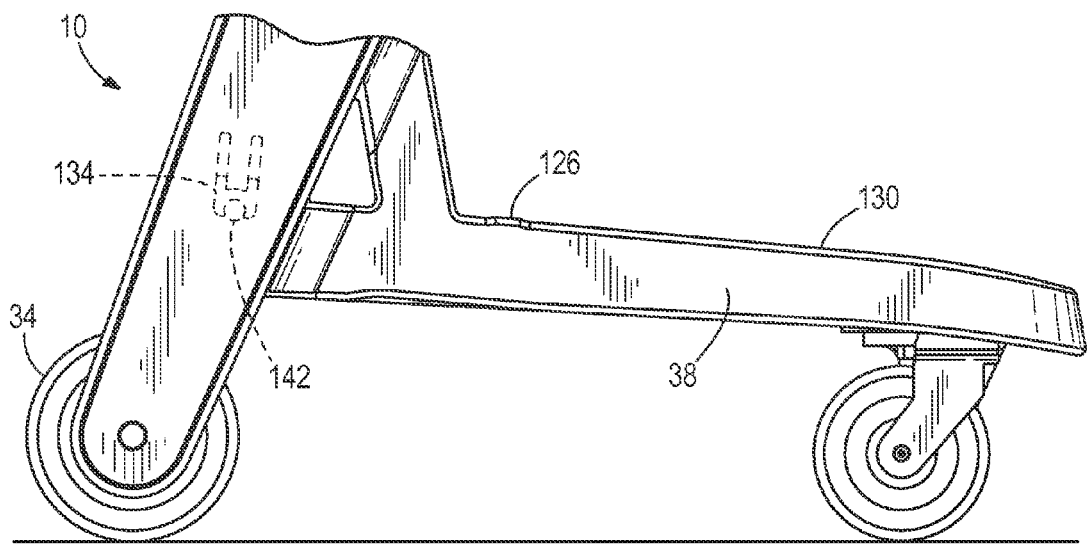
FIG. 20 is a partial side view of a shopping cart.

In other embodiments, shown in FIG. 9, multiple basket assemblies 418 may be positioned on the arms 442, including one or more rear-facing baskets 474c. In this embodiment, the handle 422 includes ends 486 that are coupled to the arms 442 by fasteners such as bolts. Alternatively, as shown in FIGS. 10-11, the arms 642 can be removably received on the frame 614, and the basket assemblies 618 include brackets 620 for coupling each basket assembly 618 to the arms 642. The bracket 620 can be secured to the arms 642 by a snap fit or by fasteners. The alternative embodiments of FIGS. 12-14 also illustrate that the basket assembly 818 can be directly fastened to the frame 814, and the handle 822 may be formed integrally with the basket assembly 818 or the frame 814. In addition, FIG. 13 shows a cart 810 in which the lower tray 830 includes an open-ended basket.

As shown in FIGS. 15-17, the frame 14 is formed in a mold 106. The mold includes a removable first module or insert 110. In the illustrated embodiment, the first insert 110 forms a portion of the frame base 38. The first insert 110 may be removed from the mold 106 and replaced with a second insert 114 that forms the same portion of the base 38, but the portion of the base 38 has a shorter dimension than the portion that is formed by the first insert 110. In other embodiments, the second insert 114 could provide a different shape for the portion of the base 38. In still other embodiments, the inserts 110, 114 could form a different portion of the frame 14 or another component of the cart 10. The removable inserts 110, 114 enable the operator to readily customize the size and shape of the manufactured frame 14 by changing the configuration of the mold 106. Because the mold 106 is capable of producing various frame configurations, the forming process requires only a single large mold 106 with several smaller inserts like the first insert 110 and second insert 114, rather than multiple large molds for each desired configuration. In this way, tooling costs are reduced.

Figure 21:
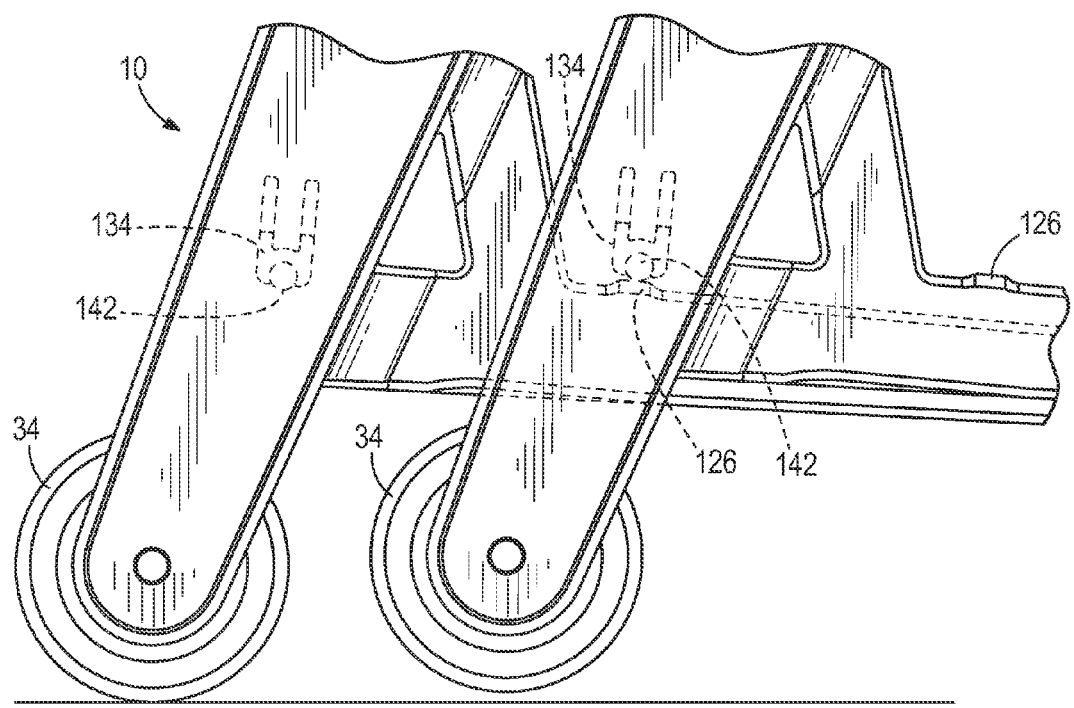
FIG. 21 is a partial side view of a pair of shopping carts nested together.

As shown in FIGS. 18-21, the frame 14 also includes a caster lift mechanism 122 to raise the wheels 34 when the cart 10 is nested or stacked with another cart. The caster lift mechanism 122 includes a ridge 126 formed on an upper surface 130 of the base 38, a housing 134 formed on an inside surface 138 of at least one of the arms 42, and an insert 142 (FIG. 19) positioned within the housing 134 and behind the cover 46. In one embodiment, the insert 142 is made of a wear-resistant plastic material. In the illustrated embodiment the housing 134 extends inwardly or toward the center of the base 38 and forms a cylindrical recess 146. The recess 146 is open at the inner end of the housing 134 and the housing 134 has a longitudinal slot 150 communicating with the bottom of the recess 146. The insert 142 is cylindrical and is inserted into the inner end of the recess 146 such that the lower portion of the insert 142 extends through the slot 150. Referring to FIG. 21, when a second cart is nested into the rear of a first cart 10, the insert 142 from the first cart 10 engages the ridge 126 and causes the rear of the first cart 10 to lift away from the ground. Lifting the rear end of the cart 10 insures that the rear wheels 34 do not contact the ground, thereby reducing the friction between the nested carts 10 and the ground. This reduced contact makes it easier for the nested carts 10 to be pushed and maneuvered together. Over time, the repeated engagement between the ridge 126 and the insert 142 will cause the insert 142 to wear down. The insert 142 provides a replaceable wear surface such that once the insert 142 wears down to a predetermined point, the user can replace the insert 142 to extend the working life of the caster lift mechanism 122.

Figure 22:
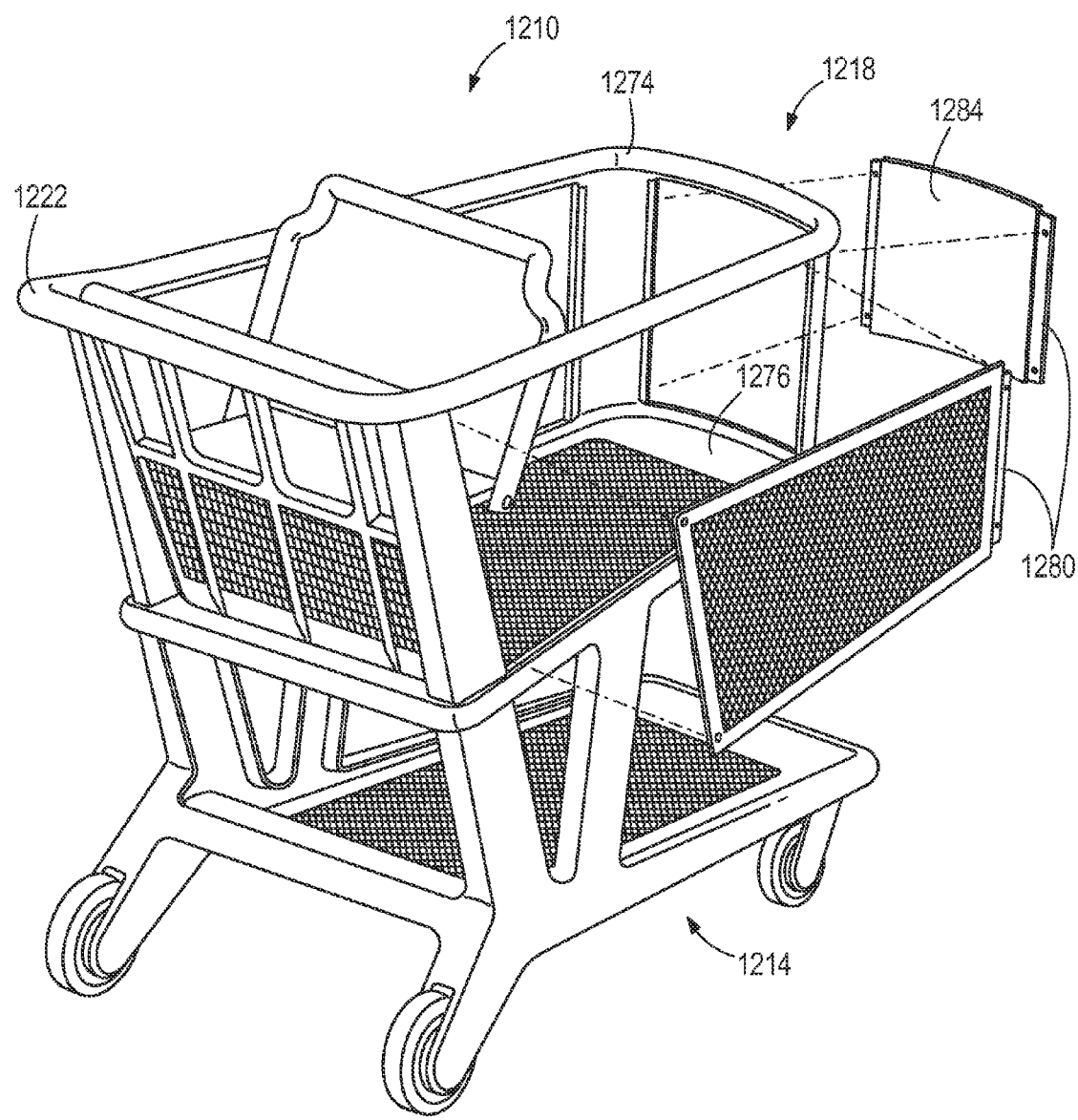
FIG. 22 is an exploded view of a shopping cart according to another embodiment.

In an alternative embodiment, shown in FIG. 22, the cart 1210 includes a basket frame 1274, a bottom surface 1276, and multiple walls 1280. The basket frame 1274 is configured to support multiple types of basket walls 1280 that can be removably coupled to the basket frame 1274. In one embodiment, the basket frame 1274 is molded separately from the walls 1280, and the walls 1280 are coupled to the basket frame 1274 by a snap fit. In other embodiments the walls 1280 are coupled by fasteners. The basket frame 1274 is configured to support many types of basket walls 1280, so the manufacturer can select a basket wall 1280 from many basket wall types in order to customize the cart as necessary. For instance, various walls 1280 may define different mesh patterns or wall cross-sections. This reduces the need to manufacture many types of baskets individually. Instead, the manufacturer can create the same basic frame 1274 and then select a particular wall 1280, thereby implementing a modular approach to manufacturing the basket frames 1274 from similar parts.

Figure 23A:
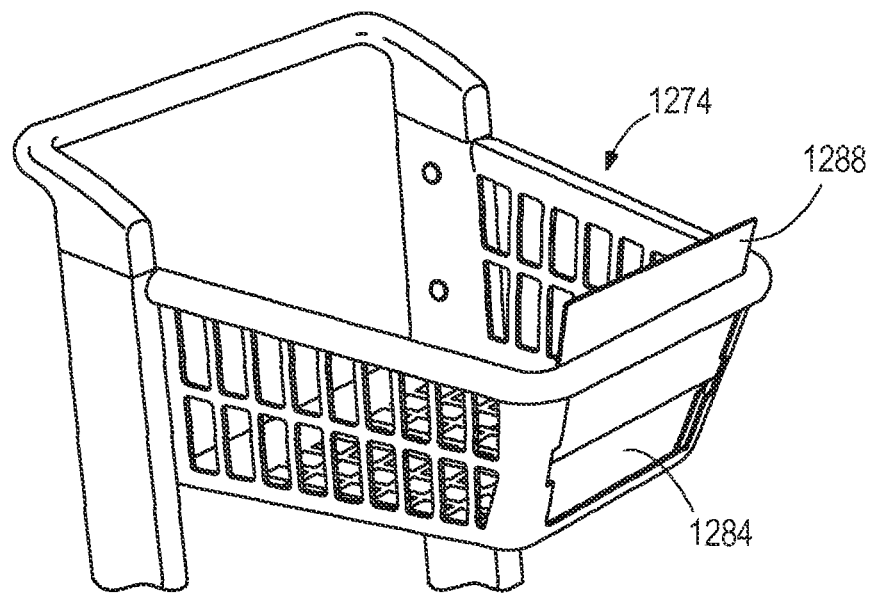
FIG. 23A is a perspective view of a shopping cart basket including a billboard panel.
Figure 23B:
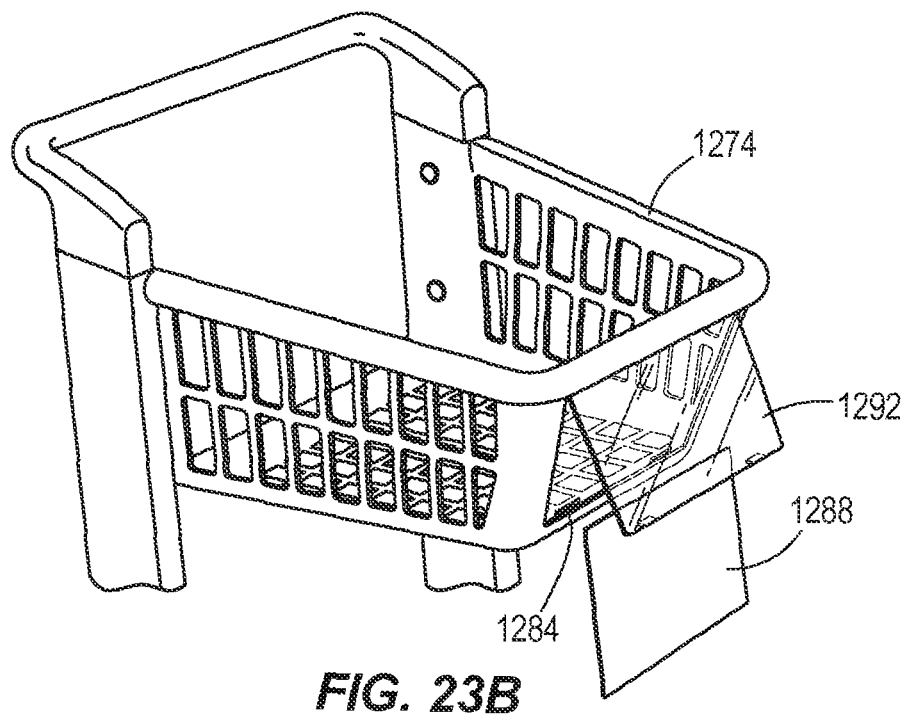
FIG. 23B is a perspective view of a shopping cart basket including a billboard panel according to another embodiment.
Figure 23C:
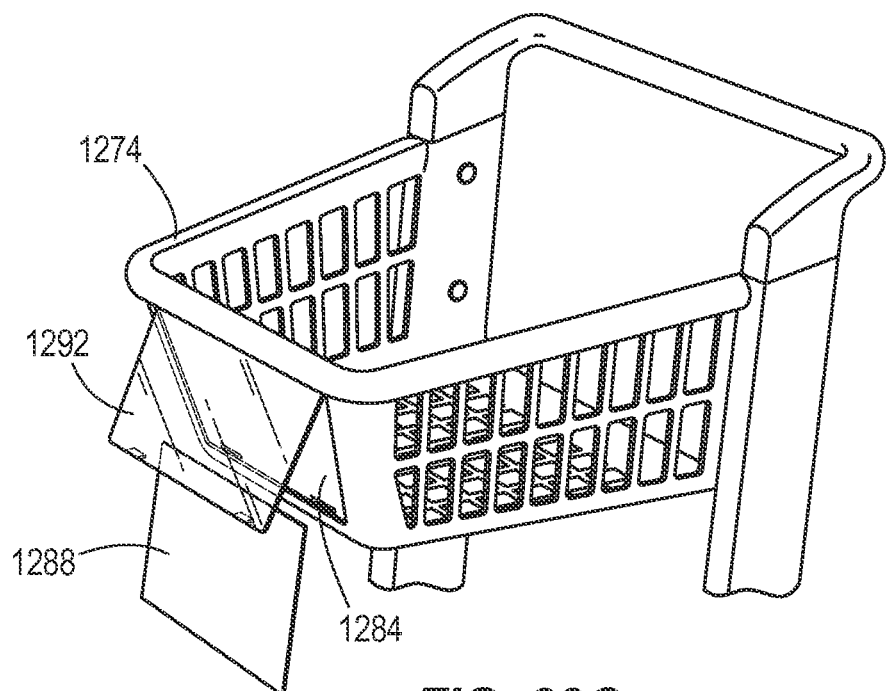
FIG. 23C is a perspective view of a shopping cart basket including a billboard panel according to another embodiment.
Figure 23D:
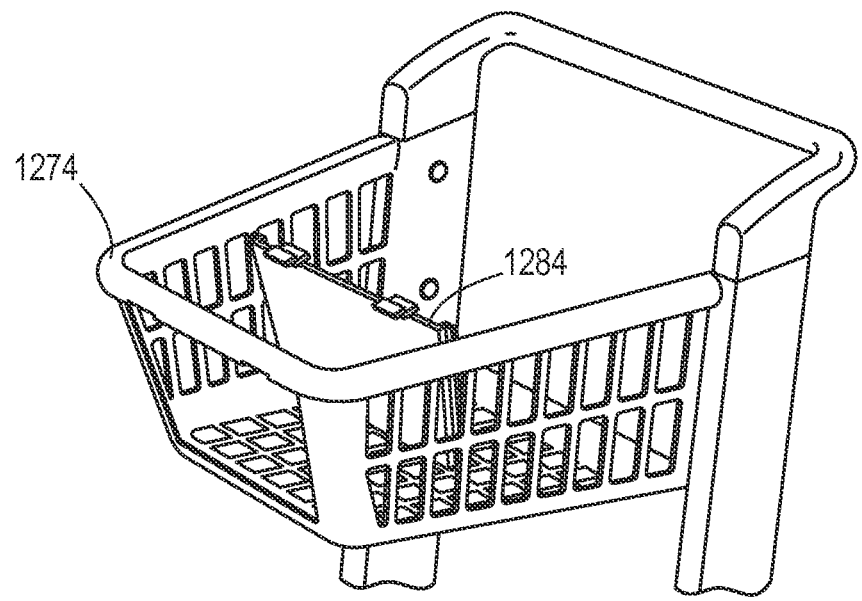
FIG. 23D is a perspective view of a shopping cart basket including a billboard panel according to another embodiment.

The wall 1280 of the basket frame 1274 may also include one or more billboard panels 1284 for displaying graphics or other information. The panels 1284 can be molded with an in-mold graphic foil 1288 (FIG. 23) and changed as desired (for example, seasonally). FIGS. 23A-23D provide various examples of billboard panels 1284. As shown in FIG. 23A, the graphic foil 1288 may be slidably received through the basket frame 1274 and positioned within the billboard panel 1284. Alternatively, FIGS. 23B and 23C show that the panel 1284 may include a transparent window 1292 that is pivotable relative to the basket frame 1274 to allow the graphic foil 1288 to be positioned behind the window 1292. The panel 1284 may also be removably fitted within the basket frame 1274, as shown in FIG. 23D.

Figure 24:
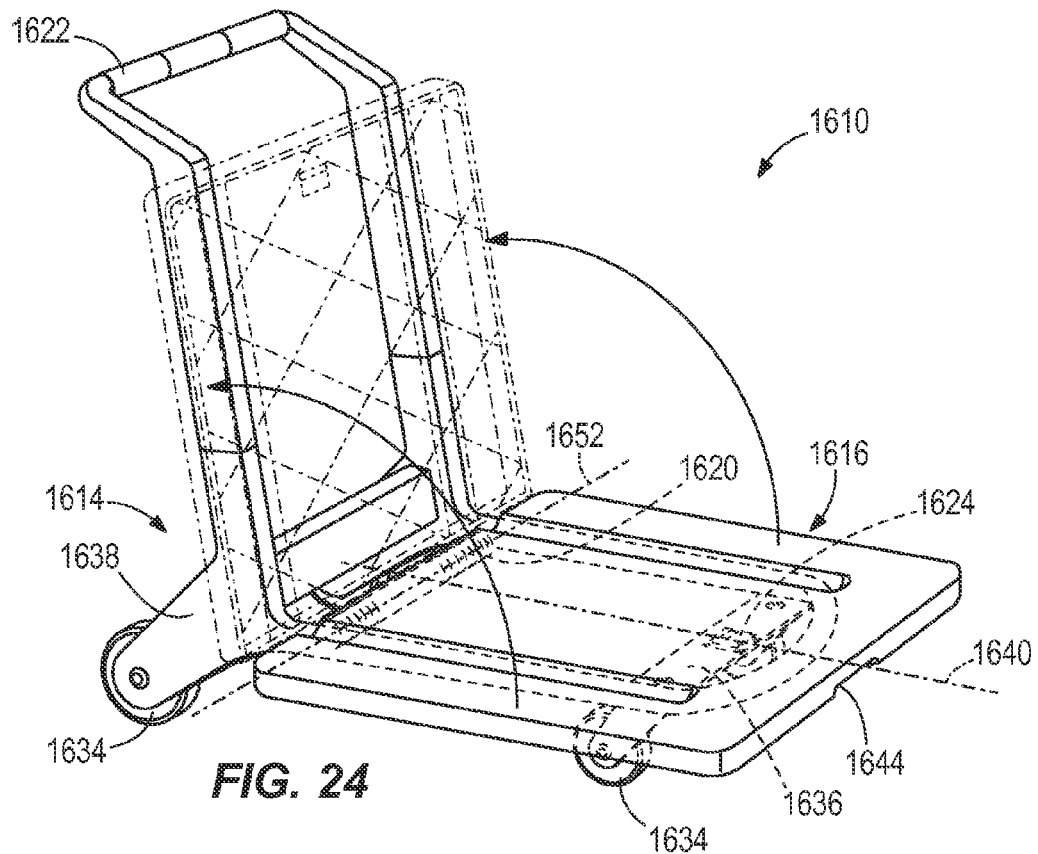
FIG. 24 is a perspective view of a flat-bed cart.

FIG. 24 shows a nesting flat-bed cart 1610. The flat-bed cart 1610 includes a frame 1614, a pivoting load bed or deck 1616, at least one spring-loaded slow-close hinge 1620, and a latch mechanism 1624. In one embodiment, the deck 1616 is made from a non-slip plastic material. The frame 1614 includes a base 1628 having a handle 1622, multiple wheels or casters 1634 coupled to the base for supporting movement of the frame over the ground, and a cross piece 1636. In the illustrated embodiment, the rear wheels 1634 can swivel, while the front wheels 1634 are fixed. The frame 1614 defines a longitudinal axis 1640. The deck 1616 includes a hand grip 1644 and a ribbed underside 1648 (FIG. 27) to provide increased rigidity.

The deck 1616 is pivotably attached to the base 1638 by the spring-loaded slow-close hinge 1620. The deck is pivotable about a pivot axis 1652 transverse to the longitudinal axis 1640. The slow-close hinge 1620 is similar to those used for toilet seats. The spring action of the hinge 1620 biases the deck 1616 toward an upright position as shown in FIG. 24. The latch mechanism 1624 is located on the cross piece 1636 extending between the front wheels 1634. When the deck 1616 is moved to a lowered or use position, the latch mechanism 1624 locks the deck 1616. In one embodiment, the latch mechanism 1624 includes a rotating hook (not shown). The hook may be spring-biased to automatically engage and lock the deck 1616 in place when the deck 1616 is moved to the lowered position. When the latch mechanism 1624 is unlocked, the slow-close hinge 1620 moves the deck 1616 to the upright position. The hand grip 1644 enables the user to assist in lifting the deck 1616 to the upright position. In other embodiments, a heavy spring or gas strut may be used in addition to or in place of the slow-close hinge 1620.

Figure 25:
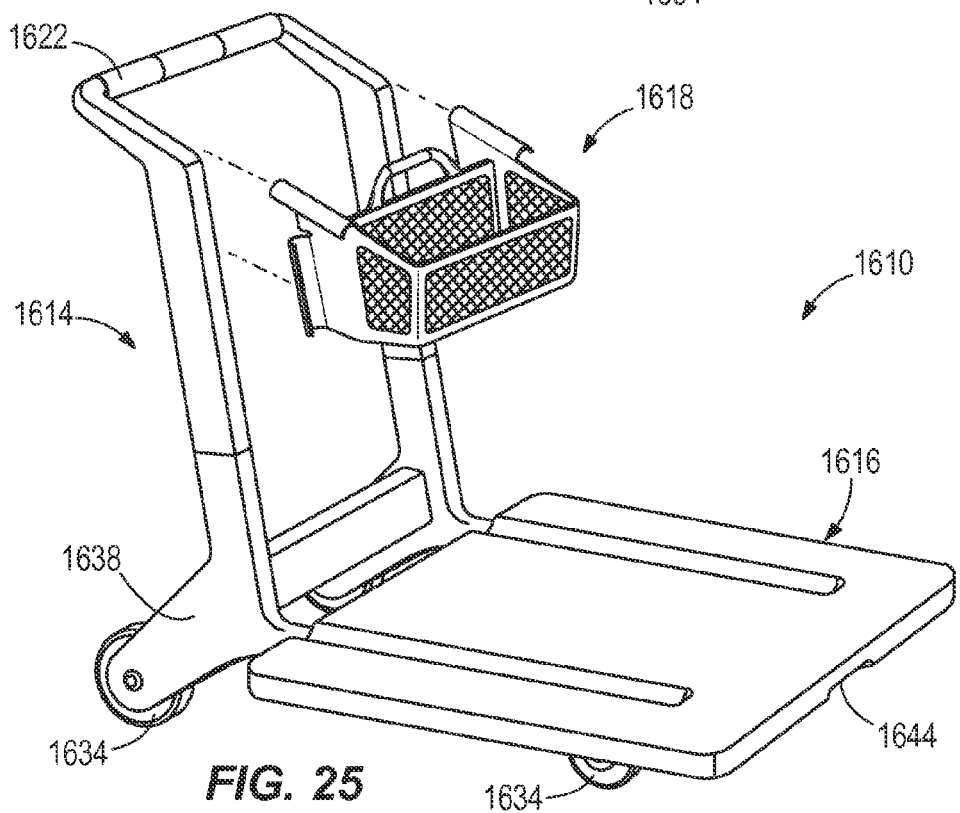
FIG. 25 is a perspective view of a flat-bed cart according to another embodiment.

With the decks 1616 in the upright position, multiple flat-bed carts 1610 can be stacked or nested together in a manner similar to the cart 10 of FIG. 1. That is, the frame of a second flat-bed cart 1610 can be pushed into the first flat-bed cart 1610 from the rear, such that the frames 1614 of the two carts 1610 nest together The flat-bed cart 1610 of FIG. 24 can be made with a frame 1614 that is similar to the frame 14 of FIG. 1 except with a different handle. In addition, the flat-bed cart 1610 of FIG. 24 can include the caster lift mechanism 122 described above with respect to FIGS. 18-21. In the embodiment shown in FIG. 25, the flat-bed cart 1610 further includes a small basket 1618 that can be removably attached to the handle 1622, such as by a snap fit or by fasteners. The basket 1618 may also be integrally formed with the handle 1622 or frame 1614.

Figure 26:
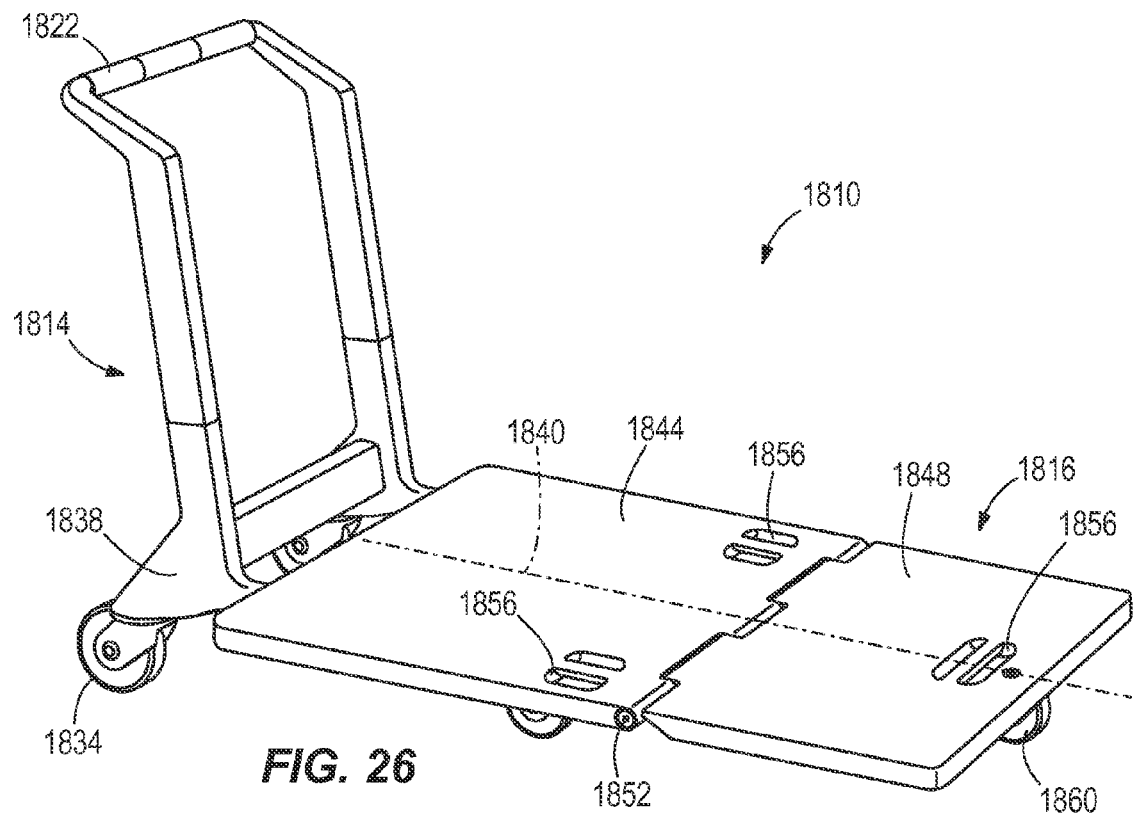
FIG. 26 is a perspective view of a flat-bed cart according to another embodiment in a lowered state.
Figure 27:
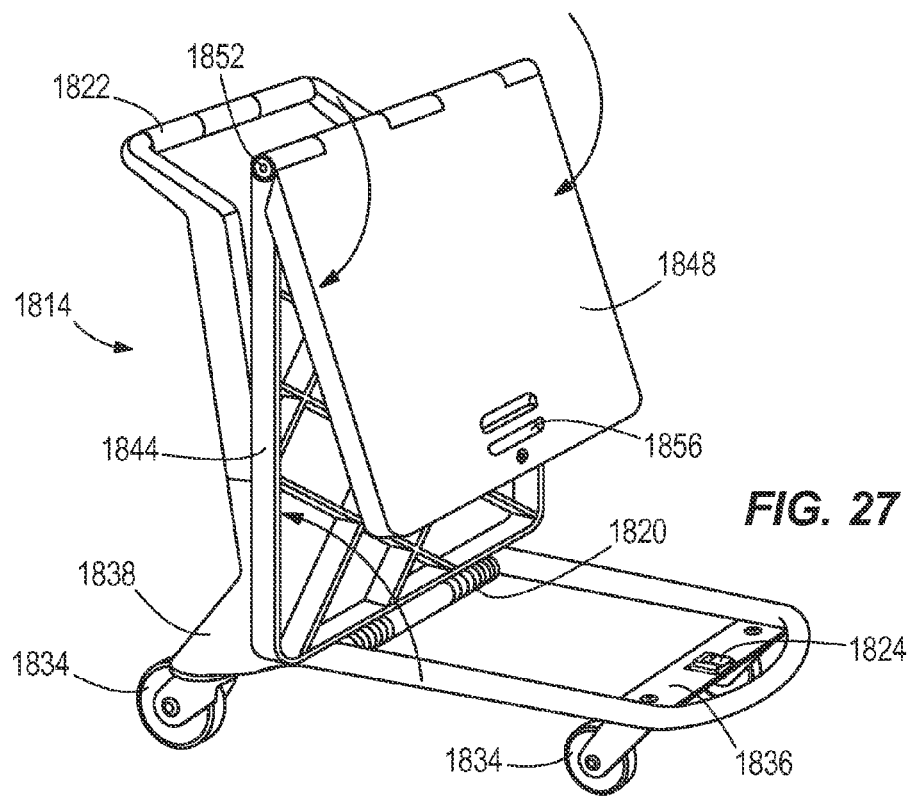
FIG. 27 is a perspective view of the flat-bed cart of FIG. 26 in an upright state.

FIGS. 26-27 disclose a nesting flat-bed cart 1810 with a folding deck 1816. The flat-bed cart 1810 of FIGS. 26-27 is similar to the flat-bed cart 1610 of FIG. 24, except that it is designed to support greater weights or loads. The deck 1816 includes a first or rear section 1844 pivotably coupled to the frame 1814, and a second or front section 1848 pivotably connected to the rear section 1844 by a hinge 1852. The deck 1816 folds along a lateral break line that is transverse to the longitudinal axis 1840 of the frame 1814, in a manner similar to a folding banquet table. The deck 1816 can pivot about the hinge 1852 when in a lowered position, which allows the flat-bed cart 1810 to accommodate bumps or rough surfaces over which the cart 1810 travels. In the illustrated embodiment, the front section 1848 and rear section 1844 include at least one hand grip 1856 for moving the deck 1816 between the upright and lowered positions, and the front section 1848 includes one or more casters 1860. In one embodiment, a single caster 1856 is used for supporting up to 2000 pounds and two casters 1856 are used for supporting up to 3000 pounds.

Figure 29:
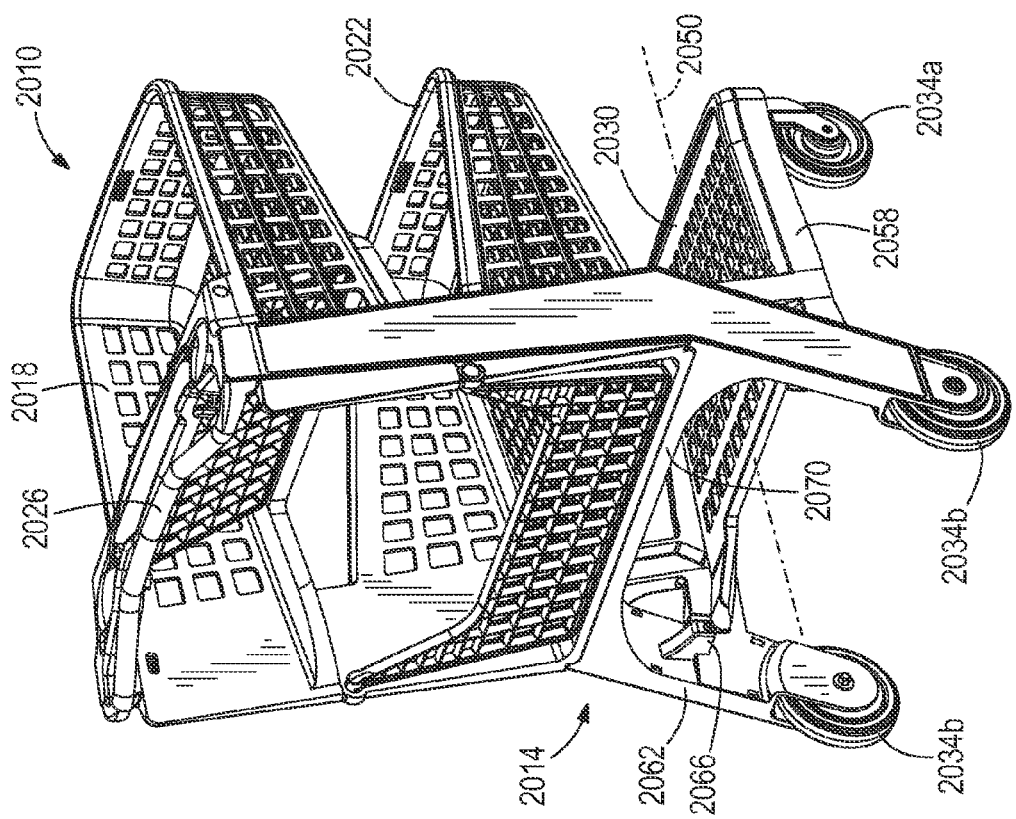
FIG. 29 is a rear perspective view of the shopping cart of FIG. 28.
Figure 28:
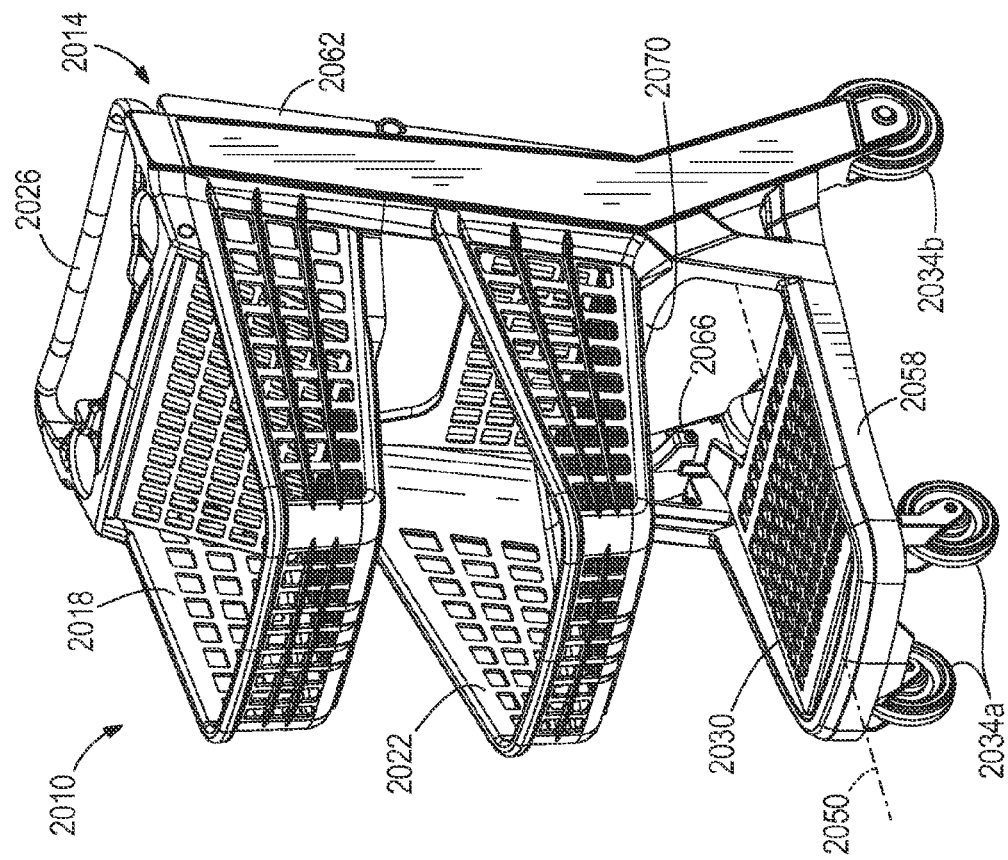
FIG. 28 is a front perspective view of a shopping cart according to another embodiment.

FIGS. 28 and 29 show another embodiment of the shopping cart 2010. The shopping cart 2010 includes a frame 2014, a first or upper basket 2018, a second or lower basket 2022, a handle assembly 2026 for pushing the cart 2010, a tray 2030 supported on the frame 2014, and multiple wheels 2034 supporting the frame 2014 for movement over the ground. The cart 2010 defines a front end, a rear end opposite the front end, and a horizontal cart axis 2050 (FIG. 28) extending between the front end and the rear end. As used herein, the term "rearward" refers to a direction that extends toward the rear end, and the term "forward" refers to a direction that extends toward the front end.

In the illustrated embodiment, substantially all of the components of the cart 2010 (i.e., except for the wheel axles and pins coupling the front wheels 2034*a* to the frame 2014) are made from a plastic material, and are preferably injection-molded. In the illustrated embodiment, frame 2014 and handle assembly 2026 are formed from polycarbonate polyethylene, while the baskets 2018, 2022 and tray 2030 are formed from high-density polyethylene. In other embodiments, the frame 2014, handle assembly 2026, the baskets 2018, 2022, and the tray 2030 may be formed from the same material. In addition, other plastic materials may be used.

The frame 2014 includes a base 2058 and a pair of upright members 2062 on either side of the cart 2010 to support the baskets 2018, 2022. In the illustrated embodiment, the uprights members 2062 are formed integrally with the base 2058. The base 2058 is generally U-shaped. The base 2058 includes a front member 2056 to which the front wheels 2034*a* are coupled and parallel sides extending between the front member 2056 and the upright members 2062. The base 2058 is substantially parallel to the ground or support surface and supports the tray 2030. In the illustrated embodiment, the frame 2014 also includes a cross-member 2070 extending between the upright members 2062. In the illustrated embodiment, each upright member 2062 has a chevron or "boomerang" shape. In other embodiments, the upright members 2062 may be straight. The frame 2014 also includes a protrusion 2066 extending inwardly from an inner surface of each upright member 2062 and toward the center axis 2050 of the cart 2010. The protrusion 2066 is positioned to engage a second cart when the second cart is nested with the cart 2010, lifting a rear portion of the cart 2010 away from the ground. The protrusion 2066 is similar to the cart lifting mechanism described above with respect to FIGS. 18-21.

Figure 30:
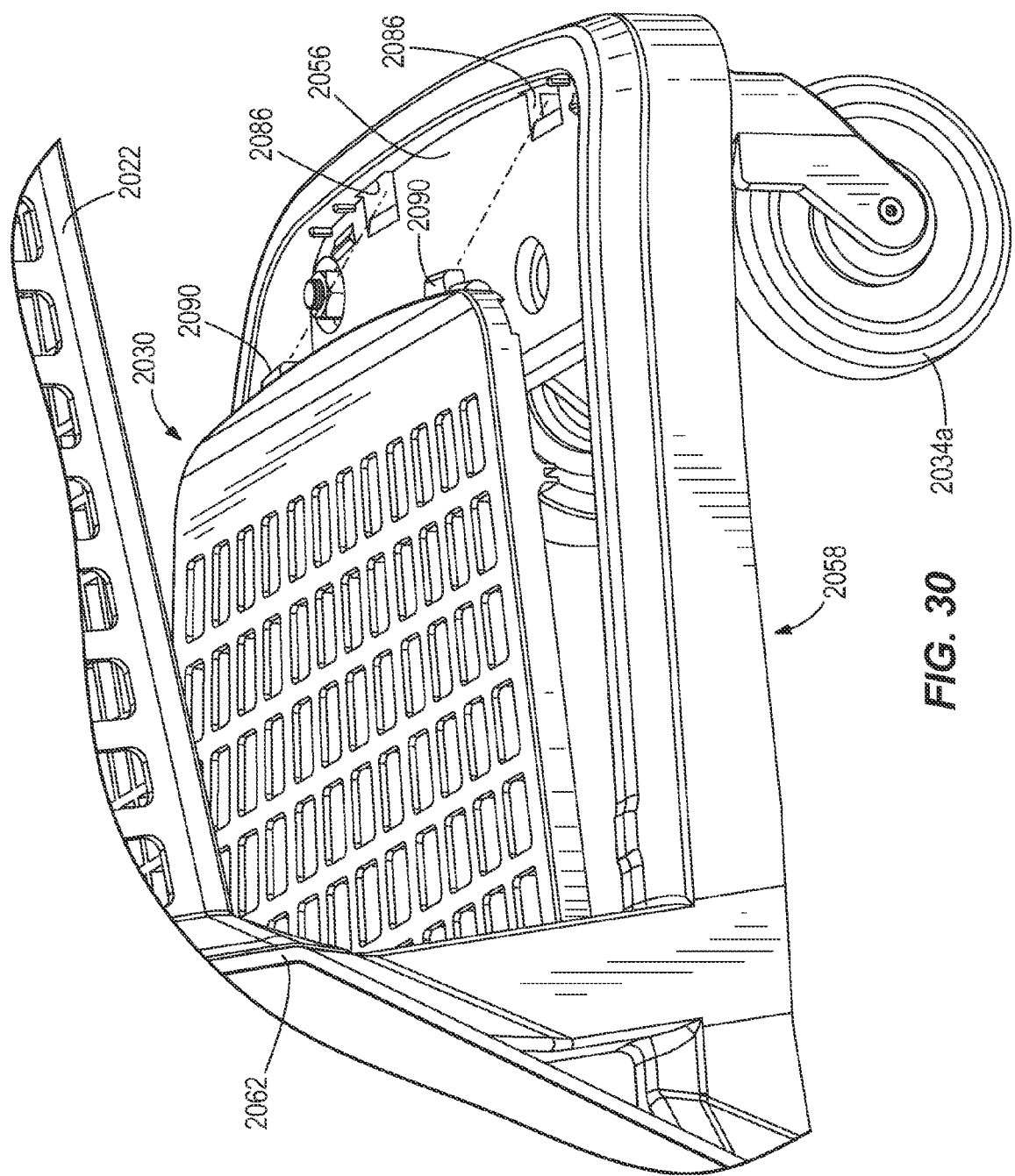
FIG. 30 is a perspective view of a portion of a frame and a tray.
Figure 31:
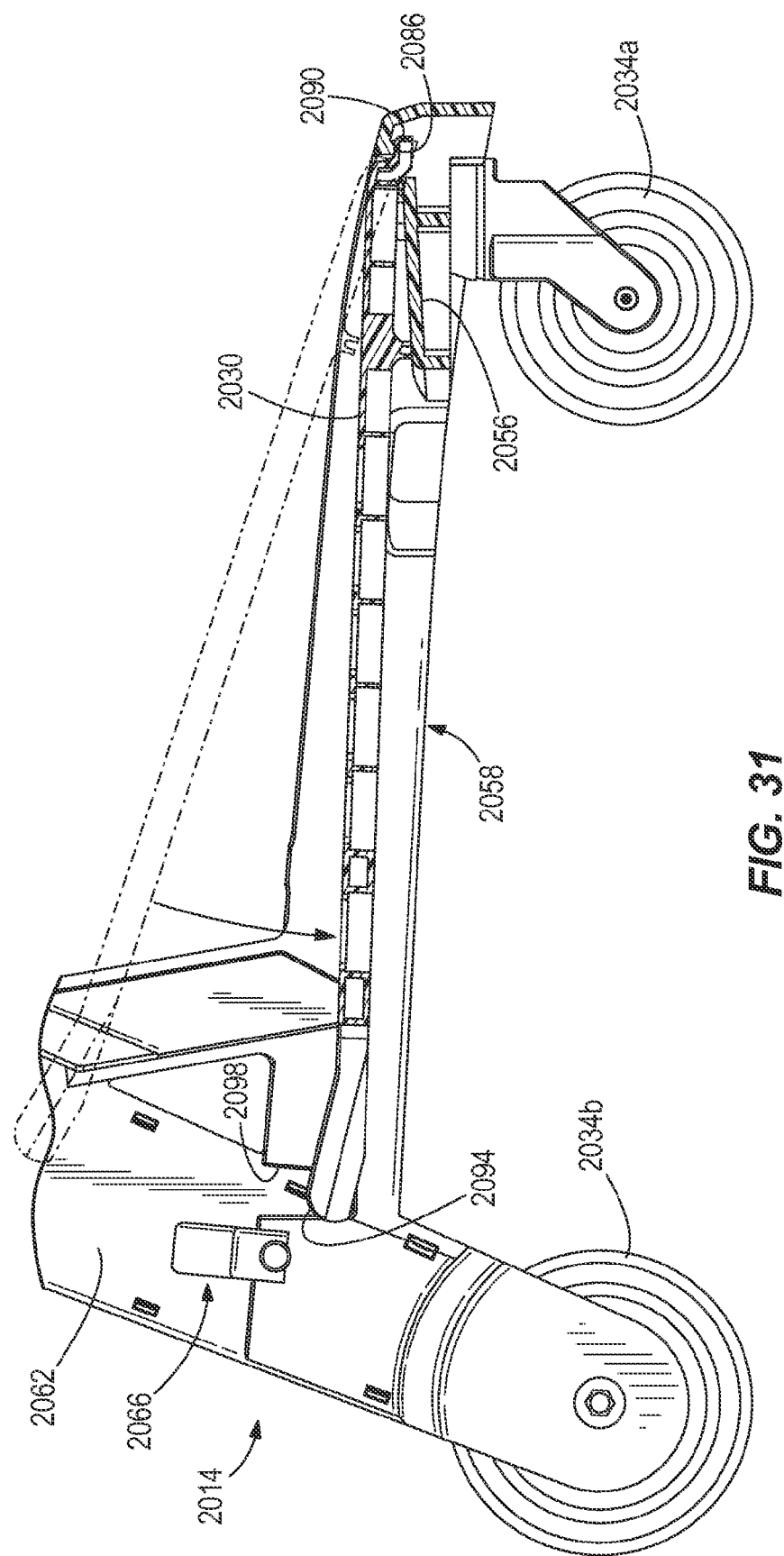
FIG. 31 is a section view of a portion of the frame and the tray of FIG. 30.
Figure 32:
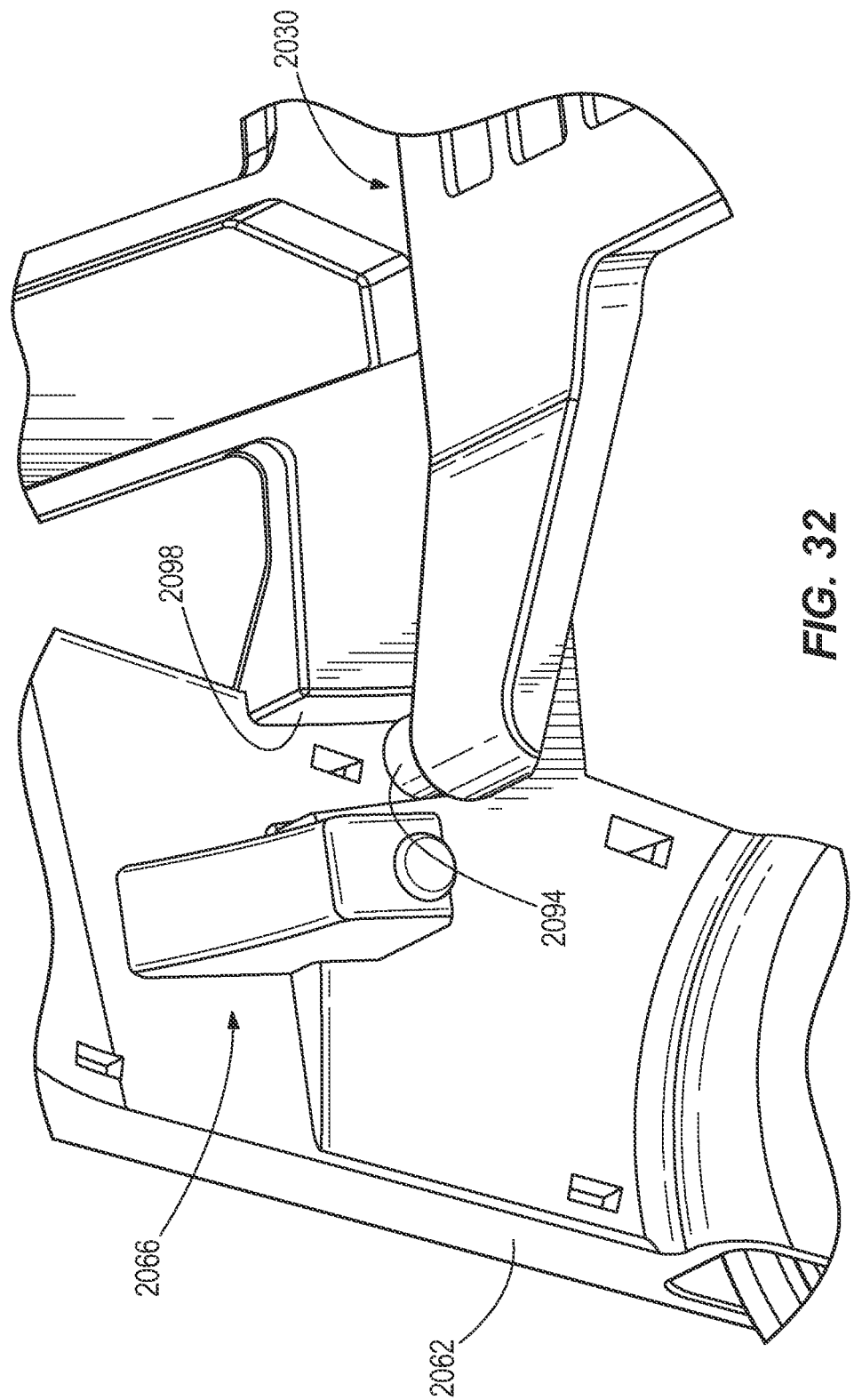
FIG. 32 is a perspective view of the frame and the tray of FIG. 30.

Referring to FIGS. 30 and 31, the front member 2056 of the base 2058 includes a pair of slots 2086 proximate the front wheels 2034*a*. The tray 2030 includes a pair of tabs 2090 that engage the slots 2086. To couple the tray 2030 to the base 2058, the tray 2030 is tilted into engagement with the base 2058 such that the tabs 2090 are inserted into the slots 2086. Stated another way, the tray 2030 is oriented at an acute angle relative to the base 2058 and moved forward to insert the tabs 2090 into the slots 2086. The tray 2030 is then pivoted downwardly (counterclockwise in FIG. 31) about the slots 2086 so that the tray 2030 rests on the base 2058. In the illustrated embodiment, the tabs 2090 engage the slots 2086 by a snap fit. As best shown in FIG. 32, the tray 2030 includes projections 2094 that are received within recesses 2098 on the frame 2014. In the illustrated embodiment, the projections 2094 extend laterally outward toward the sides of the cart 2010 and the recesses 2098 are open on the top. As the tray 2030 pivots downwardly, the projections 2094 are received within the recesses 2098, thereby releasably securing the tray 2030 against forward or rearward movement relative to the frame 2014. To remove the tray 2030, the rear end of the tray 2030 is first pivoted upwardly (clockwise in FIG. 31) to remove the projections 2094 from the recesses 2098. The tray 2030 is then moved away from the front edge of the base 2058 to remove the tabs 2090 from the slots 2086. This arrangement makes it highly unlikely the tray 2030 will accidentally come off the base 2058. In other embodiments, the slots 2086 and/or the recesses 2098 may be formed on the tray 2030, while the tabs 2090 and/or the projections 2094 may be formed on the frame 2014.

Figure 33:
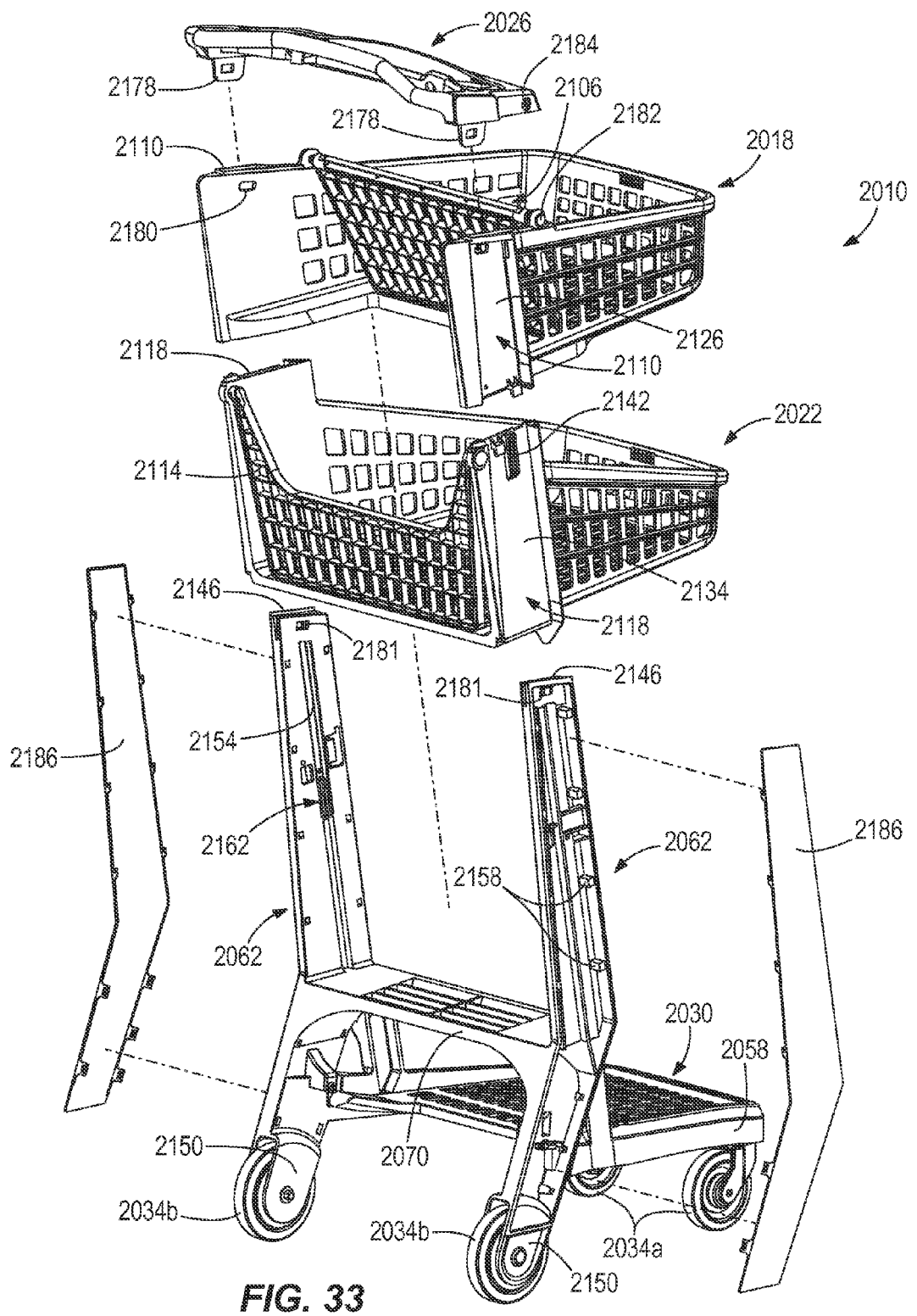
FIG. 33 is an exploded perspective view of the shopping cart of FIG. 28.

As shown in FIG. 33, the upper basket 2018 includes a rear gate 2106 and a pair of mounting portions 2110. The lower basket 2022 includes a rear gate 2114 and a pair of mounting portions 2118. The rear gate 2114 has a U-shape to facilitate loading the lower basket 2022 from the rear. In the illustrated embodiment, the upper basket 2018 is coupled to the handle assembly 2026 and the rear gate 2110 is pivotably coupled to the handle assembly 2026 as further described below. In other embodiments, the rear gate 2110 is coupled to the basket 2018. The rear gates 2106, 2114 are upwardly pivotable in order to receive an upper basket and lower basket, respectively, of another cart similar to the shopping cart 2010 so that the carts can be nested.

Figure 34:
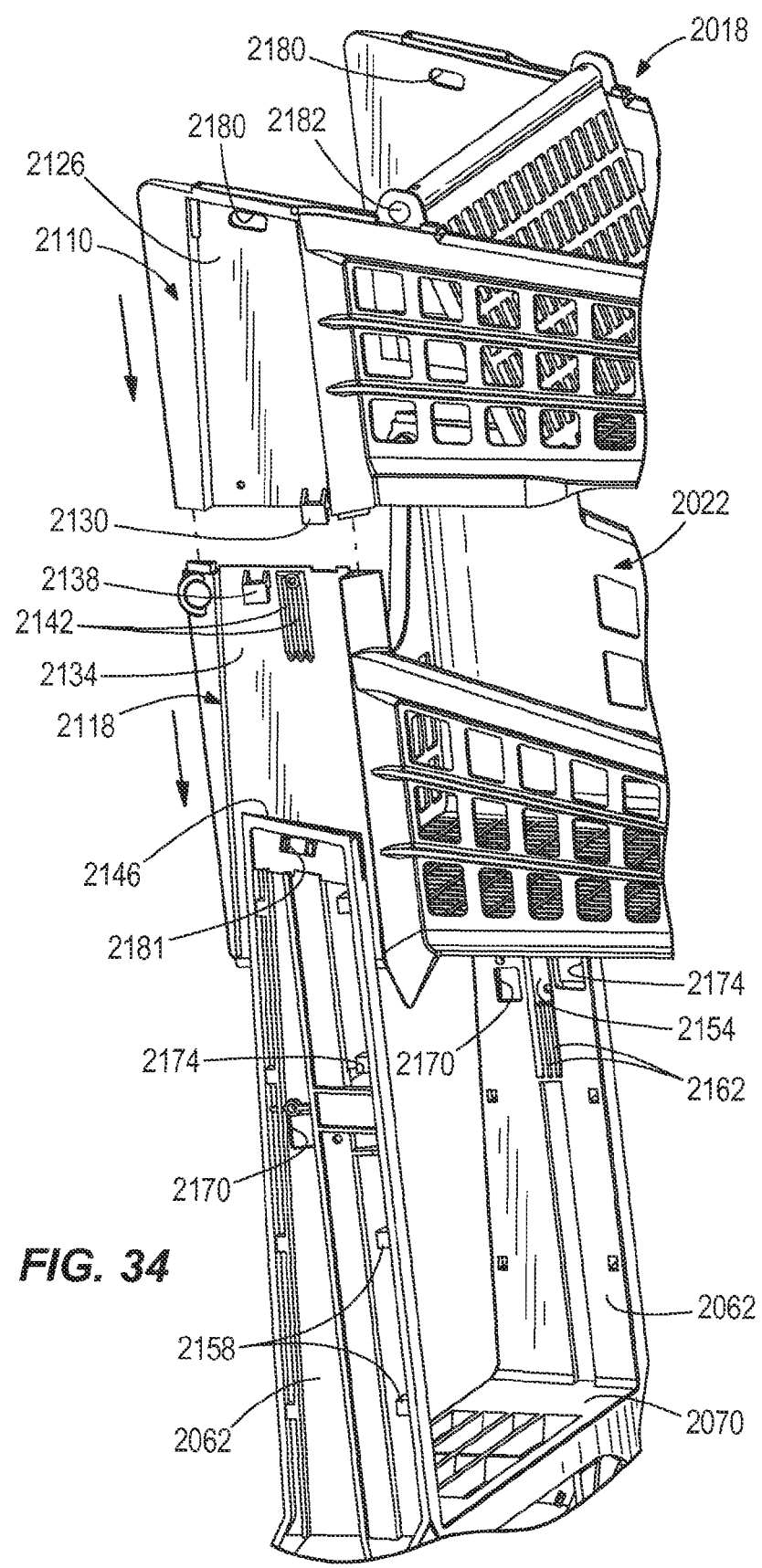
FIG. 34 is an exploded perspective view of a portion of the frame, an upper basket, and a lower basket.

Referring to FIG. 34, the mounting portions 2110, 2118 engage the upright members 2062 to removably couple the baskets 2018, 2022, respectively, to the frame 2014. Each mounting portion 2110 of the upper basket 2018 includes a generally flat surface 2126 and a stop 2130. Each mounting portion 2118 of the lower basket 2022 includes a generally flat surface 2134, a stop 2138, and tabs or ribs or fingers 2142 protruding from the surface 2134.

As shown in FIGS. 33 and 34, each upright member 2062 includes an upper end 2146, a lower end 2150 (FIG. 33) supported by rear wheels 2034*b* and a track 2154 extending along an inner surface of the upright member 2062. The flat surfaces 2134 of the lower basket 2022 slidably engage the inner surfaces of the upright members 2062 such that the fingers 2142 slide within the tracks 2154. Each track 2154 includes complementary ribs or fingers 2162 that slide between the fingers 2142. As best shown in FIG. 34, each inner surface of the upright members 2162 also includes a first opening 2170 to engage the stop 2138 and a second opening 2174 to engage the stop 2130. In other embodiments, the fingers 2142 may be coupled to the upright members 2062 and the tracks 2154 may be coupled to the basket 2022.

To assemble the cart 2010, the flat surfaces 2134 of the lower basket 2022 first slide along the inner surfaces of the upright members 2062 until the stop 2138 engages a lower edge of the first opening 2170 and the complementary fingers 2162 engage the fingers 2142 of the lower basket 2022, thereby securing the basket 2022 relative to the frame 2014. Next, the flat surfaces 2126 of the upper basket 2018 slide along the inner surfaces of the upright members 2062 until the stop 2130 engages a lower edge of the second opening 2174, coupling the upper basket 2018 to the upright members 2062 above the lower basket 2022.

Figure 35:
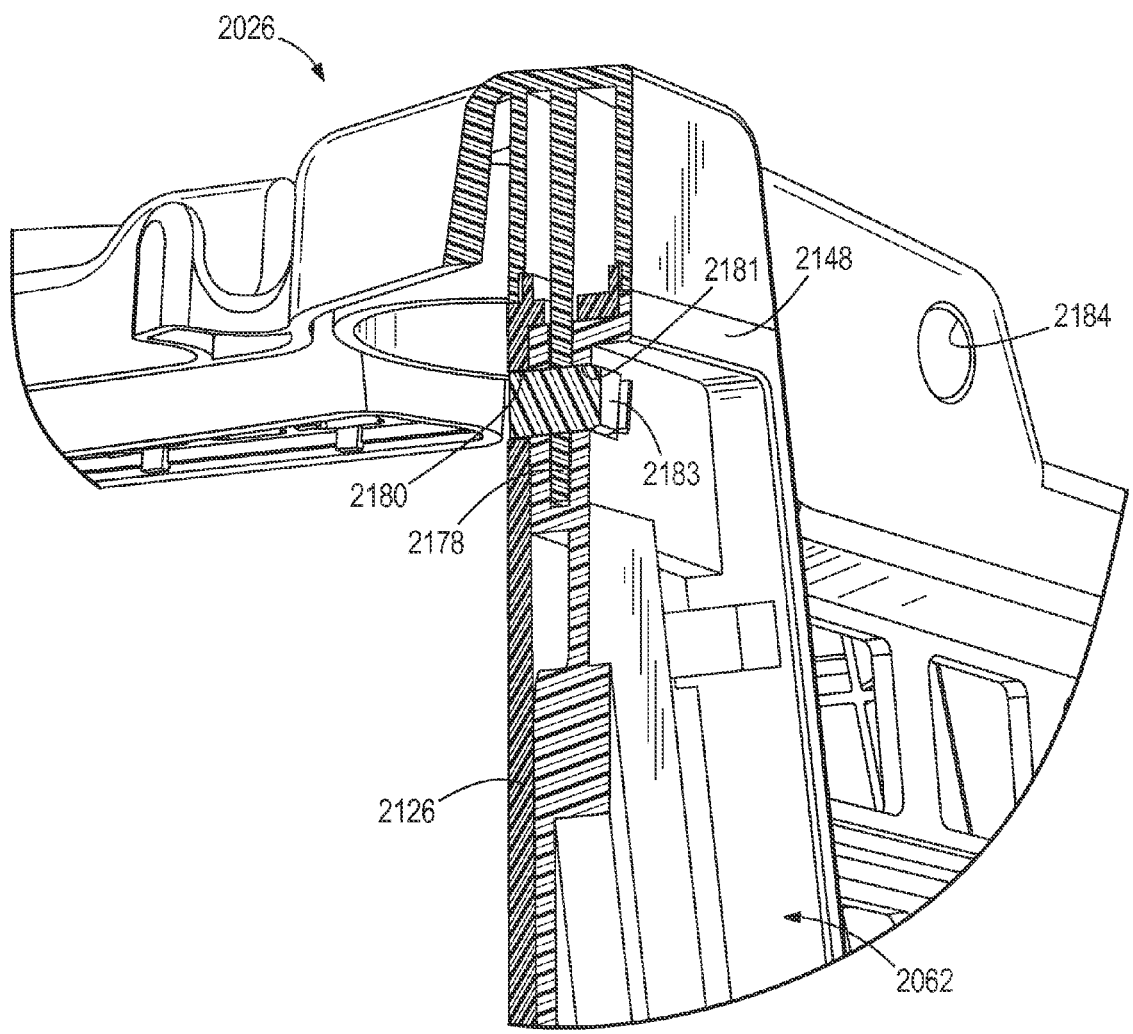
FIG. 35 is an enlarged section view of a portion of the frame and the upper basket of FIG. 34 and a handle assembly

Next, the handle assembly 2026 is coupled to the upright members 2062. As shown in FIG. 33, the handle assembly 2026 includes a pair of brackets 2178 that are coupled to the upper ends 2146. Each bracket 2178 includes an opening that is aligned with an opening 2180 (FIG. 34) on the upper basket 2018 and an opening 2181 on the upright member 2062. As shown in FIG. 35, a pin 2183 is then inserted into each opening of the bracket 2178 and the openings 2180, 2181 to releasably secure the basket 2018 and the handle assembly 2026 to the upright members 2062. The rear gate 2106 includes pins 2182 that extend into openings 2184 in the handle assembly 2026 so that the rear gate 2106 pivots relative to the handle assembly 2026. When the handle assembly 2026 is positioned on the upper basket 2018, the openings 2184 of the handle assembly 2026 are aligned with openings on the upper basket 2018. A cap (not shown) is inserted into the openings of the upper basket 2018 and the handle assembly 2026 and engages the pin 2182 of the rear gate 2106 to couple the rear gate 2106 to both the handle assembly 2026 and the upper basket 2018.

Figure 36:
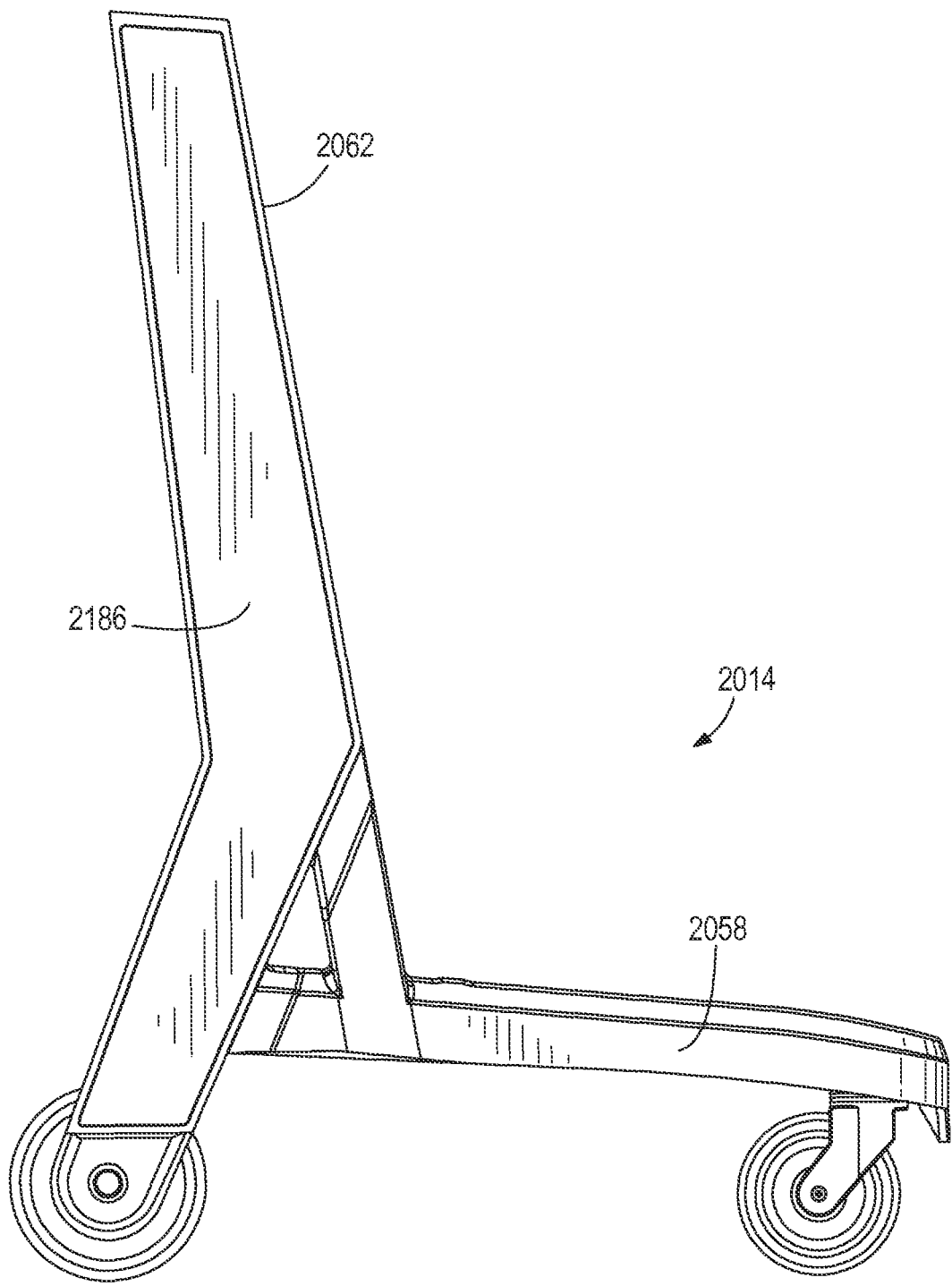
FIG. 36 is a side view of the frame and a cover.
Figure 37:
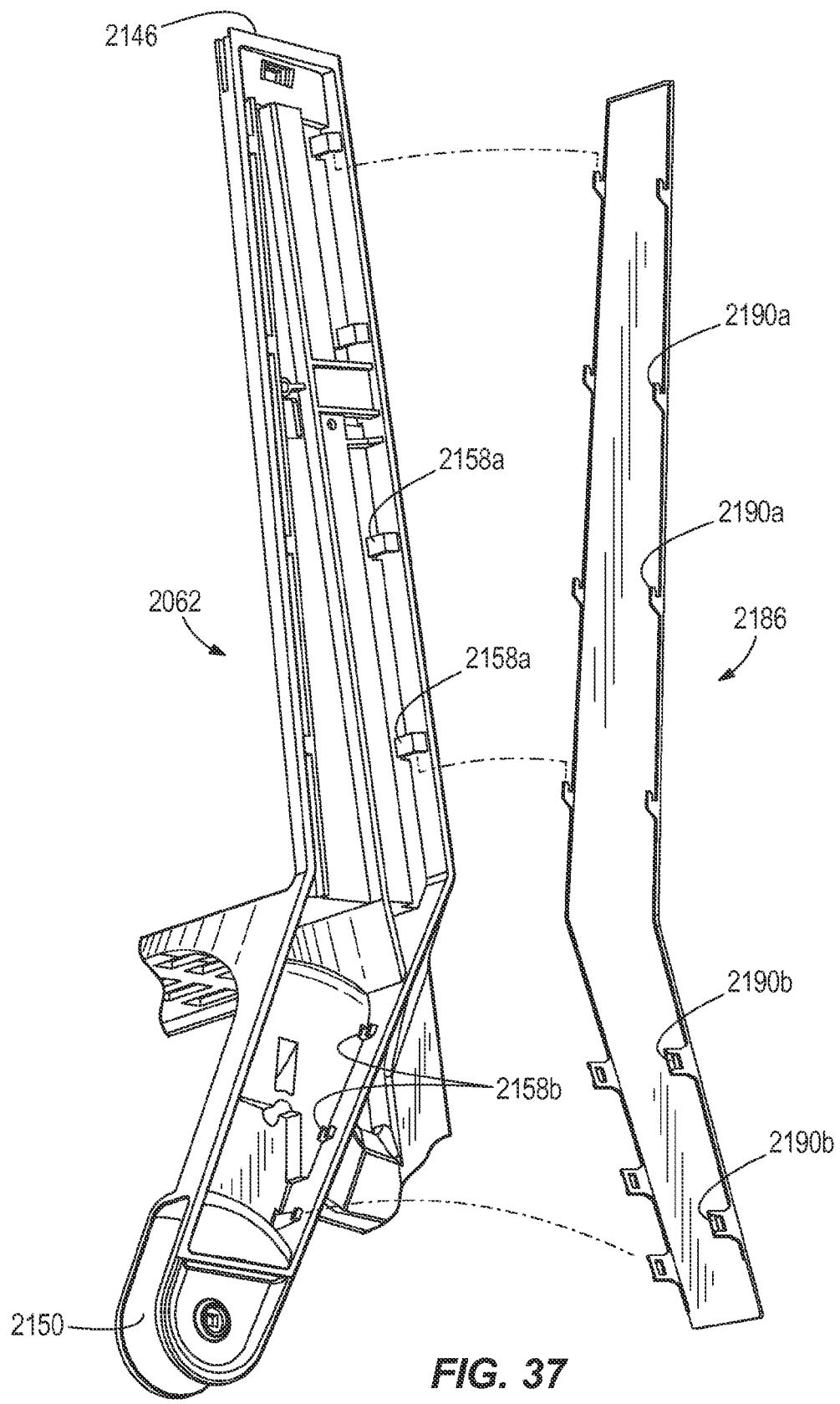
FIG. 37 is an exploded perspective view of a portion of the frame and cover of FIG. 36.

Referring to FIGS. 36 and 37, a cover 2186 is removably coupled to an outer surface of each upright member 2062 to provide access to an area within the upright member 2062. The cover 2186 includes projections 2190 that engage lugs 2158 positioned on an outer surface of each upright member 262. In the embodiment illustrated in FIG. 37, some of the projections 2190 are formed as hooks 2190a that are inserted into loops 2158a by moving the cover 2186 vertically relative to the upright member 2062, while other projections 2190 have openings 2190b that receive tabs 2158b by a snap fit.

Figure 38:
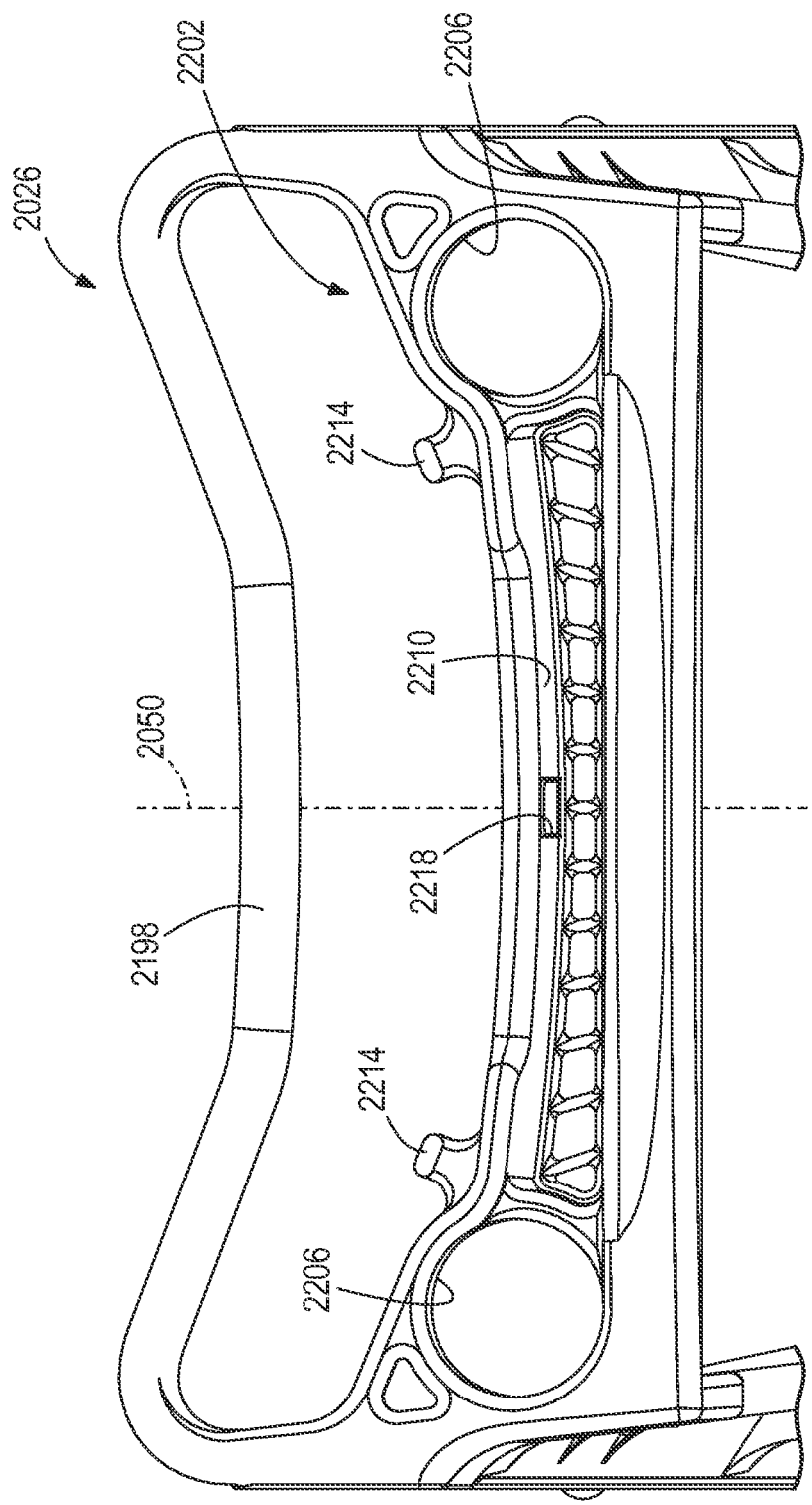
FIG. 38 is a perspective view of a handle and an accessory slot.
Figure 39:
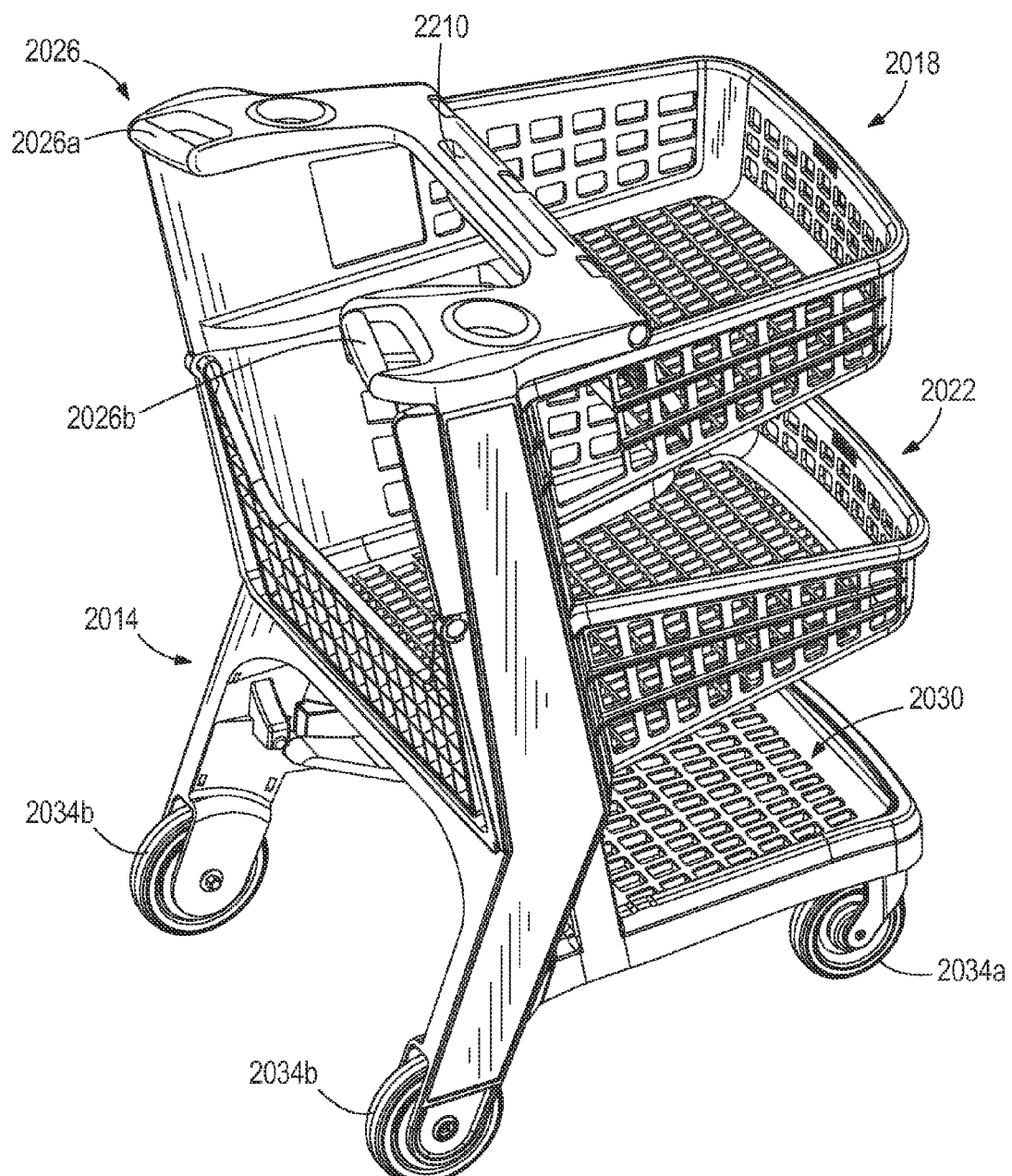
FIG. 39 is a rear perspective view of a shopping cart including a handle according to another embodiment.

As shown in FIG. 38, the handle assembly 2026 includes a bar 2198 and accessory holders 2202. In the illustrated embodiment, the bar 2198 is contoured such that portions of the bar 2198 proximate the sides of the cart 2010 are angled forward and a center portion extending between the side portions is transverse to the cart axis 2050. The angled shape of the bar 2198 improves ergonomic comfort for the user. In addition, positioning the center portion forward of the side portions permits better access to the lower basket 2022 and facilitates lifting a child from the ground over the handle assembly 2026 and into the upper basket 2018. In another embodiment, shown in FIG. 39, the handle assembly 2026 may be formed as a first handle portion 2026a and a second handle portion 2026b spaced apart from the first handle portion 2026a such that there is no center portion. The spaced apart handles 2026a and 2026b facilitate access to the lower basket 2022 and facilitate lifting a child into the upper basket 2018.

Referring again to FIG. 38, the accessory holders 2202 include round openings 2206 positioned on either side of the cart 2010 for supporting a cup, a lateral slot 2210 for supporting an electronic device (such as a tablet computer or a cellular phone), and hooks 2214 positioned forward of the bar 2198 for supporting a hanging article, such as a garment or handbag. The slot 2210 is positioned between the openings 2206 and oriented transverse to the cart axis 2050. A notebook or electronic device can be positioned in a rearward-facing orientation so that a screen of the electronic device is visible to a user pushing the cart 2010. The slot 2210 includes an internal projection 2218 for engaging a lower portion of the electronic device and preventing the device from being jostled out of the slot 2210 as the user pushes the cart 2010. In other embodiments, the slot 2210 may be adapted so that a device can be positioned in a forward-facing orientation so that the screen is visible to person positioned within the upper basket 2018. In the illustrated embodiments, the accessory holders 2202 are formed integrally with the handle assembly 2026. In other embodiments, the handle assembly 2026 may include fewer or more accessory holders 2202 or other types of accessory holders 2202, and/or the accessory holders 2202 may be formed as part of the basket 2018.

Figure 42:
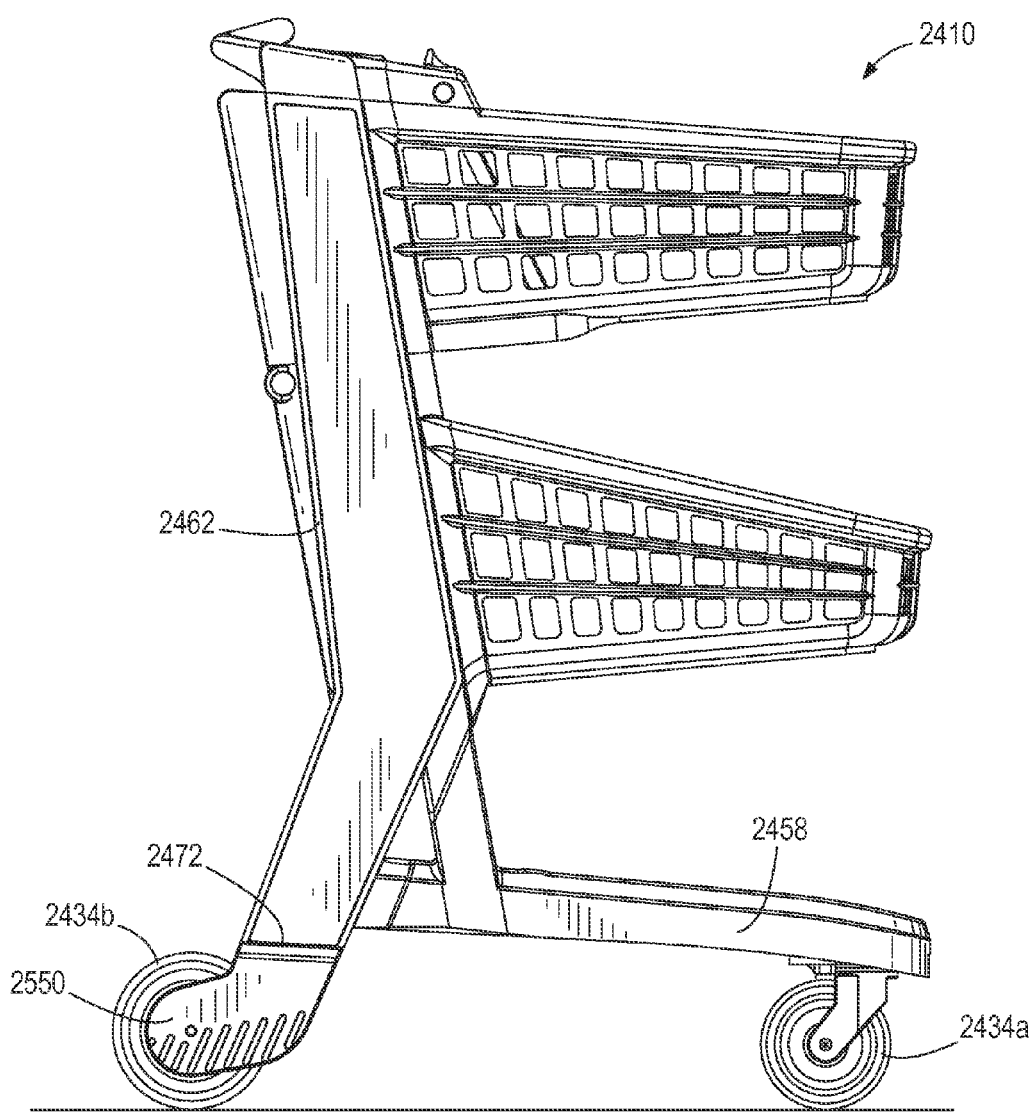
FIG. 42 is a side view of the shopping cart of FIG. 40.

FIGS. 40-42 illustrate another embodiment of the shopping cart 2410. Except as described below, the shopping cart 2410 is the same as the shopping cart 2010 described with regard to FIGS. 28-39, and common elements are given a reference numeral based on the reference numerals for FIGS. 28-39 plus 400.

Figure 43:
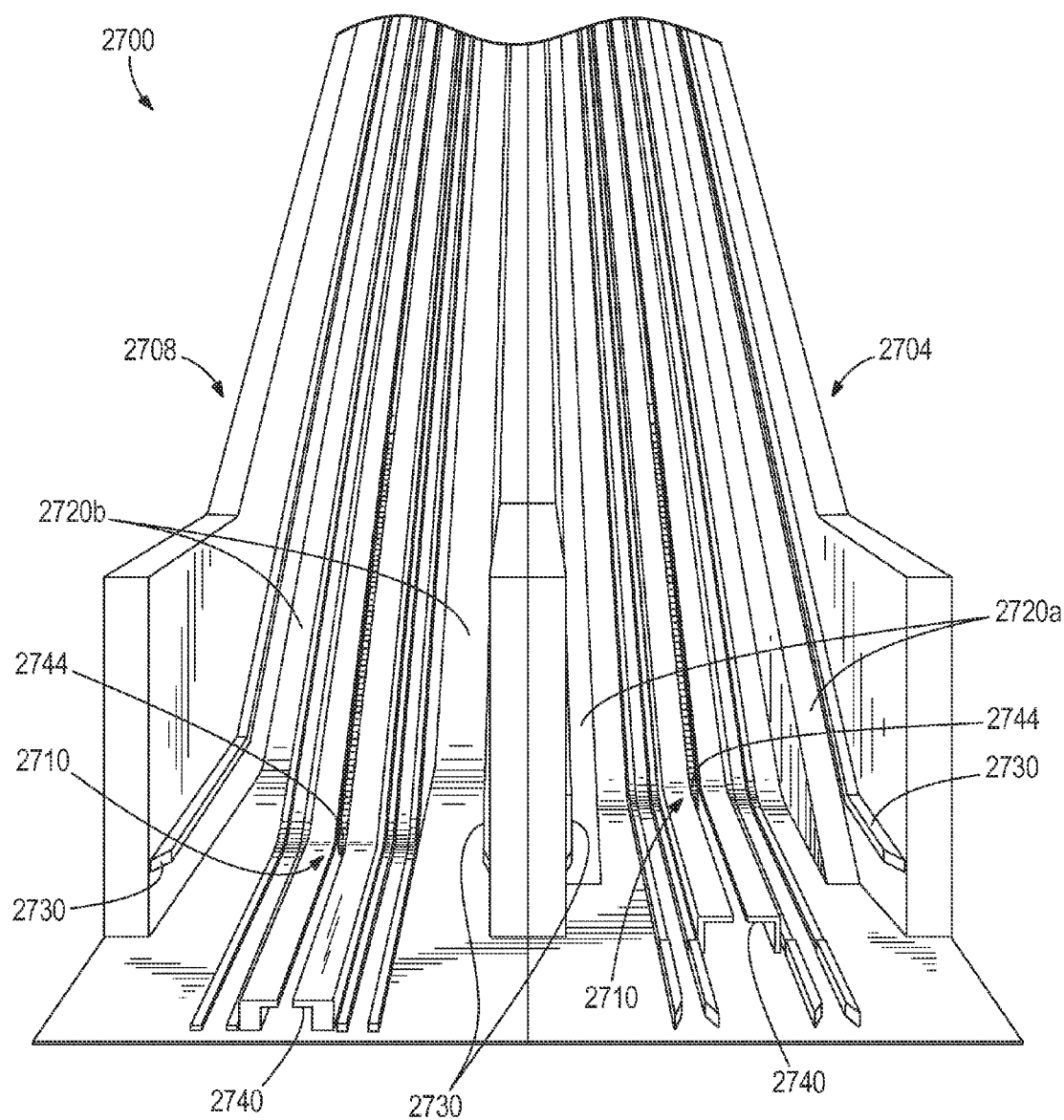
FIG. 43 is a front plan view of a cart transport mechanism.
Figure 44:
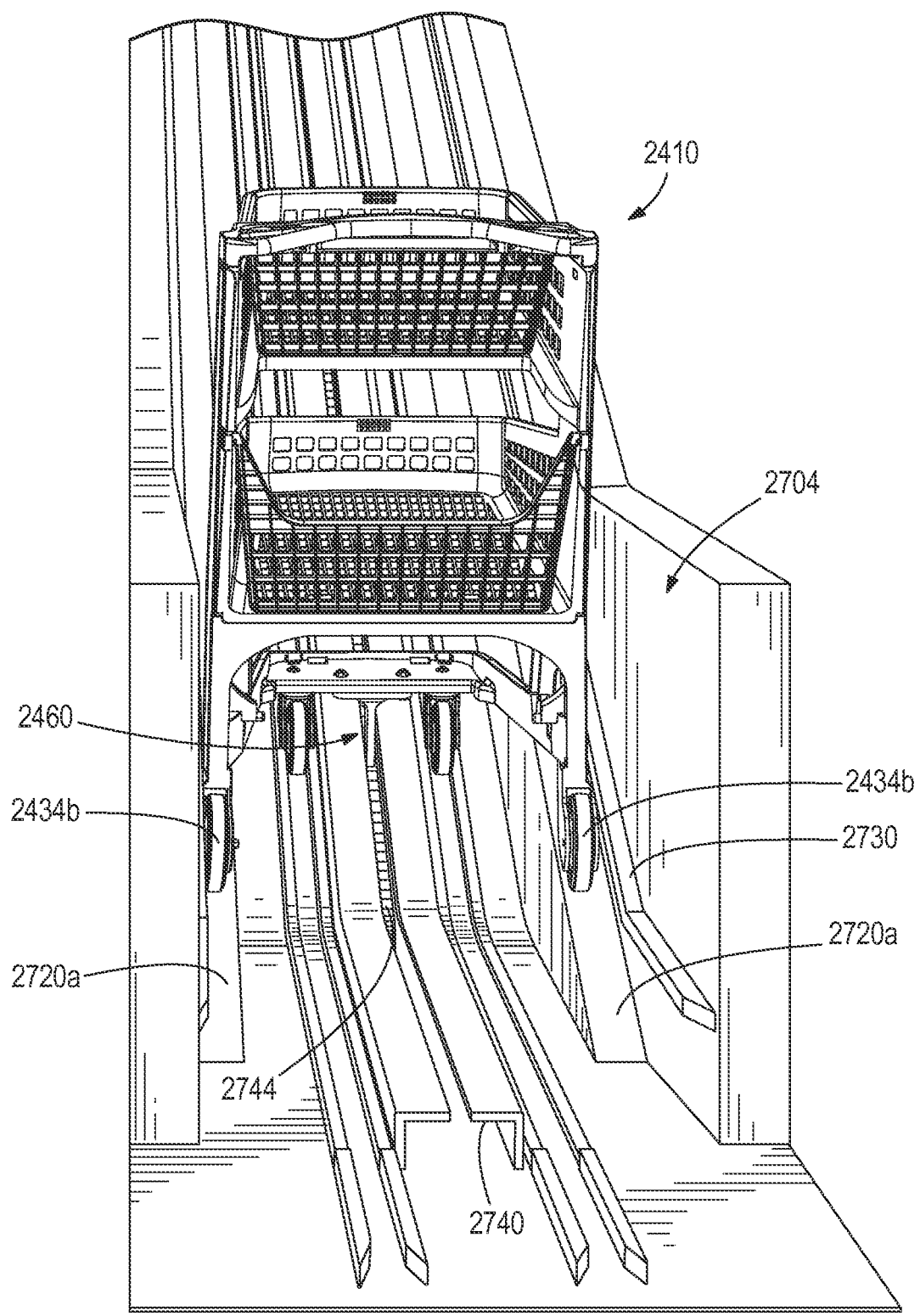
FIG. 44 is a front plan view of an ascending cart transport mechanism of FIG. 43 transporting the shopping cart of FIG. 40.
Figure 45:
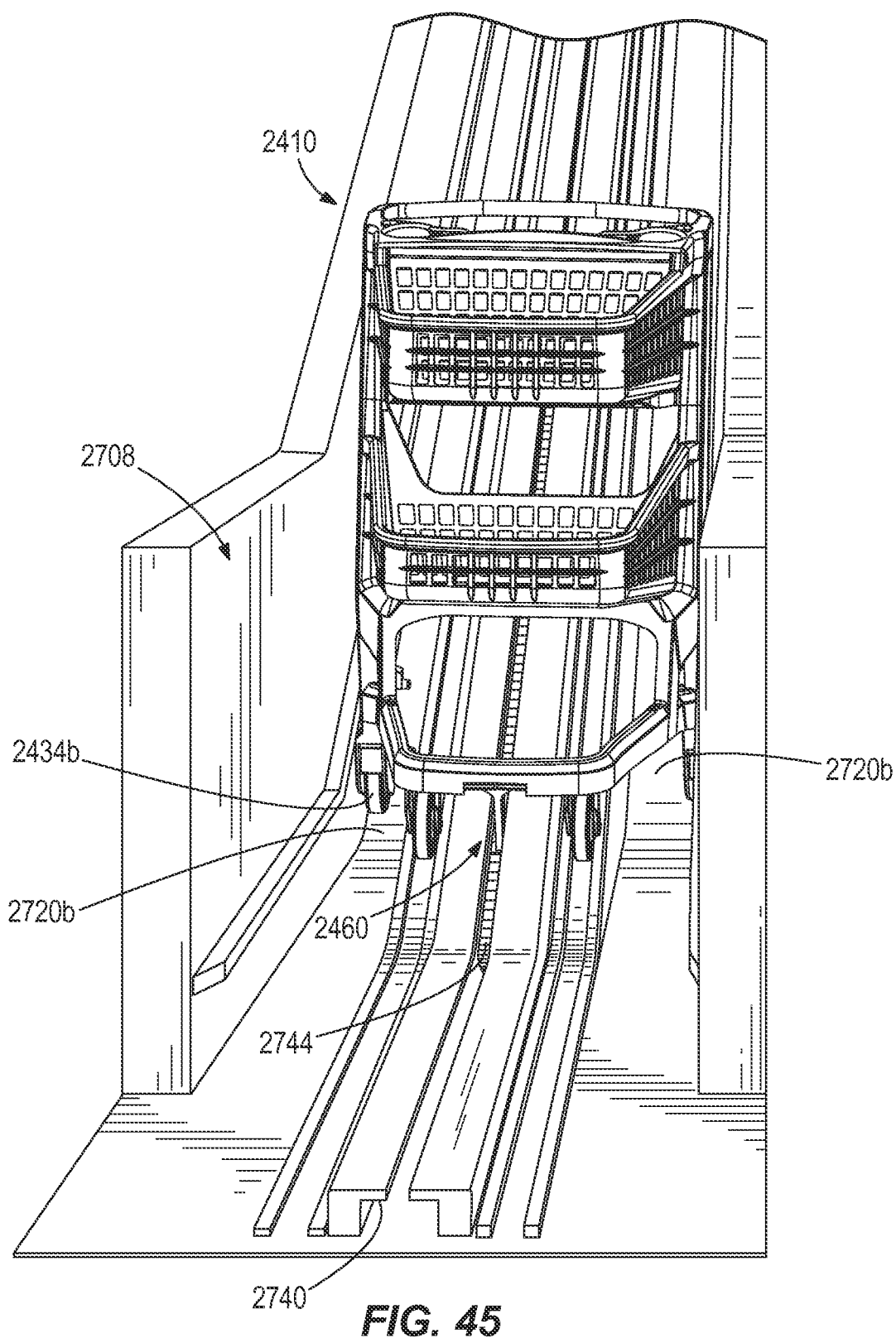
FIG. 45 is a front plan view of a descending cart transport mechanism of FIG. 43 transporting the shopping cart of FIG. 40.

As shown in FIGS. 40 and 41, the cart 2410 includes a frame 2414 supported by a pair of front wheels 2434a and a pair of rear wheels 2434b. The rear wheels 2434b are mounted on a lower end 2550 of each upright member 2462 such that the axle of each rear wheel 2434b is positioned behind or rear of the upright members 2462 (FIG. 42). The frame 2414 includes a base 2458 and an arm 2460 for engaging a cart transport system 2700 (FIGS. 43-45). The arm 2460 is coupled to the base 2458 proximate a front end of the cart 2410. The arm 2460 is positioned between the front wheels 2434a and extends downwardly from the base 2458. In the illustrated embodiment, the arm 2460 is formed as a web 2464 (FIG. 40) extending downwardly from the frame 2414 and having a bar or cross-member 2468 (FIG. 40) extending laterally toward at least one side of the cart 2410.

As shown in FIGS. 41 and 42, the frame 2414 also includes a projection or ledge or shelf 2472 proximate each of the rear wheels 2434b. Each shelf 2472 is formed as an upwardly-facing surface projecting outwardly from the side of the associated upright member 2462 proximate the lower end 2550 thereof and is adapted to engage a guide member 2730 of the transport system 2700 as described below.

FIGS. 43-45 illustrate the cart transport system 2700 including an ascending escalator 2704 and a descending escalator 2708. Grocery stores having multiple floors typically include the cart transport system 2700 for transporting shopping carts between floors. Because conventional shopping carts typically have a short wheelbase and an elevated basket, a conventional cart becomes top-heavy when it is loaded with groceries and is likely to tip over on the transport system 2700.

Each escalator 2704, 2708 includes a conveyor or towing track 2710, a pair of outer tracks 2720, and a pair of guide members 2730 adjacent the outer tracks 2720. The towing track 2710 includes a T-shaped slot 2740. The arm 2460 (FIG. 40) of the cart 2410 is received in the slot 2740 from an end of the slot 2740 and is retained due to interference between the slot 2740 and the cross-member 2468 of the arm 2460. The arm 2460 engages a towing member 2744, such as a cable or hook, that moves parallel to the slot 2740 and urges the arm 2460 and the cart 2410 along the slot 2740. The rear wheels 2434b move along the outer tracks 2720. In the ascending escalator 2704, the outer tracks 2720a are elevated with respect to the towing track 2710. In the descending escalator 2708, the outer tracks 2720b are recessed with respect to the towing track 2710.

As shown in FIG. 44, when the cart 2410 is positioned on the ascending escalator 2704, the rear wheels 2434b roll along the outer tracks 2720a positioned above the towing track 2710 as the cart 2410 is towed. In the illustrated embodiment, the transport system 2700 is inclined, and the guide members 2730 are positioned above the outer tracks 2720a. As the cart 2410 moves along the inclined portion, the rear wheels 2434b may elevate relative to front wheels 2434a. Each shelf 2472 (FIG. 41) on the cart 2410 engages one of the guide members 2730 above the outer track 2720a, thereby preventing the rear wheel 2434b from elevating beyond a certain height with respect to the front wheels 2434a. Therefore, the shelf 2472 prevents the cart 2410 from rotating over the front end of the cart 2410, and it maintains the cart 2410 in a substantially level position.

As shown in FIG. 45, when the cart 2410 is positioned on the descending escalator 2708, the rear wheels 2434b roll along the outer tracks 2720b as the cart 2410 is towed. Because the outer tracks 2720b are recessed relative to the towing track 2710, the cart 2410 maintains a relatively horizontal orientation.

FIGS. 46-53 illustrate another embodiment of the shopping cart 2810. Except as described below, the shopping cart 2810 is the same as the shopping cart 2010 described with regard to FIGS. 28-39, and common elements are given a reference numeral based on the reference numerals for FIGS. 28-39 plus 800.

Figure 46:
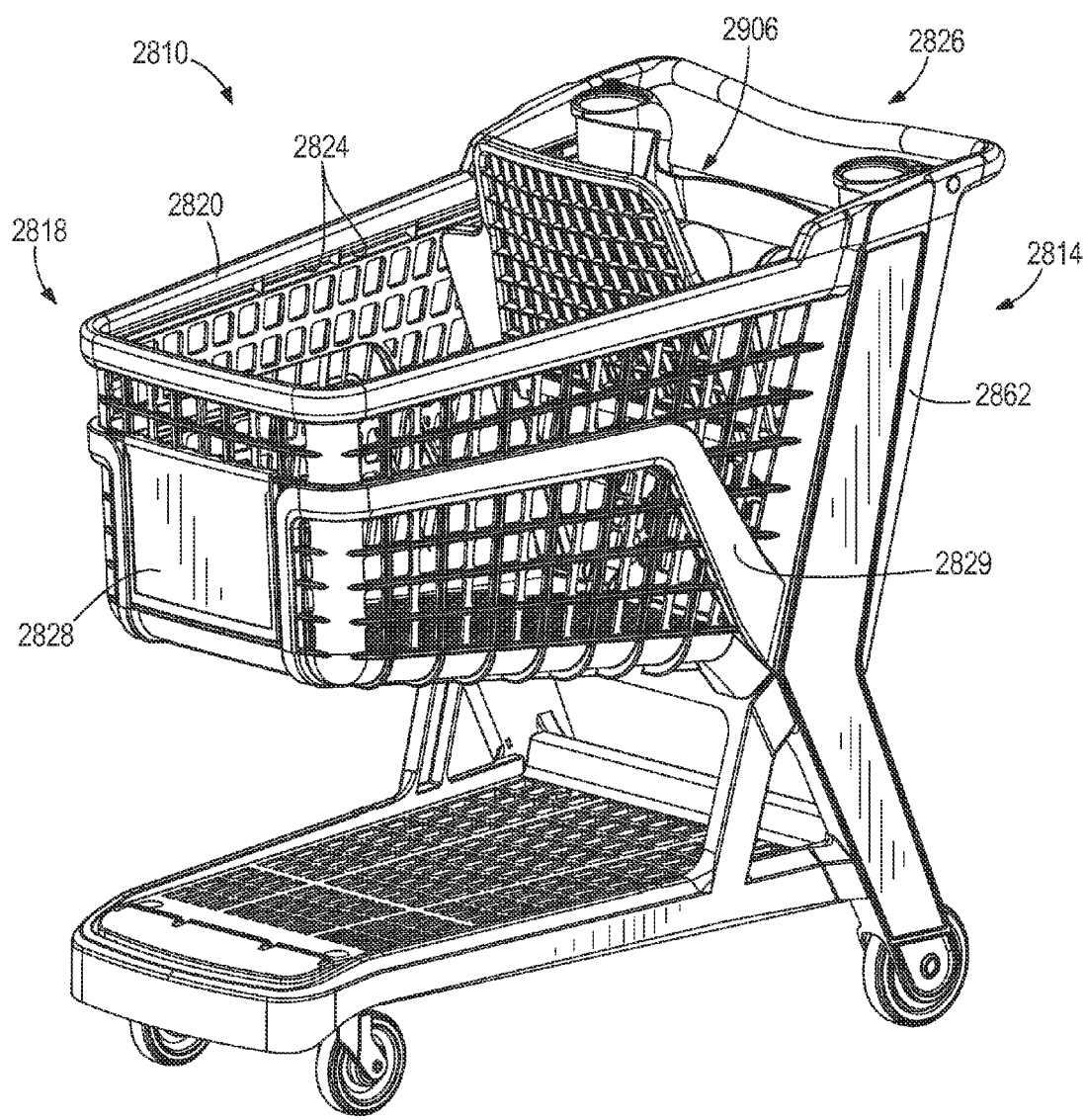
FIG. 46 is a front perspective view of a shopping cart according to another embodiment.
Figure 47:
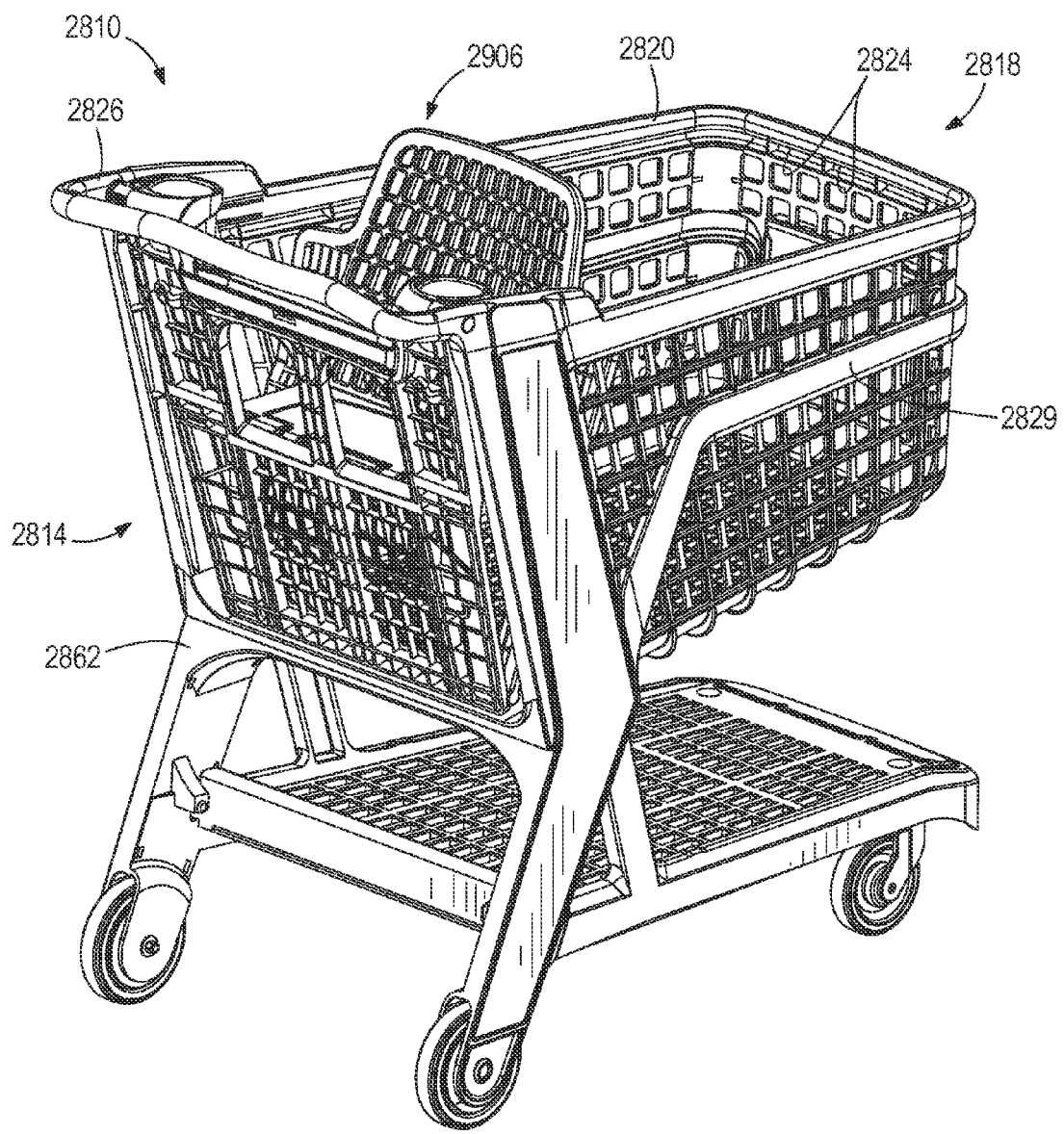
FIG. 47 is a rear perspective view of the shopping cart of FIG. 46.

As shown in FIGS. 46 and 47, the cart 2810 includes a single basket 2818 that is coupled to upright members 2862 of a frame 2814. The basket 2818 includes a rail 2820 that is formed integrally with the basket 2818 and extends around the perimeter of the basket 2818. The rail 2820 includes multiple grooves 2824 positioned below a top edge of the basket 2818. In the illustrated embodiment, the grooves 2824 are positioned above openings in side walls of the basket 2818. The grooves 2824 provide a grip surface for receiving a user's fingers and facilitate gripping and pulling the cart 2810 when the user is not positioned behind the cart 2810 (i.e., when the user is standing alongside or in front of the cart 2810). In addition, the basket 2818 includes a graphic panel 2828 (FIG. 46) coupled to one of the walls of the basket 2818 and supporting a removable graphic element (not shown) that can be changed as desired (e.g., seasonally). Also, in the illustrated embodiment, the basket 2818 includes support arms 2829 that extend along the side of the basket 2818. In some embodiments, the frame 2814 may include an arm for engaging a cart transport system as described above.

Figure 48:
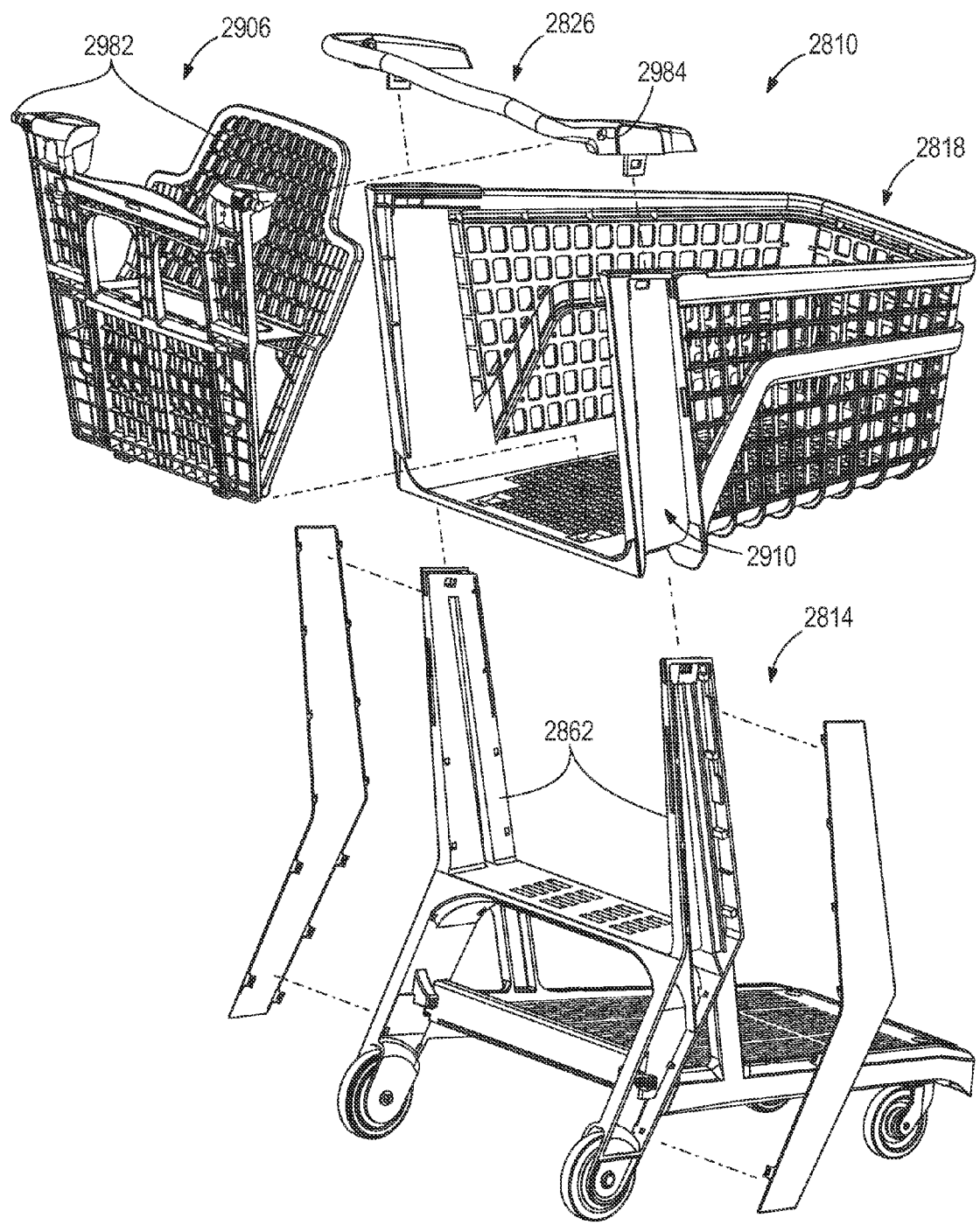
FIG. 48 is an exploded perspective view of the shopping cart of FIG. 46.
Figure 49:
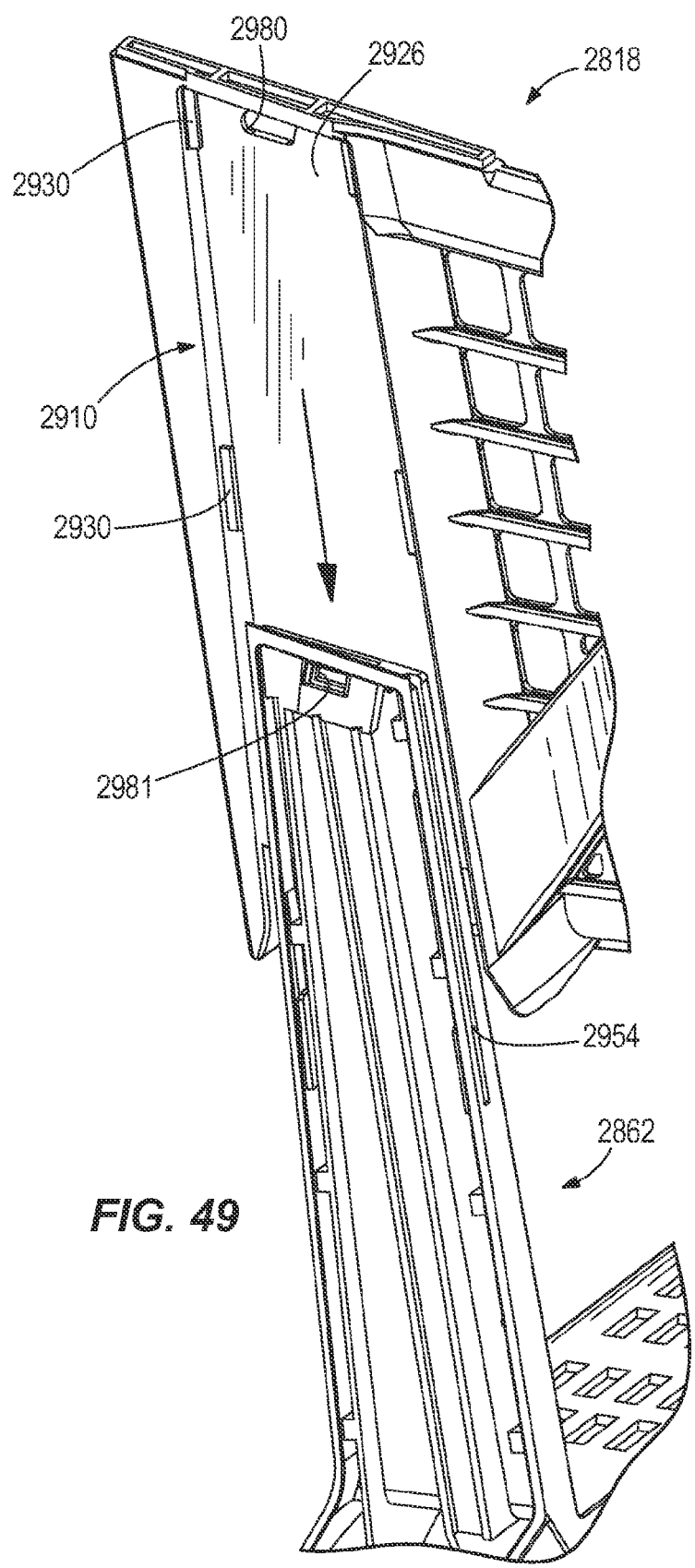
FIG. 49 is an exploded perspective view of a portion of a frame and a basket.
Figure 50:
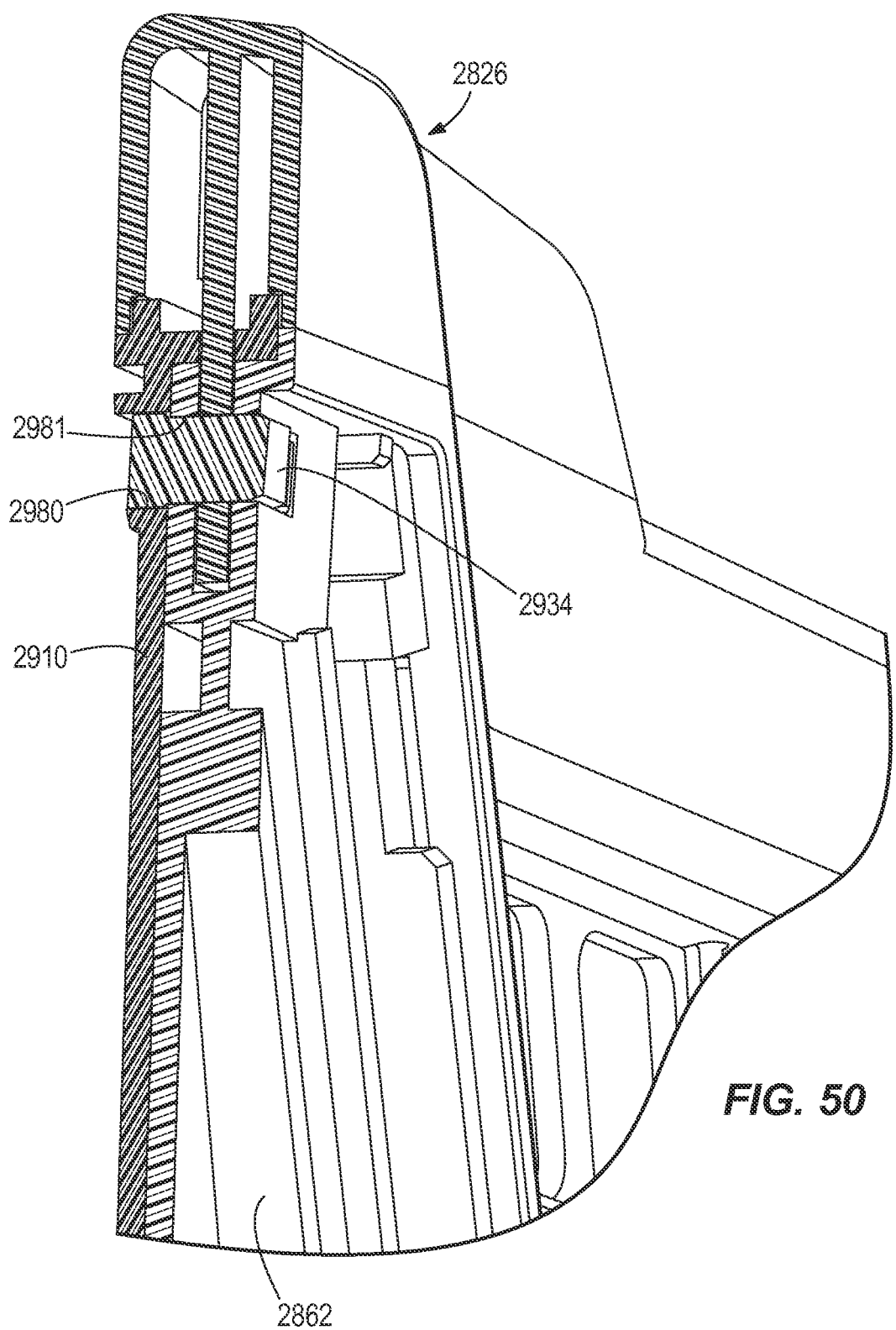
FIG. 50 is an enlarged section view of a portion of the frame and the basket of FIG. 49 and a handle assembly.

Referring to FIG. 48, the basket 2818 includes a gate assembly 2906 and mounting portions 2910 positioned on either side of the basket 2818. As best shown in FIG. 49, each mounting portion 2910 includes a generally flat surface 2926 and tabs 2930 positioned proximate the sides of the surface 2926 to be inserted within tracks 2954 on the sides of the upright members 2862. In other embodiments, the tracks may be formed on the basket 2818 and the tabs 2930 may be formed on the surface 2926. A handle assembly 2826 includes a pair of brackets 2978, each of which includes an opening that is aligned with an opening 2980 (FIG. 49) on the basket 2818 and an opening 2981 on the upright members 2862. As shown in FIG. 50, a pin 2934 is then inserted into each opening of the bracket 2978 and the openings 2980, 2981 to releasably secure the basket 2818 and the handle assembly 2826 to the upright members 2862.

Figure 53:
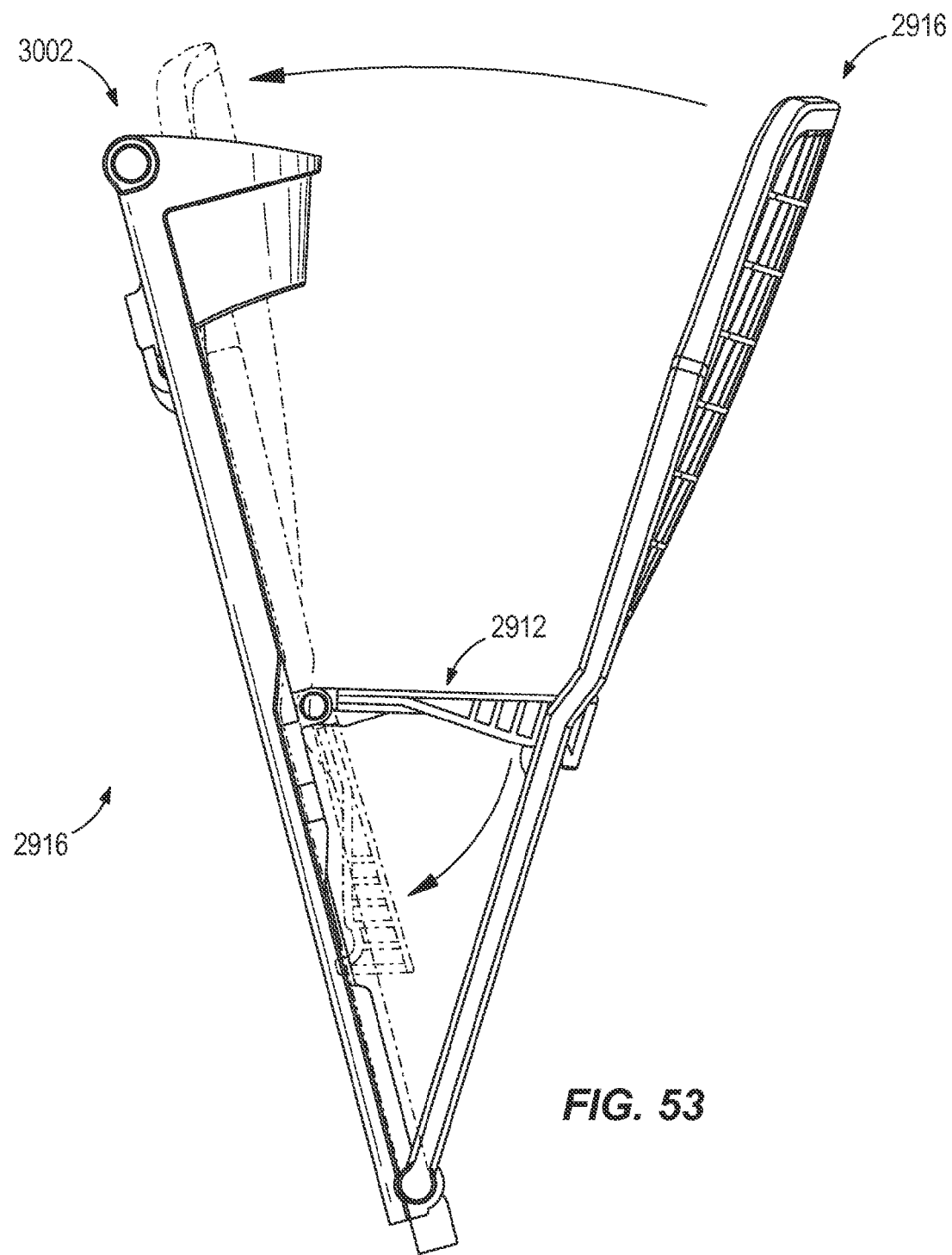
FIG. 53 is a side view of the gate assembly of FIG. 51 illustrating the motion of the gate assembly between the open state and the collapsed state.

As shown in FIGS. 51-53, the gate assembly 2906 includes a rear wall 2908, a seat 2912, and a folding wall 2916. In the illustrated embodiment, the gate assembly 2906 also includes accessory holders 3002. The accessory holders 3002 include round openings 3006 positioned on either side of the cart 2810 for supporting a cup and a lateral slot 3010 for supporting an electronic device (such as a tablet computer or a cellular phone). The slot 3010 extends between the openings 3006 and is oriented transverse to a cart axis (not shown). A notebook or electronic device can be positioned in either a forward-facing or rearward-facing orientation so that a screen of an electronic device is visible to either a user pushing the cart 2810 or a person seated within the cart 2810. In some embodiment, the slot 3010 includes a projection for engaging a lower portion of the electronic device and preventing the device from being jostled out of the slot 3010 as the user pushed the cart 2810. In other embodiments, the accessory holders 3002 are formed integrally with the handle assembly 2826. The accessory holders 3002 may include fewer or more accessory holders 3002 than those described or other types of accessory holders 3002, including hooks for supporting a hanging article (not shown), such as a garment or a handbag.

As shown in FIGS. 48 and 51, the rear wall 2908 includes a pair of openings 2910 for receiving the legs of a child passenger and a pair of pins 2982 engaging openings 2984 (FIG. 48) of the handle assembly 2826 such that the gate assembly 2906 is pivotable relative to basket 2818 and handle assembly 2826 about a first or gate axis 2924 (FIG. 51). Referring to FIG. 51, openings positioned along an edge of the seat 2912 are aligned with openings positioned on the rear wall 2908. A pin 3014 is inserted through the openings on the rear wall 2908 and the seat 2912 so that the seat 2912 is pivotably coupled to the rear wall 2908 about a second or seat axis 2928 that is parallel to the gate axis 2924 and positioned below the gate axis 2924. The folding wall 2916 includes a contoured backrest 2928 and is pivotably coupled to a lower end of the rear wall 2908 about a third or folding axis 2930 that is parallel to the gate axis 2924 and the seat axis 2928. The backrest 2928 is contoured or curved in a lateral (side-to-side) direction.

The folding wall 2916 also defines a lateral opening 2932 receiving an edge of the seat 2912 opposite the edge that is coupled to the rear wall 2908. The lateral opening 2932 extends parallel to the seat axis 2928. The seat 2912 is received in the opening 2932 and supported by the edge of the opening 2932. As the folding wall 2916 is pivoted toward the rear wall 2908, the seat 2912 slides through the opening 2932. When the folding wall 2916 is positioned adjacent the rear wall 2908, the gate assembly 2906 is in a collapsed state (FIG. 52). As best shown in FIG. 53, collapsing the gate assembly 2906 causes the seat 2912 to pass through the opening 2932 and rotate downwardly (clockwise in FIG. 53) relative to the rear wall 2908. Similarly, as the folding wall 2916 moves away from the rear wall 2908 toward an open state (FIG. 51), the seat 2912 rotates upwardly (counterclockwise in FIG. 53) into a substantially horizontal position.

Referring to FIG. 53, in the illustrated embodiment, the rear wall 2908 includes a first angled surface 3014 facing toward the folding wall 2916 and the folding wall 2916 includes a second angled surface 3018 that is complementary to the first angled surface 3014 and faces toward the rear wall

2908. When the gate assembly 2906 is collapsed, the first angled surface 3014 and the second angled surface 3018 mate with one another.

Although the invention has been described in detail with reference to certain preferred embodiments, variations and modifications exist within the scope and spirit of one or more independent aspects of the invention as described. Various features of the invention are set forth in the following claims.

What is claimed is:

1. A handle assembly for a shopping cart, the shopping cart having a front end and a rear end, the shopping cart including a basket and a rear gate, the handle assembly comprising:
    a handle positioned proximate the rear end of the shopping cart; and
    an elongated slot positioned proximate the handle and adapted for supporting an accessory;
    wherein the handle assembly is configured to support the rear gate for pivoting movement relative to the basket.

2. The handle assembly of claim 1, wherein the elongated slot is positioned forward of the handle.

3. The handle assembly of claim 1, wherein the handle includes side portions that are angled forward from a rear end and a center portion that is forward of the angled side portions.

4. The handle assembly of claim 1, further comprising a pair of cup holders, the cup holders being spaced apart laterally, wherein the elongated slot is positioned between the cup holders.

5. The handle assembly of claim 1, further comprising at least one hook positioned forward of the handle.

6. The handle assembly of claim 1, wherein the handle and the elongated slot are formed on a unitary member.

7. A handle assembly for a shopping cart, the shopping cart having a front end and a rear end, the shopping cart including a basket having an upper surface, the handle assembly comprising:
    a lower surface configured to contact the upper surface of the basket;
    a handle positioned proximate the rear end of the shopping cart, the handle defining a pair of side portions and a center portion extending between the side portions, the center portion positioned forward of the side portions; and
    an elongated slot positioned forward of the handle and parallel to the center portion.

8. The handle assembly of claim 7, wherein the handle, the lower surface, and the elongated slot are formed integrally.

9. The handle assembly of claim 7, further comprising a pair of cup holders, the cup holders being spaced apart laterally, wherein the elongated slot is positioned between the cup holders.

10. The handle assembly of claim 7, further comprising at least one hook positioned forward of the handle.

11. The handle assembly of claim 10, wherein the at least one hook extends toward the rear end of the cart and is positioned between the elongated slot and the handle.

12. The handle assembly of claim 10, wherein the at least one hook is formed integrally with the handle and the elongated slot.

13. The handle assembly of claim 12, further comprising a pair of cup holders formed integrally with the at least one hook, the elongated slot, and the handle, the cup holders being spaced apart laterally, wherein the elongated slot is positioned between the cup holders.

14. A shopping cart comprising:
    a frame including a base and an upright portion, the base defining a front end, and a rear end, a first side, and a second side opposite the first side, the upright portion including a pair of arms the frame base further including a plurality of wheels supporting the frame for movement over a floor;
    a basket positioned between the pair of arms, the basket including a rear gate; and
    a handle assembly extending between the first side of the frame and the second side of the frame, the handle assembly including
        a handle positioned proximate the rear end of the frame;
        an elongated slot positioned forward of the handle and adapted for supporting an accessory;
    wherein the handle assembly supports the rear gate for pivoting relative to the handle assembly and the basket.

15. The shopping cart of claim 14, wherein the handle includes side portions that are angled forward from a rear end and a center portion that is forward of the angled portions.

16. The shopping cart of claim 14, wherein the handle assembly further comprises a pair of cup holders, the cup holders being spaced apart laterally, wherein the elongated slot is positioned between the cup holders.

17. The shopping cart of claim 14, wherein the handle assembly further comprises at least one hook positioned forward of the handle.

18. The shopping cart of claim 14, wherein the basket is a first basket and the shopping cart further comprises a second basket positioned at least partially below the first basket.

19. The shopping cart of claim 14, wherein the pivot pin is positioned forward of the pair of arms.

20. The shopping cart of claim 14, wherein the handle assembly is supported on an upper surface of the basket.

21. The shopping cart of claim 14, wherein the handle assembly and the elongated slot are formed on a unitary member.

22. A shopping cart comprising:
    a frame including a base and an upright portion, the base defining a front end and a rear end, the upright portion including a pair of arms, each arm defining an upper end, the base further including a plurality of wheels supporting the frame for movement over a floor;
    a basket positioned between the pair of arms and defining an upper surface; and
    a handle assembly extending between the pair of arms and coupled to the upper ends of the pair of arms, the handle assembly directly supported on the upper surface of the basket, the handle assembly including
        a handle coupled to the rear end of the frame, the handle defining a pair of arcuate side portions and a center portion extending at least partially between the arcuate side portions, the center portion positioned forward of the arcuate side portions, and
        an elongated slot positioned forward of the handle and parallel to the center portion.

23. The shopping cart of claim 22, wherein the handle assembly further comprises at least one cup holder.

24. The shopping cart of claim 22, wherein the handle assembly includes a pair of cup holders laterally spaced apart from one another, wherein the elongated slot is positioned between the cup holders.

25. The shopping cart of claim 22, wherein the handle assembly includes at least one hook positioned forward of the handle.

26. The shopping cart of claim 25, wherein the at least one hook extends toward the rear end of the cart and is positioned between the elongated slot and the handle.

27. The shopping cart of claim 25, wherein the at least one hook is formed integrally with the handle and the elongated slot.

28. The shopping cart of claim 27, wherein the handle assembly includes a pair of cup holders spaced apart laterally from one another and formed integrally with the elongated slot and the handle, wherein the elongated slot is positioned between the cup holders.

29. The shopping cart of claim 22, wherein the basket is a first basket and the shopping cart further comprises a second basket positioned at least partially below the first basket.

30. The shopping cart of claim 22, wherein the basket includes rear gate, and the handle assembly is positioned directly above the rear gate.

31. The shopping cart of claim 22, wherein the basket includes a rear gate, wherein the handle assembly supports the rear gate for pivoting movement relative to the basket and the handle assembly.

32. The shopping cart of claim 22, wherein the handle assembly is formed as a unitary piece.

\* \* \* \* \*